United States Patent
Moriyama et al.

(10) Patent No.: US 7,475,819 B2
(45) Date of Patent: Jan. 13, 2009

(54) TAG-LABEL PRODUCING DEVICE

(75) Inventors: Satoru Moriyama, Iwakura (JP);
Koshiro Yamaguchi, Kagamihara (JP);
Mitsugi Tanaka, Nagoya (JP); Yasuhisa Ichikawa, Nagoya (JP); Yasuhiro Iriyama, Mie-ken (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 42 days.

(21) Appl. No.: 11/639,519

(22) Filed: Dec. 15, 2006

(65) Prior Publication Data

US 2007/0138281 A1 Jun. 21, 2007

(30) Foreign Application Priority Data

| Dec. 20, 2005 | (JP) | ............................ 2005-366088 |
| Apr. 13, 2006 | (JP) | ............................ 2006-111246 |
| Aug. 8, 2006 | (JP) | ............................ 2006-216019 |

(51) Int. Cl.
*G06K 7/08* (2006.01)

(52) U.S. Cl. .................. 235/451; 235/375; 235/472.02; 235/487; 400/61; 400/70; 400/79; 400/613; 400/621

(58) Field of Classification Search ................. 235/375, 235/451, 472.02, 487; 400/61, 70, 79, 621, 400/613
See application file for complete search history.

(56) References Cited

U.S. PATENT DOCUMENTS

| 6,246,326 B1 * | 6/2001 | Wiklof et al. ............ 340/572.1 |
| 6,327,972 B2 * | 12/2001 | Heredia et al. ................. 101/35 |
| 6,409,401 B1 | 6/2002 | Petteruti et al. |
| 6,899,476 B1 * | 5/2005 | Barrus et al. ................... 400/76 |
| 7,112,001 B2 * | 9/2006 | Hohberger et al. .......... 400/611 |
| 2003/0227528 A1 * | 12/2003 | Hohberger et al. .......... 347/104 |

FOREIGN PATENT DOCUMENTS

| EP | 0903686 | 3/1999 |
| JP | 2002-293314 | 10/2002 |
| JP | 2002293314 | 10/2002 |
| JP | 2003-208573 | 7/2003 |
| JP | 2004-58362 | 2/2004 |
| JP | 2004058362 | 2/2004 |
| JP | 2004-082432 | 3/2004 |
| JP | 2005-107991 | 4/2005 |
| JP | 2005-141407 | 6/2005 |

* cited by examiner

*Primary Examiner*—Uyen-Chau N Le
*Assistant Examiner*—Tuyen K Vo
(74) *Attorney, Agent, or Firm*—Day Pitney LLP

(57) ABSTRACT

The tag-label producing device includes a print head for performing printing with respect to a print area of a cover film, a loop antenna for performing transmission/reception of information to/from an RFID circuit element, and a tape feed roller for imparting relative movement between the print head or loop antenna and a tag label tape with print. At this time, a control circuit determines the chronological sequence relation between the arrival of the RFID circuit element at a communication position where transmission/reception of information is performed with respect to the loop antenna, and the completion of the printing by the print head with respect to the print area. In accordance with the result of this determination, the operation modes of the tape feed roller, loop antenna, and print head are switch-controlled in a coordinated fashion.

24 Claims, 65 Drawing Sheets

FIG.20

| TAG LABEL KIND |
|---|
| 13.56MHz, 100mm × 36mmTAG |

| PRINT LETTER |
|---|
| R F — I D |

| ACCESS ID |
|---|
| 1 6 , 7 7 7 , 2 1 5 |

| ITEM INFORMATION |
|---|
| 1 3 1 , 0 7 1 |

| SERVER INFORMATION |
|---|
| 2 , 0 9 7 , 1 5 1 |

FIG.21A
FIG.21B
FIG.21C
FIG.21D
FIG.21E
FIG.21F
FIG.21G
FIG.21H
FIG.21I
FIG.21J
FIG.21K
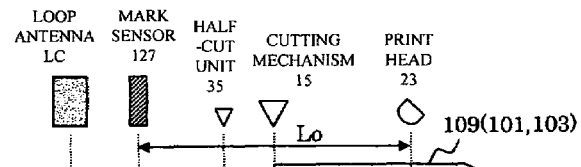
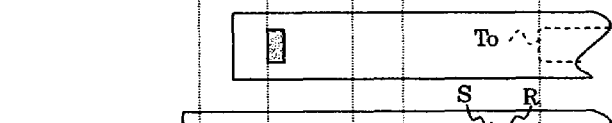
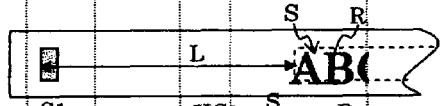
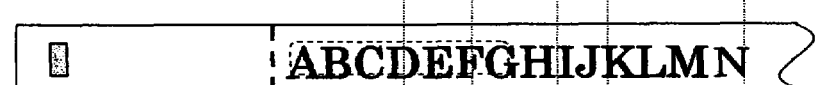
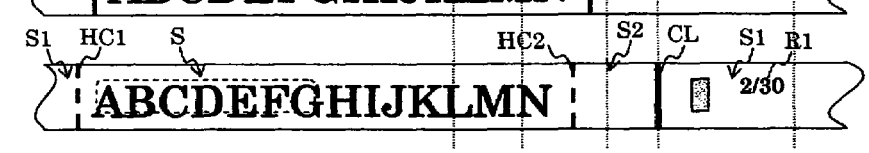

FIG.22A
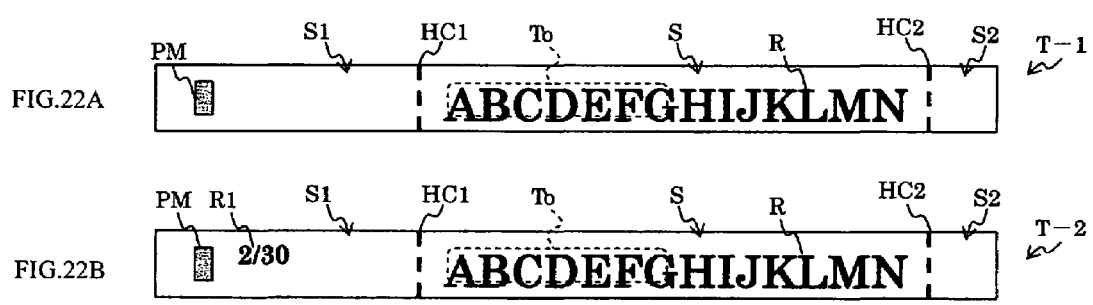
FIG.22B
FIG.23A
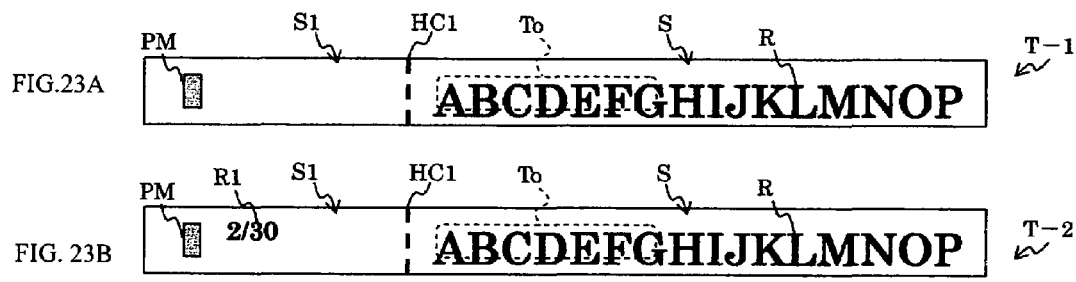
FIG. 23B

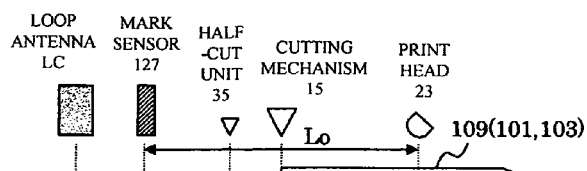
FIG.24A
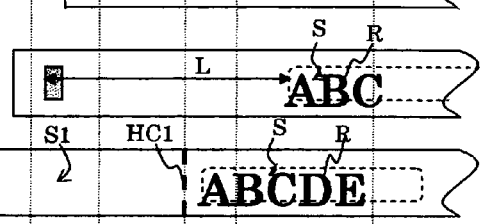
FIG.24B
FIG.24C
FIG.24D
FIG.24E
FIG.24F
FIG.24G
FIG.24H
FIG.24I
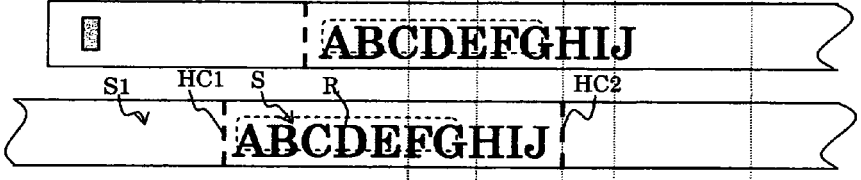
FIG.24J
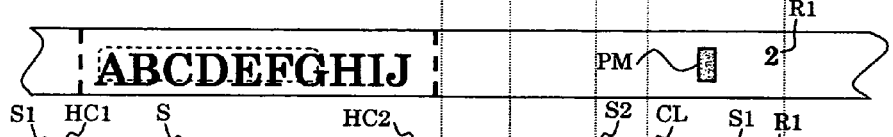
FIG.24K

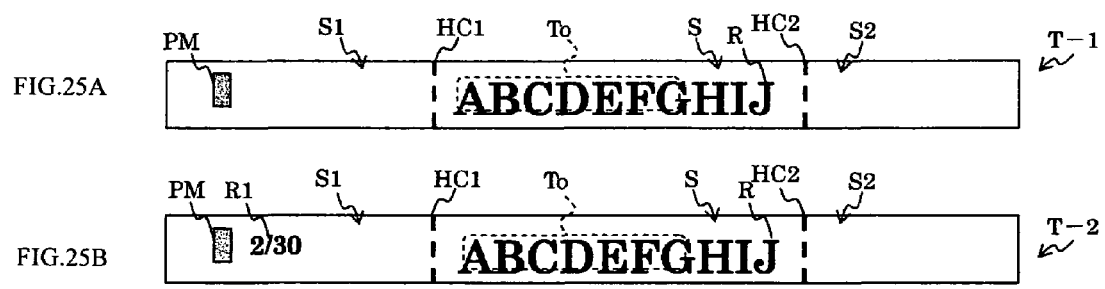

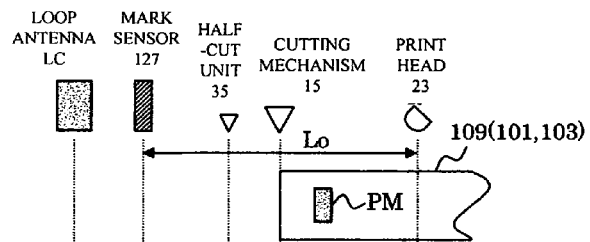
FIG.26A
FIG.26B
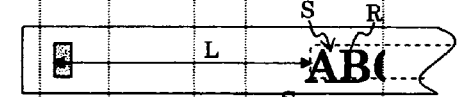
FIG.26C
FIG.26D
FIG.26E
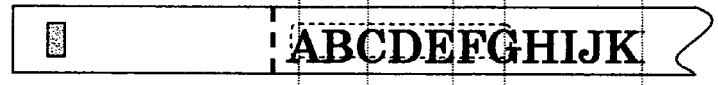
FIG.26F
FIG.26G′
FIG.26H′
FIG.26I′
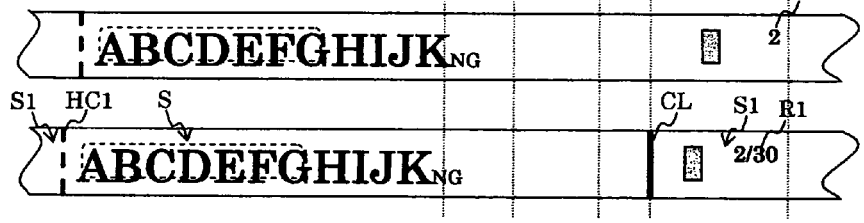
FIG.26J
FIG.26K

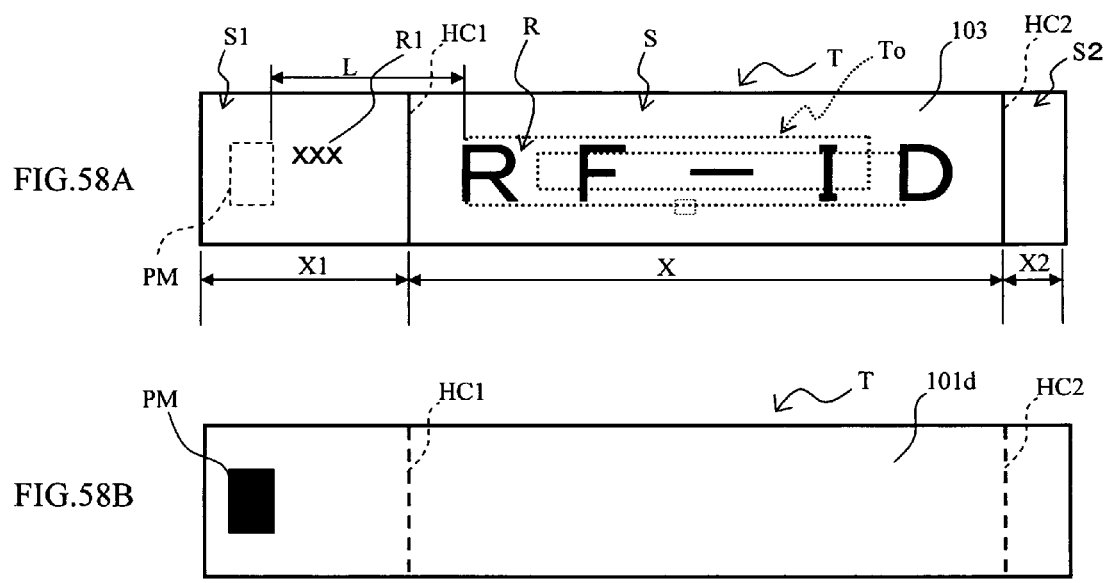

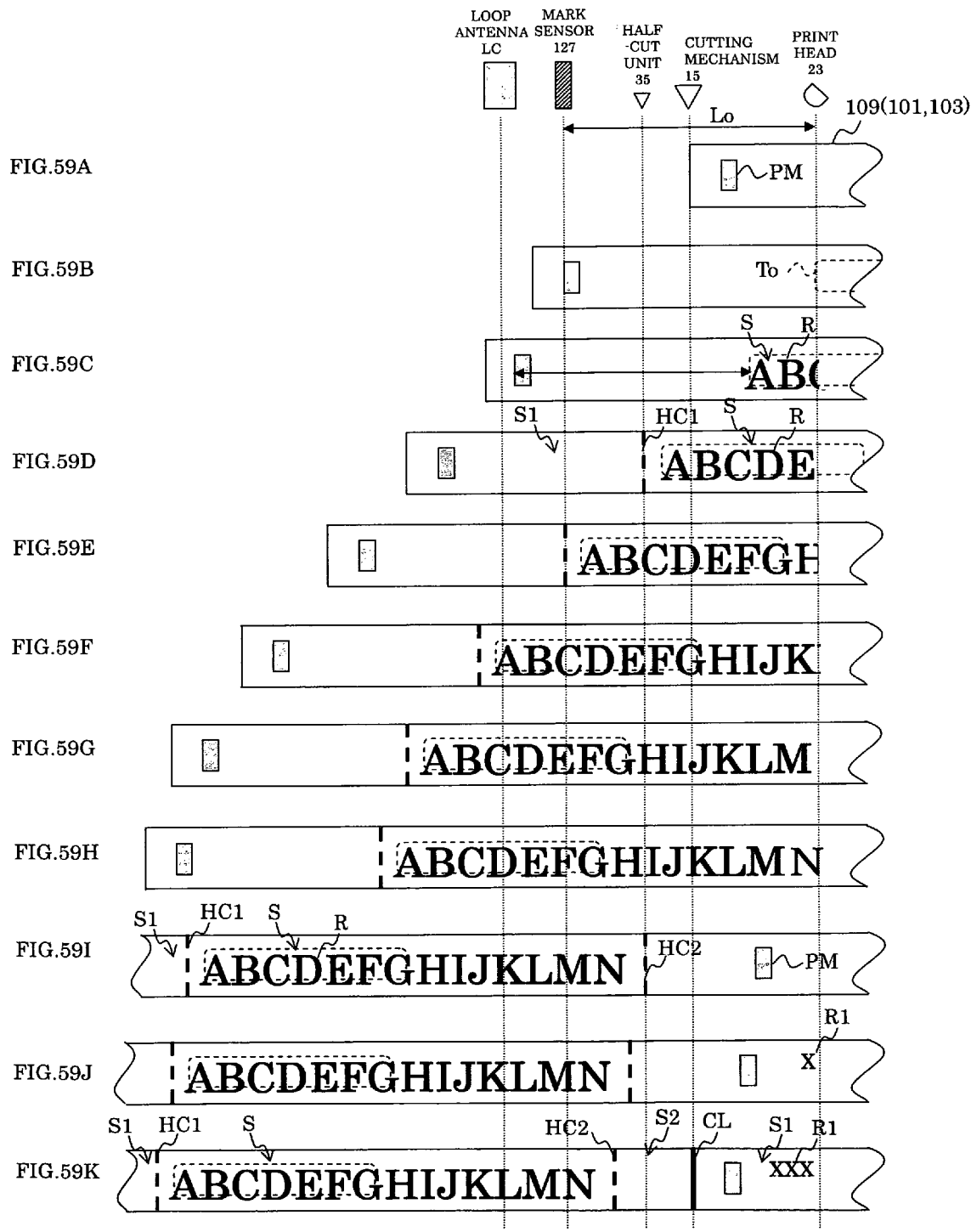

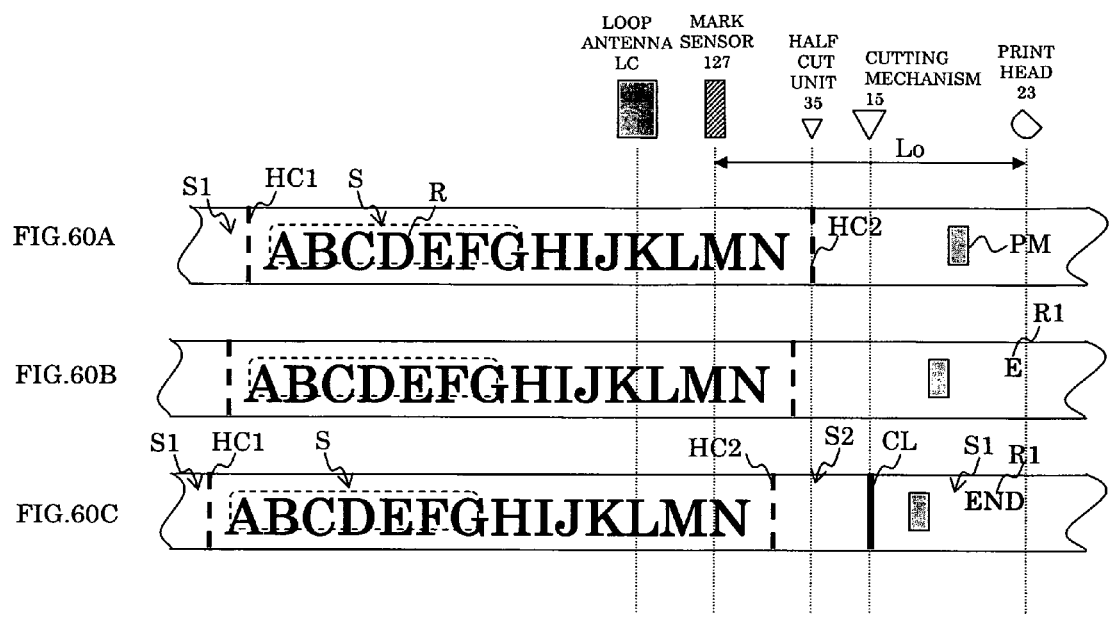

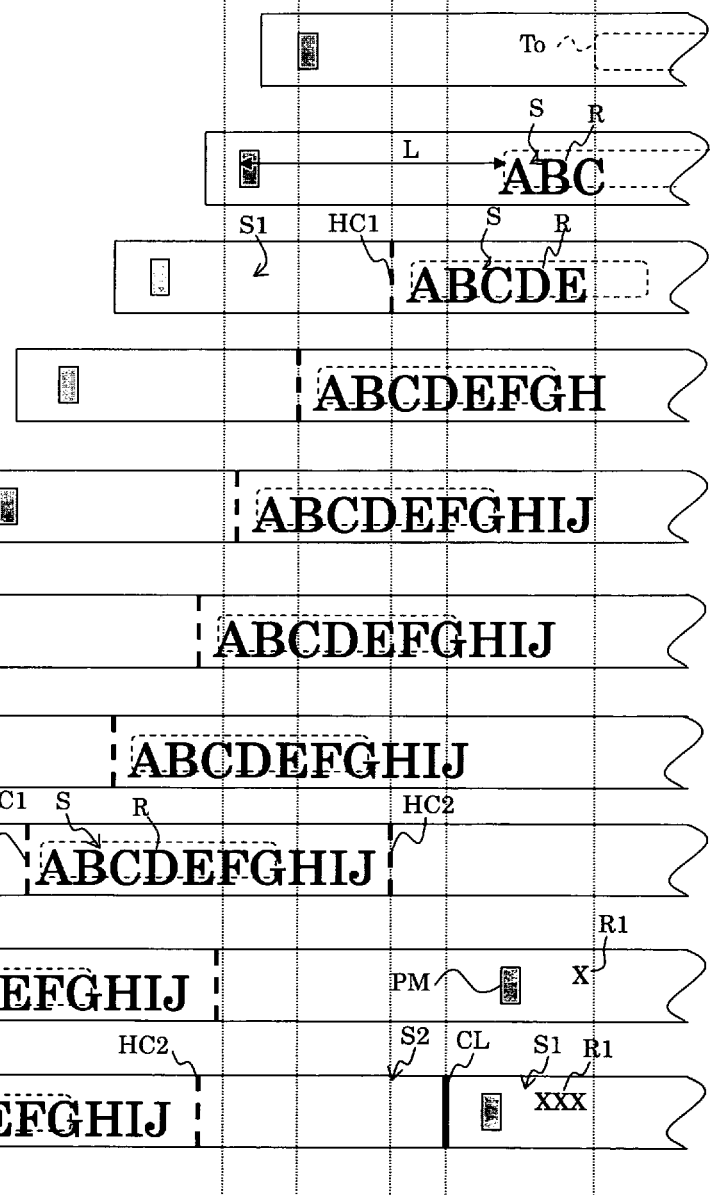

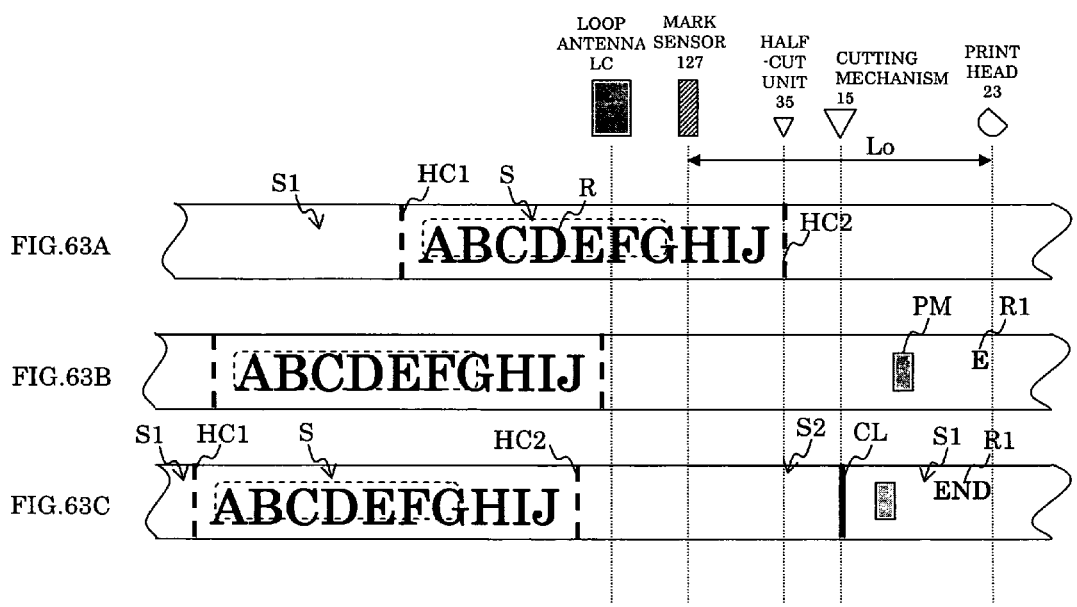

TAG-LABEL PRODUCING DEVICE

CROSS-REFERENCE TO RELATED APPLICATIONS

This application claims priority from JP 2005-366088, filed Dec. 20, 2005, JP 2006-111246, filed Apr. 13, 2006, and JP 2006-216019, filed Aug. 8, 2006, the contents of which are hereby incorporated by reference.

BACKGROUND

1. Field of the Invention

The present disclosure relates to a tag-label producing device for producing an RFID label equipped with an RFID circuit element for performing wireless communication of information with the outside.

2. Description of the Related Art

An RFID (Radio Frequency Identification) system is known which performs, by means of a reader (reading device)/writer (writing device), transmission/reception of information in a non-contact manner (by an electromagnetic coupling method, electromagnetic induction method, or electromagnetic radiation method or the like using a coil) with respect to an RFID circuit element that stores information. For example, an RFID circuit element provided in a label-like RFID tag is equipped with an IC circuit part for storing predetermined RFID tag information, and an antenna connected to this IC circuit part to transmit/receive information. Since the reader/writer can make access (reading/writing of information) to the RFID tag information of the IC circuit part even in such a case where the RFID tag is soiled or the RFID tag is arranged at a position where it cannot be seen, such an RFID system has been put into practical use in a variety of fields such as merchandise management and inspection processes.

Such an RFID tag is usually formed with RFID circuit elements provided on a label-like material. This tag label is often affixed to a target item or the like for the purpose of classification/organization of various documents/items, for example. Further, at this time, if, separately from tag information stored in the tag, information related to the RFID tag information is printed on a label in advance, the above-mentioned related information can be viewed from the user side, which may prove convenient in many situations. Accordingly, in the related art, a tag-label producing device for producing an RFID label from such a point of view has been already proposed (see, for example, JP,A,2004-82432 and JP,A,2003-208573).

In JP,A,2004-82432, a label equipped with an RFID circuit element (RF-ID element) is affixed to a tape-like tag medium (label sheet), and this is formed into a roll; after performing printing on the surface of the label by printing device (recording head) while paying out and feeding the tag medium from this roll, predetermined information writing is performed in the above-mentioned feeding state by transmitting information to the RFID circuit element from communication device (communication antenna) on the device side, thereby successively producing RFID labels with print.

In JP,A,2003-208573, as in JP,A,2004-82432 mentioned above, a tag medium is paid out from a roll unit equipped with a roll (roll sheet) having wound thereon the tag medium (continuous label sheet) on which RFID circuit elements (antennas and IC chips) are arranged longitudinally at substantially equal internals; after performing predetermined printing onto a predetermined position of that tag medium by printing device, transmission/reception of information is performed by communication device (RF-ID communication antenna) with respect to the RFID circuit elements equipped in the tag medium, thereby successively producing RFID labels with print.

In the related art described in JP,A, 2004-82432 mentioned above, communication with the RFID circuit element is performed while the tag medium is being fed, thereby enabling quick processing as compared with the case where the communication is performed while the feeding is stopped. Further, antennas are respectively provided at two locations on the upstream side with respect to the feed direction. If communication by the antenna on the upstream side has failed, communication is tried again by the antenna on the downstream side, thereby increasing the success rate of communication.

However, since predetermined printing is always performed before communication is performed, the same form of printing is performed on the RFID label all the time irrespective of the success/failure of the communication. For example, if the communication by the antenna and the printing by the printing device are coordinated in such a way that when it is possible or better to reflect the communication result on the form of printing, the communication result is reflected on the printing and recognized by the operator, this should enhance the convenience of the operator. However, no particular consideration has been given in this regard.

Further, in the related art described in each of JP,A,2004-82432 and JP,A,2003-208573 mentioned above, when successively producing tag labels as described above, the tag label production is performed under a state in which it is unknown when the supply of the tag medium from the roll of the roll unit will end (in other words, how many RFID circuit elements remain), which proves inconvenient.

As described above, in the related art mentioned above, in the series of flow of starting the feeding (movement) of the tag medium to sequentially extract the RFID circuit elements from the roll unit, performing printing by the print device, and performing communication with the RFID circuit elements to thereby produce RFID labels, no consideration has been given to enhancing the convenience by performing, in accordance with the movement of the tag medium, processing based on information related to that movement (such as the coordination between communication and printing or number-count display).

SUMMARY

A first object of the present disclosure is to provide a tag-label producing device that can achieve enhanced convenience by performing processing on the basis of movement-related information of a tag medium.

A second object of the present disclosure is to provide a tag-label producing device that can enhance the convenience of the operator by performing finely coordinated control between the printing operation and the communication operation.

A third object of the present disclosure is to provide a tag-label producing device that enables information related to the remaining number of RFID circuit elements to be reliably acquired during the RFID label production, thereby making it possible to enhance the convenience of the operator.

Means for Solving the Problem

In order to achieve the above-mentioned first object, according to first aspect, there is provided a tag-label producing device including: a communication device that performs transmission/reception of information in a non-contact manner with respect to an RFID circuit element provided in a tag medium having the RFID circuit element arranged therein, the RFID circuit element including an IC circuit part for storing information and an antenna for performing transmission/reception of information; a relative moving device that imparts relative movement between the communication device and the tag medium; related-information processing portion that performs predetermined processing relating to tag-medium-movement-related information based on the relative movement produced by the relative moving device; and control signal outputting portion that outputs a control signal according to a result of processing by the related-information processing portion.

In the first aspect of the present disclosure, when producing a tag label, relative movement occurs between the communication device and the tag medium due to the relative moving device, predetermined processing relating to tag-medium-movement-related information based on the relative movement at this time is performed by the related-information processing portion, and a control signal according to the result of that processing is output from the control signal outputting portion.

As the predetermined processing by the related-information processing portion, for example, it is possible to determine which one of the following events chronologically precedes the other: the arrival of the RFID circuit element at a predetermined position where transmission/reception of information is performed with respect to the communication device; and the completion of printing with respect to the predetermined area of the tag medium by the printing device that is moved relative to the tag medium by the relative moving device. In this case, the control signal outputting portion outputs a control signal in accordance with the result of this determination, so that the control signal outputting portion can, in accordance with the state at the time of arrival at the information transmission/reception position, perform switch-control of the subsequent operations, thereby allowing finely coordinated control to be easily and quickly effected. As a result, it is possible to enhance the convenience of the operator.

Further, for example, number-count-related information stored in the IC circuit part of the RFID circuit element and indicating the number of RFID circuit element inside the tag-medium accommodating member, can be acquired via the communication device. In this case, on the basis of the number-count-related information, the control signal outputting portion can output a display control signal for displaying the corresponding number-count information. Accordingly, as compared with the case of performing tag label production under a state where it is unknown how many more RFID circuit elements remain, the convenience of the operator can be enhanced.

As described above, in the first aspect of the present disclosure, as the tag medium moves, predetermined processing based on the corresponding movement-related information is performed, thereby making it possible to achieve enhanced convenience.

In order to achieve the above-mentioned first and second objects, according to second aspect, in the tag-label producing device to the first aspect, the tag-label producing device further includes a printing device that performs printing onto, while moving relative to, a predetermined print area of the tag medium or a print-receiving medium that is bonded onto the tag medium; the relative moving device imparts relative movement between the printing device and the tag medium or the print-receiving medium; the related-information processing portion is sequence determining portion that determines, as the predetermined processing relating to the tag-medium-movement-related information, a chronological sequence relation between arrival of the RFID circuit element at a predetermined position, where transmission/reception of information is performed with respect to the communication device, due to the relative movement, and completion of printing by the printing device with respect to the print area corresponding to the RFID circuit element; and the control signal outputting portion is a first coordinative control portion that outputs the control signal for switch-controlling operation modes of the relative moving device, the communication device, and the printing device in a coordinated fashion, in accordance with a result of determination by the sequence determining portion.

In the second aspect of the present disclosure, relative movement occurs between the communication device and the tag medium due to the relative moving device, and it is determined by the sequence determining portion which one of the following events chronologically precedes the other: the arrival of the RFID circuit element at the predetermined position where transmission/reception of information is performed with respect to the communication device; and the completion of printing with respect to the predetermined area of the tag medium by the printing device that is moved relative to the tag medium by the relative moving device.

Then, the first coordinative control portion is switch-controlled in accordance with the result of this determination by the sequence determining portion. Accordingly, for example, in case it is determined that the completion of printing with respect to the print area takes place first, it is possible to stop the relative movement when the predetermined position for performing transmission/reception of information is reached, and resume the relative movement after performing transmission/reception of information by the communication device. Alternatively, in case it is determined that the arrival at the predetermined position for performing transmission/reception of information takes place first, it is possible to stop the relative movement and printing to perform transmission/reception of information by the communication device and then resume the relative movement and the printing with respect to the print area.

In this way, in accordance with the state at the time of arrival at the communication position, the subsequent operations are switch-controlled, thereby allowing finely coordinated control to be performed easily and quickly in such a manner that if it is possible and better to reflect the results of information transmission/reception on the printing, the results are reflected, and if it is unnecessary and impossible to reflect the results on the printing, the results are not reflected. As a result, the convenience of the operator can be enhanced.

According to third aspect, in the tag-label producing device to the second disclosure, the relative moving device is a feeding device that feeds the tag medium or the print-receiving medium; the printing device performs printing with respect to the tag medium or the print-receiving medium that is being fed by the feeding device; and the sequence determining portion makes the determination on the basis of the time of arrival of the tag medium at the predetermined position of the RFID circuit element due to feeding by the feeding device.

In the third aspect of the present disclosure, it is determined by the sequence determining portion which one of the following events chronologically precedes the other: the arrival of the RFID circuit element of the tag medium, after the tag medium is fed by the feeding device, at the predetermined position where transmission/reception of information is performed with respect to the communication device; and the completion of printing with respect to the predetermined area of the tag medium by the printing device at this time.

Then, the first coordinative control portion is switch-controlled in accordance with the result of this determination by the sequence determining portion. Accordingly, for example, in case it is determined that the completion of printing with respect to the print area takes place first, it is possible to stop the feeding when the predetermined position for performing transmission/reception of information is reached, and resume the relative movement after performing transmission/reception of information by the communication device. Alternatively, in case it is determined that the arrival at the predetermined position for performing transmission/reception of information takes place first, it is possible to stop the feeding and printing to perform transmission/reception of information by the communication device and then resume the feeding and the printing with respect to the print area.

In this way, in accordance with the state at the time of arrival at the communication position, the subsequent operations are switch-controlled, thereby allowing finely coordinated control to be performed easily and quickly in such a manner that if it is possible and better to reflect the results of information transmission/reception on the printing, the results are reflected, and if it is unnecessary and impossible to reflect the results on the printing, the results are not reflected. As a result, the convenience of the operator can be enhanced.

According to fourth aspect, in the tag-label producing device to the third aspect, in case it is determined by the sequence determining portion that the completion of printing by the printing device with respect to the print area corresponding to the RFID circuit element takes place first, the first coordinative control portion coordinately controls the feeding device and the communication device so as to stop feeding by the feeding device, and after performing transmission/reception of information by the communication device, resume feeding by the feeding device.

In case it is determined that the completion of printing with respect to the print area takes place first, feeding is stopped to perform transmission/reception of information by the communication device, and then the feeding is resumed. Accordingly, transmission/reception of information can be reliably performed in the stopped state, and further the tag label can be produced quickly without performing unnecessary control of driving the printing device again.

According to fifth aspect, in the tag-label producing device to the third aspect, in case it is determined by the sequence determining portion that the arrival of the RFID circuit element at the predetermined position where transmission/reception of information is performed with respect to the communication device takes place first, the first coordinative control portion coordinately controls the feeding device, the communication device, and the printing device so as to stop feeding by the feeding device and printing by the printing device, and after performing transmission/reception of information by the communication device, resume feeding by the feeding device and printing by the printing device.

In case it is determined that the arrival at the predetermined position for performing transmission/reception of information takes place first, feeding and printing are stopped to perform transmission/reception of information by the communication device and then the feeding and printing are resumed. Accordingly, transmission/reception of information can be reliably performed in the feeding stopped state by interrupting the printing, and the remaining print is finished off after resuming the feeding, thereby making it possible to produce the tag label with reliability.

According to sixth aspect, in the tag-label producing device to the fifth aspect, the tag-label producing device further includes communication determining portion that determines whether or not transmission/reception of information by the communication device with respect to the RFID circuit element has succeeded; and in case it is determined by the communication determining portion that the transmission/reception of information has succeeded, the first coordinative control portion performs control so as to resume printing by the printing device.

When the transmission/reception of information has succeeded, since it is not particularly necessary to reflect the results of information transmission/reception on the printing (it suffices to notify the operator of the result only in the event of a failure), the printing is resumed as it is, thus allowing the RFID label to be reliably produced as usual.

According to seventh aspect, in the tag-label producing device to the fourth aspect, the tag-label producing device further includes communication determining portion that determines whether or not transmission/reception of information by the communication device with respect to the RFID circuit element has succeeded.

By thus determining the success/failure of information transmission/reception, it is possible to perform finely coordinated control easily and quickly in such a manner that if it is possible and better to reflect the results of information transmission/reception on the printing, the results are reflected, and if it is unnecessary and impossible to reflect the results on the printing, the results are not reflected. As a result, the convenience of the operator can be enhanced.

According to eighth aspect, in the tag-label producing device to the seventh aspect, the tag-label producing device further includes re-production controlling portion that, in case it is determined by the communication determining portion that the transmission/reception of information has failed: coordinately controls the feeding device, the printing device, and the communication device so as to transmit/receive, with respect to another RFID circuit element arranged on a trailing side in a feed direction with respect to the RFID circuit element that has failed in the transmission/reception, information that is substantially the same as the information of which the transmission/reception has failed, and to perform corresponding printing with respect to the predetermined area corresponding to the another RFID circuit element; and produces another RFID label that is different from the RFID label including the RFID circuit element that has failed in the transmission/reception.

When transmission/reception of information via the communication device with respect to one RFID circuit element has failed, transmission/reception of substantially the same information is performed with respect to an RFID circuit element arranged on the trailing side of the tag medium with respect to that RFID circuit element, thereby making it possible to perform the re-production of an RFID label using this information.

According to ninth aspect, in the tag-label producing device to the eighth aspect, the tag-label producing device further includes a discharge device that discharges the produced RFID label to the outside of the tag-label producing device; and the re-production controlling portion coordinately controls the discharge device, the feeding device, the printing device, and the communication device so as to produce the another RFID label after discharging the RFID label including the RFID circuit element that has failed in the transmission/reception.

Even when a label is produced in the state in which transmission/reception of information to/from the RFID circuit element has failed with respect to one RFID label, that RFID label is discharged, and transmission/reception of information to/from another RFID circuit element is automatically performed to thereby produce another RFID label. Accordingly, even when transmission/reception of information has failed, the RFID label can be automatically produced again without any additional operation by the operator, thereby making it possible to reduce the burden on the operator.

According to tenth aspect, in the tag-label producing device to the eighth aspect, the tag-label producing device further includes successive production controlling portion that coordinately controls the feeding device, the printing device, the communication device, and the discharge device so as to produce a plurality of the RFID labels each including the RFID circuit element at once.

Accordingly, if it is previously known that a plurality of RFID labels are to be produced, it suffices for the operator to give the successive production controlling portion an instruction for performing the successive production of the plurality of RFID labels. It is thus unnecessary to repeat the same operation to produce the plurality of RFID labels individually one by one, thereby making it possible to reduce the burden on the operator and achieve enhanced convenience.

According to 11th aspect, in the tag-label producing device to the tenth aspect, when the plurality of RFID labels are formed by the successive production controlling portion, in case it is determined by the communication determining portion that the transmission/reception of information has failed, the re-production controlling portion coordinately controls the feeding device, the printing device, and the communication device so as to produce the same number of the other RFID labels as the number of the RFID labels including the RFID circuit elements that have failed in the transmission/reception.

Accordingly, even when transmission/reception of information has failed in some RFID labels during the production of a plurality of RFID labels, the number of RFID labels T corresponding to the number of RFID labels that have failed in the transmission/reception of information can be automatically produced without any additional operation by the operator, thereby making it possible to reduce the burden on the operator.

According to 12th aspect, in the tag-label producing device to the seventh aspect, in case it is determined by the communication determining portion that the transmission/reception of information has failed, the first coordinative control portion controls the printing device so as to perform printing corresponding to the failure.

When transmission/reception of information has failed, printing corresponding to the failure is performed, whereby the result of the information transmission/reception (=failure) can be made visually clear and recognized by the operator.

According to 13th aspect, in the tag-label producing device to the 12th aspect, as the printing corresponding to the failure, the printing device performs printing in a manner different from a normal manner.

In the event of a transmission/reception failure, printing is performed in a manner different from the normal manner, thereby allowing the failure to be more reliably recognized by the operator.

According to 14th aspect, in the tag-label producing device to the 12th aspect, the feeding device feeds a tag tape as the tag medium, the tag tape having a base layer to which the RFID circuit element is mounted, an adhesive layer for affixing the base layer onto a target affixing object, and a separation material layer that covers the adhesive layer; and the tag-label producing device further includes a half-cutting device that selectively cuts the separation material layer or layers other than the separation material layer in a width direction, in the vicinity of both longitudinal end portions of a label-formation area of the tag tape corresponding to the RFID circuit element and having a predetermined length.

In the case where only the separation material layer is cut off by the half-cutting device, when the produced RFID label is affixed to a target affixing object by the operator, the separation material layer can be readily peeled off at the cutting line from the adhesive layer. Alternatively, in the case where only the layers other than the separation material layer are cut off by the half-cutting device, the length of the RFID label (corresponding to the print length) to be actually peeled off and affixed can be regulated by the position of the above-mentioned cutting line. As a result, the length of the label-formation area of the tag tape used for the production of one RFID label can be made constant at all times irrespective of the length of the above-mentioned RFID label to be affixed.

According to 15th aspect, in the tag-label producing device to the 14th aspect, the tag-label producing device further includes cutting control portion that controls operation of the half-cutting device so that, in case it is determined by the communication determining portion that the transmission/reception of information has failed, the cutting in the width direction is not performed at one of the both longitudinal end portions of the label-formation area.

Further, since a label for which transmission/reception of information has failed cannot be used as the RFID label, the cutting in the width direction using the half-cutting device, which is normally performed at both end portions of the tape, is omitted, whereby unnecessary cutting operation can be eliminated to achieve simplified control. This also proves advantageous in that the absence of the half-cut line at either one of the both end portions can make it visually clear to the operator that the RFID label has failed in transmission/reception.

According to 16th aspect, in the tag-label producing device to the fifth aspect, the tag-label producing device further includes margin determining portion that determines, in case it is determined by the sequence determining portion that the arrival of the RFID circuit element at the predetermined position where transmission/reception of information is performed with respect to the communication device takes place first, and when feeding by the feeding device and printing by the printing device are stopped upon the arrival, whether or not a position with respect to the feed direction at which the printing device stops printing corresponds to a non-printing margin portion located between print letters or print patterns in the print area.

When printing is stopped while the printing device is performing printing on a letter portion or pattern portion (non-blank portion), there is a possibility that fading, a minute print blank, or the like may occur upon resuming the printing thereafter. In the sixteenth aspect of the present disclosure, it is determined by the margin determining portion whether or not the printing stop position of the printing device corresponds to the non-printing margin portion; if the printing stop position does not correspond to the white line (if the printing device is midway through the printing of the letter portion or pattern portion), a predetermined control is executed in the manner as mentioned above, thereby making it possible to avoid the adverse effects of the above-mentioned fading, blank, or the like.

According to 17th aspect, in the tag-label producing device to the 16th aspect, the tag-label producing device further includes feed control portion that, in case it is determined by the margin determining portion that the stop position of the printing device does not correspond to the non-printing margin portion, controls the feeding device so as to feed in a reverse or forward direction and then stop the tag medium or the print-receiving medium so that the printing device arrives at the non-printing margin portion.

When the stopped position of the printing device is such that the printing device is midway through the printing of a letter or pattern portion, feeding is performed up to the non-printing margin portion and then the feeding is stopped before performing transmission/reception of information, thereby making it possible to prevent fading, a blank, or the like from occurring due to the stoppage of printing.

In order to achieve the above-mentioned objects, according to 18th aspect, in the tag-label producing device to the first aspect, the tag-label producing device further includes an accommodating-member installation holder that detachably installs a tag-medium accommodating member from which the tag medium can be supplied; the relative moving device is a feeding device that feeds the tag medium supplied from the tag-medium accommodating member; the related-information processing portion is information acquisition portion that acquires, as the predetermined processing relating to the tag-medium-movement-related information, number-count-related information related to the number of the RFID circuit elements in the tag-medium accommodating member via the communication device, the number-count-related information being stored in the IC circuit part of the RFID circuit element; the tag-label producing device further includes storage portion that stores, on the basis of the number-count-related information acquired by the information acquisition portion, corresponding number-count information in a rewritable manner; the control signal outputting portion is display control signal outputting portion that outputs a display control signal for displaying number-count information stored in the storage portion; and the tag-label producing device produces a tag label using the tag medium for which predetermined information transmission/reception with respect to the RFID circuit element has been performed.

In the eighteenth aspect of the present disclosure, upon installing the tag-medium accommodating member on the accommodating-member installation holder, the tag medium is supplied from the tag-medium accommodating member as it is fed by the feeding device, and predetermined information transmission/reception is performed with respect to the RFID circuit element equipped in the tag medium via the communication device, thereby producing a tag label. At this time, number-count-related information is stored in the IC circuit part of the RFID circuit element. This number-count-related information is acquired by the information acquisition portion via the communication device, and the corresponding number-count information is reliably stored into the storage portion. Further, a display control signal relating to this stored number-count information is output from the display control signal outputting portion, thereby allowing the above-mentioned number count to be displayed on the display device and recognized by the operator with reliability. Accordingly, as compared with the case of performing tag label production in the state where it is unknown how many RFID circuit elements remain, the convenience of the operator can be enhanced. Further, since number-count-related information is previously stored in the RFID circuit element that is equipped to the tag medium from the beginning, and the number-count information indicating the number of RFID circuit elements is acquired by using this number-count-related information, as compared with the case where another separate storage portion for the acquisition of number-count information is provided to the tag-medium accommodating member, there is no fear of new components being added or the construction of the tag-medium accommodating member becoming more complicated.

According to 19th aspect, in the tag-label producing device to the 18th aspect, the tag-label producing device further includes update processing portion that increases or decreases a value of the number-count information, which is stored in the storage portion, by 1 each time production of one the tag label is completed.

The number-count information stored into the storage portion on the basis of the number-count information acquired from the IC circuit part of the RFID circuit element is decreased or increased by 1 by the update processing portion each time one tag label is produced. Accordingly, the number (the remaining-number or usage number) of RFID circuit elements in the tag-medium accommodating member, which changes (decreases or increases) as tag labels are produced, can be reliably grasped and displayed on the display device.

According to 20th aspect, in the tag-label producing device to the 19th aspect, the tag-label producing device further includes a second coordinative control portion that, after the number-count information is stored into the storage portion on the basis of the number-count-related information acquired by the information acquisition portion, coordinately controls the feeding device, the communication device, and the information acquisition portion so as to perform the tag label production without acquiring the number-count-related information by the information acquisition portion.

Number-count information is stored into the storage portion on the basis of the number-count-related information acquired from the IC circuit part of the RFID circuit element by the information acquisition portion, and thereafter the number-count information is decreased or increased by 1 each time one tag label is produced, thereby making it unnecessary to acquire the number-count information from the IC circuit part again. As a result, as compared with the case where the number-count-related information is acquired from the IC circuit part via the communication device each time one tag label is produced, unnecessary wireless communication procedure can be omitted. As a result, the time required for the label production is reduced, thereby making it possible to enhance the efficiency of production processing.

According to 21st aspect, in the tag-label producing device to the 19th aspect, the display control signal outputting portion generates and outputs a display control signal for displaying a value of the number-count information updated by the update processing portion.

Accordingly, the value of number-count information that increases or decreases upon each tag label production can be displayed on the display device and reliably recognized by the operator.

According to 22nd aspect, in the tag-label producing device to the 18th aspect, the tag-label producing device further includes initialization processing portion that initializes, at a predetermined timing after the tag label production, a value of the number-count information stored in the storage portion at that time.

Accordingly, in situations such as when it is assumed that the tag-medium accommodating member, which can be attached/detached to/from the accommodating-member installation holder, has been detached from the accommodating-member installation holder for replacement or the like, the value of the number-count information previously stored in the storage portion is not retained but initialized (cleared), thereby making it possible to prevent an erroneous display of the number-count information or the like from being made at the time of next tag label production.

According to 23rd aspect, in the tag-label producing device to the 22nd aspect, the initialization processing portion performs initialization of the number-count information when, as the predetermined timing, at least one of the following conditions are met: the tag-medium accommodating member has been detached from the accommodating-member installation holder; a cover that covers the accommodating-member installation holder has been opened; and a device power source has been turned on or off.

When the tag-medium accommodating member has been detached, or when the opening of the cover or the detachment of the tag-medium accommodating member at the time of power on/off operation or the like is assumed, the value of the number-count information that has been stored in the storage portion is initialized, thereby making it possible to reliably prevent an erroneous display of the number-count information or the like from being made at the time of next tag label production.

According to 24th aspect, in the tag-label producing device to the 18th aspect, the accommodating-member installation holder is a cartridge holder onto which an RFID circuit element cartridge as the tag-medium accommodating member accommodating a tag tape roll can be detachably mounted, the tag tape roll having wound thereon a tag tape as the tag medium in which a plurality of the RFID circuit elements are successively arranged.

Accordingly, in the configuration in which the tag tape is paid out from the tag tape roll of the RFID circuit element cartridge to thereby produce a tag label, the number-count information can be reliably recognized by the operator, thereby making it possible to enhance the convenience of the operator.

According to 25th aspect, in the tag-label producing device to the 24th aspect, the cartridge holder allows the RFID circuit element cartridge of a laminate type to be attached and detached as the RFID circuit element cartridge to and from the cartridge holder, the RFID circuit element cartridge of a laminate type accommodating the tag tape roll, and a print-receiving tape roll around which a print-receiving tape to be bonded onto the tag tape is wound; the feeding device feeds the tag tape and the print-receiving tape; and the tag-label producing device further includes a printing device that performs predetermined printing on the print-receiving tape.

Accordingly, in the configuration in which, while paying out the tag tape from the tag tape roll of a laminate-type RFID circuit element cartridge, the print-receiving tape, which is paid out from the print-receiving tape roll and on which predetermined printing has been performed by the printing device, is bonded onto the above-mentioned tag tape to thereby produce a tag label, the number-count information can be reliably recognized by the operator, thereby making it possible to enhance the convenience of the operator.

In accordance with the disclosure recited in Claim 1, by performing processing on the basis of the movement-related information for the tag medium, it is possible to achieve enhanced convenience.

In accordance with the disclosure recited in Claim 2, finely coordinated control between the printing operation and the communication operation is performed, thereby making it possible to enhance the convenience of the operator.

In accordance with the disclosure recited in Claim 18, information relating to the remaining number of RFID circuit elements is reliably acquired at the time of producing the RFID label, thereby making it possible to enhance the convenience of the operator.

BRIEF DESCRIPTION OF THE DRAWING

FIG. 20 is a view showing an example of the screen displayed on the PC when making access to (performing reading from or writing to) RFID tag information.

FIG. 21A-21K are respectively explanatory view illustrating the positional relation between a tag label tape with print, a loop antenna, a mark sensor, a half-cut unit, a cutting mechanism, and a print head.

FIG. 22A, 22B are respectively view showing an example of the RFID label.

FIG. 23A, 23B are respectively view showing an example of the RFID label T with no rear margin area.

FIG. 24A-24K are respectively explanatory view showing the positional relation between a tag label tape with print, a loop antenna, a mark sensor, a half-cut unit, a cutting mechanism, and a print head.

FIG. 25A, 25B are respectively view showing an example of the RFID label T.

FIG. 26A-26K are respectively explanatory view showing the processing when a communication error occurs in the case where the print length is relatively long.

FIG. 58A is a top view showing an example of the outward appearance of an RFID label T.

FIG. 58B is a bottom view showing an example of the outward appearance of an RFID label T.

FIG. 59A-59K are respectively explanatory view illustrating the positional relation between a tag label tape with print, a loop antenna, a mark sensor, a half-cut unit, a cutting mechanism, and a print head, and the processing with respect to the tag label tape with print.

FIG. 60A-60C are respectively explanatory view showing the processing with respect to the trailing end portion of the tag label tape with print shown in FIG. 59.

FIG. 62A-62K are respectively explanatory view illustrating the positional relation between a tag label tape with print, a loop antenna, a mark sensor, a half-cut unit, a cutting mechanism, and a print head, and the processing with respect to the tag label tape with print.

FIG. 63A-63C are respectively explanatory view showing the processing with respect to the trailing end portion of the tag label tape with print shown in FIG. 62.

DETAILED DESCRIPTION OF THE PREFERRED EMBODIMENTS

A tag-label producing device according to an embodiment of the present disclosure will be described below with reference to the drawings. In this embodiment, the present disclosure is applied to an RFID label manufacturing system.

Figure 1:
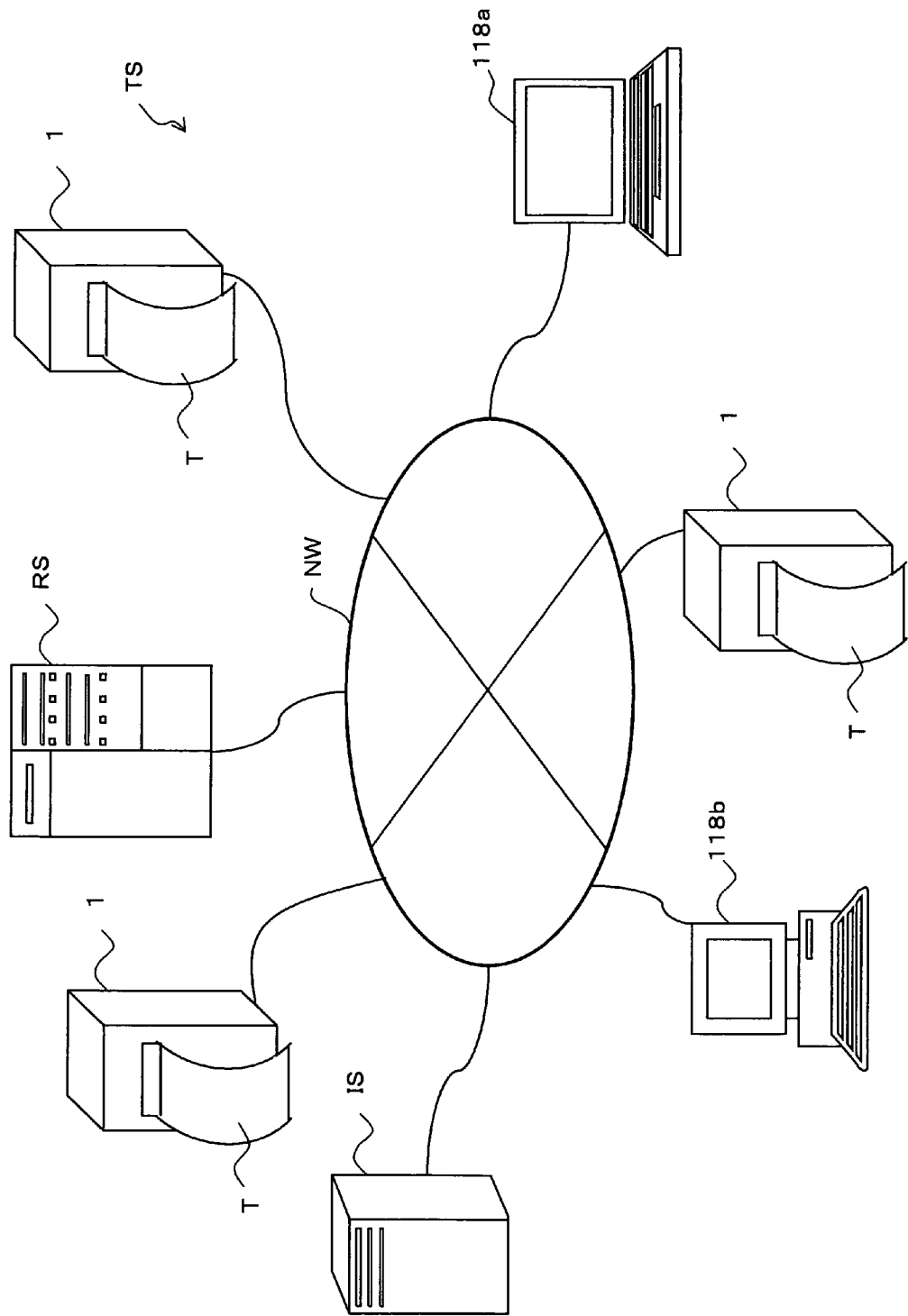
FIG. 1 is a system configuration diagram showing an RFID tag manufacturing system equipped with a tag-label producing device according to a first embodiment of the present disclosure.

FIG. 1 is a system diagram showing an RFID tag manufacturing system equipped with a tag-label producing device according to a first embodiment of the present disclosure.

In an RFID tag manufacturing system TS shown in FIG. 1, a tag-label producing device 1 is connected to a route server RS, a plurality of information servers IS, a terminal 118a, and a general purpose computer 118b via a wired or wireless communication line NW. It should be noted that in the following description, the terminal 118a and the general purpose computer 118b will be generically referred to simply as "PC 118" as appropriate. Further, the information server IS provided with a database (not shown) in which, for example, employee information, merchandise information, customer information, and so on are registered.

Figure 2:
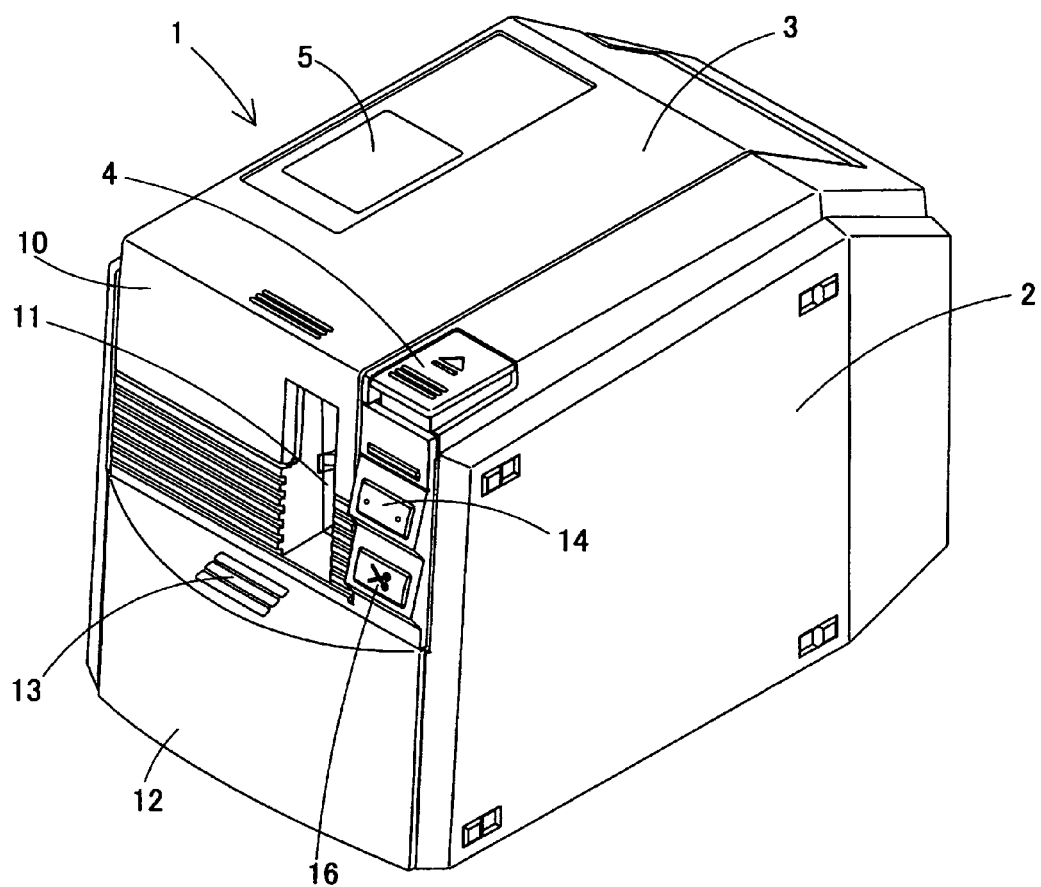
FIG. 2 is a perspective view showing the overall construction of the tag-label producing device shown in FIG. 1.

FIG. 2 is a perspective view showing the overall construction of the above-mentioned tag-label producing device 1.

In FIG. 2, the tag-label producing device 1 is connected to the PC 118 and produces an RFID label with a desired print on the basis of operation from the PC 118. The tag-label producing device 1 includes a main body 2, and an open/close cover 3 (cover) provided to the upper surface of the main body 2 so as to freely open and close.

The main body 2 is located on the forward side (the left forward side in FIG. 2), and includes a side wall 10 equipped with a label discharge port 11 for discharging an RFID label T (details of which will be described later) produced inside the main body 2, and a side cover 12 that is provided in the portion of the side wall 10 below the label discharge port 11 and whose lower end is rotatably supported in place.

The side cover 12 includes a pressing portion 13. The side cover 12 opens forward by pressing the pressing portion 13 from above. Further, a power supply button 14 for turning on/off the power supply of the tag-label producing device 1 is provided in the portion of the side wall 10 below an open/close button 4. Provided below the power supply button 14 is a cutter driving button 16 for driving a cutting mechanism 15 (see FIG. 3 that will be described later) disposed inside the main body 2 through manual operation by the user. When the button 16 is pressed, a tag label tape 109 with print (details of which will be described later) is cut into a desired length, thereby producing an RFID label T.

The open/close cover 3 is rotatably pivoted on the end of the main body 2 on the right rear side in FIG. 2, and always urged in the opening direction via an urging member such as a spring. When the open/close button 4 arranged in the upper surface of the main body 2 so as to be adjacent to the open/close cover 3 is pressed, the locking engagement between the open/close cover 3 and the main body 2 is released, causing the open/close cover 3 to open due to the operation of the urging member. It should be noted that a see-through window 5 covered with a transparent cover is provided at the central side portion of the open/close cover 3.

Figure 3:
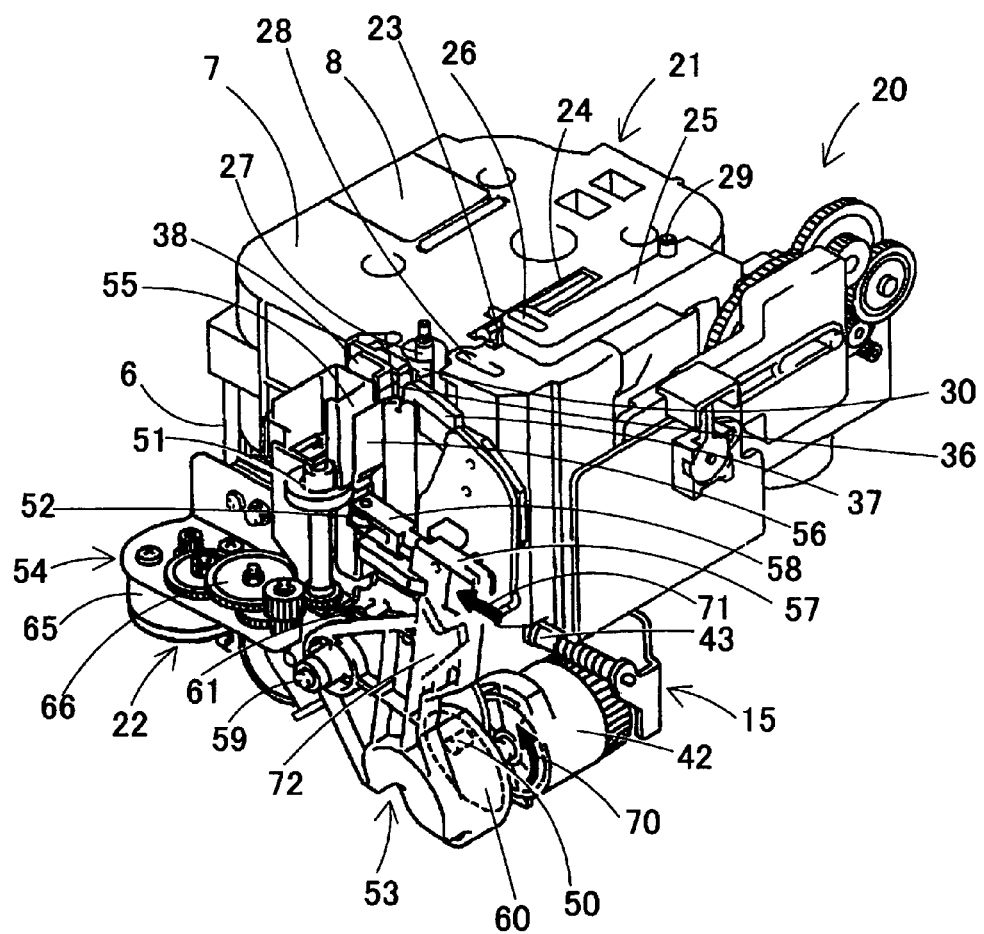
FIG. 3 is a perspective view showing the construction of an internal unit of the tag-label producing device.

FIG. 3 is a perspective view showing the construction of an internal unit 20 of the tag-label producing device 1 (however, a loop antenna LC that will be described later is omitted). In FIG. 3, the internal unit 20 generally includes a cartridge holder 6 (accommodating-member installation holder) accommodating a cartridge (RFID circuit element cartridge; tag-medium accommodating member) 7, a printing mechanism 21 equipped with a print head (thermal head) 23, the cutting mechanism 15, a half-cut unit 35 (see FIG. 8 that will be described later), and a label discharge mechanism 22 for discharging the produced RFID label T (see FIG. 19 that will be described later) from the label discharge port 11 (see FIG. 2).

Figure 4:
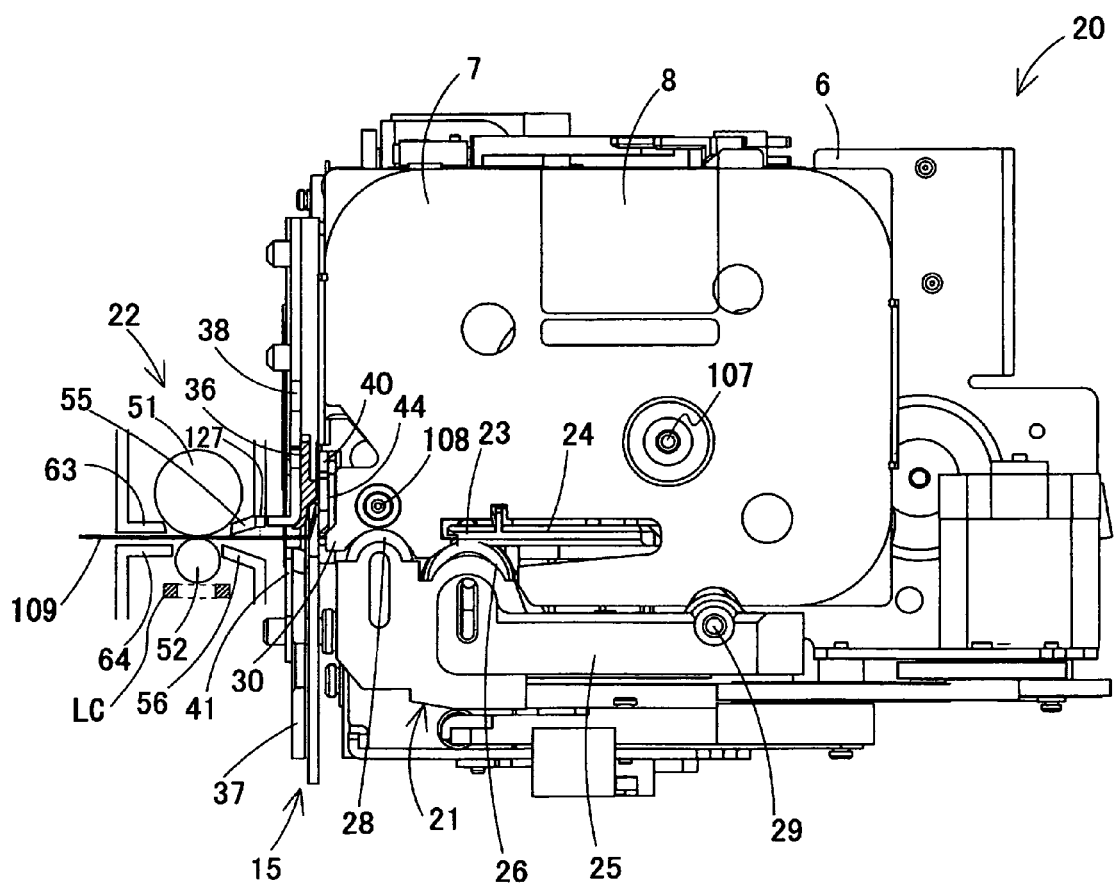
FIG. 4 is a plan view showing the construction of the internal unit shown in FIG. 3.
Figure 5:
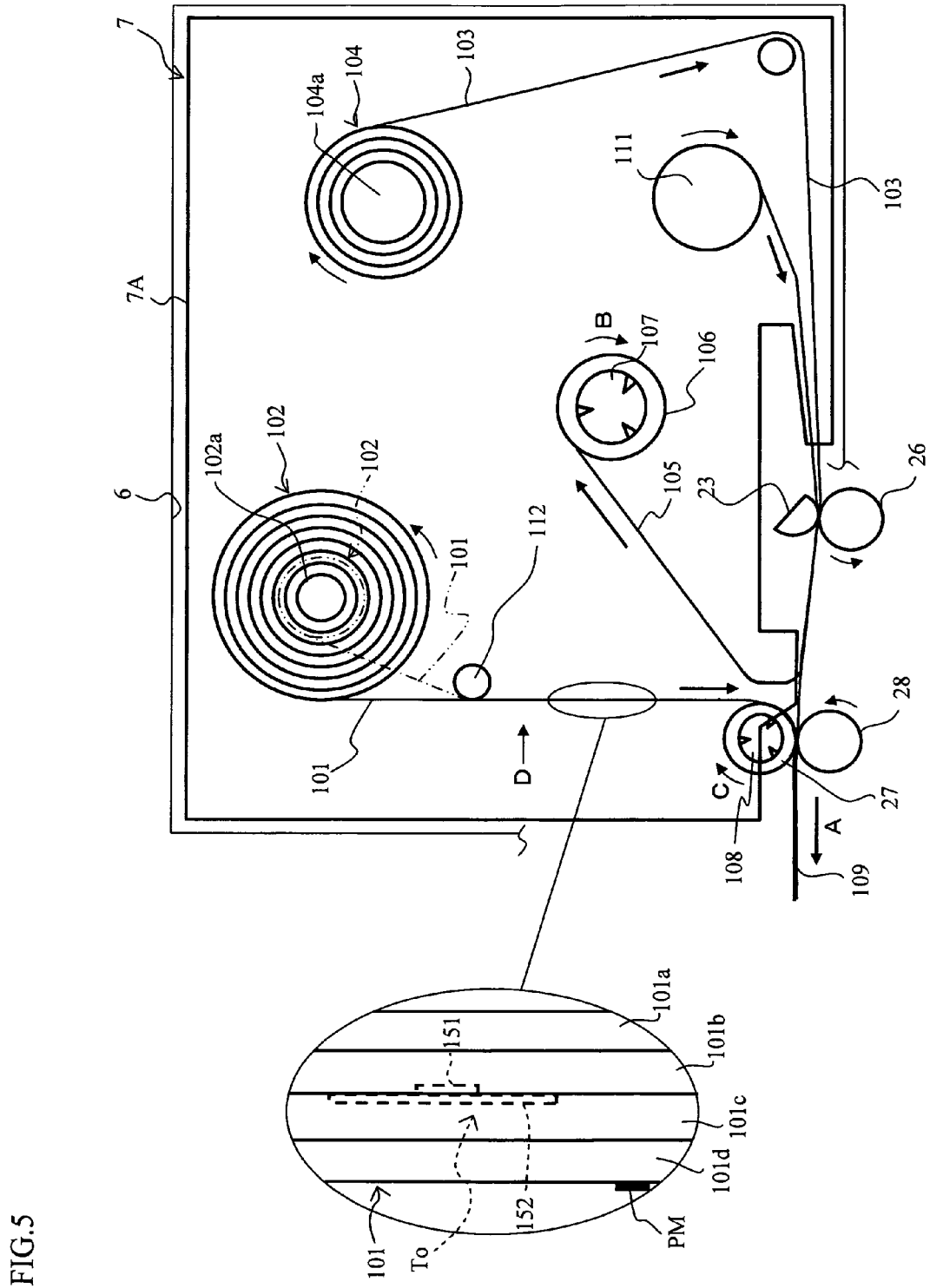
FIG. 5 is an enlarged plan view schematically showing the detailed construction of a cartridge.

FIG. 4 is a plan view showing the construction of the internal unit 20 shown in FIG. 3, and FIG. 5 is an enlarged plan view schematically showing the detailed construction of the cartridge 7.

In FIGS. 4 and 5, the cartridge holder 6 accommodates the cartridge 7 so that the orientation in the width direction of the tag label tape 109 with print discharged from the label discharge port 11 becomes perpendicular.

The cartridge 7 has a housing 7A, a first roll 102 arranged inside the housing 7A and around which a base tape 101 (tag tape; tag medium) having a band-like shape is wound, a second roll 104 (print-receiving tape roll) around which a transparent cover film 103 (print-receiving tape; print-receiving medium) of substantially the same width as the base tape 101 is wound, a ribbon-supply-side roll 111 for paying out an ink ribbon 105 (thermal transfer ribbon; unnecessary when the print-receiving tape used is a thermal tape), a ribbon take-up roller 106 for taking up the ink ribbon 105 after printing, a tape feed roller 27 rotatably supported near a tape discharging portion 30 of the cartridge 7, and a guide roller 112.

The tape feed roller 27, which also functions as a pressure roller, presses the base tape 101 and the cover film 103 into adhesion with each other to thereby prepare the tag label tape 109 with print, and feeds the tag label tape 109 with print in the direction indicated by the arrow A.

The first roll 102 has the base tape 101 wound around a reel member 102a. The base tape 101 has a plurality of RFID circuit elements To successively formed at predetermined equal intervals in the longitudinal direction thereof. The base tape 101 is of a four-layer structure in this example (see the partially enlarged view in FIG. 5). The base tape 101 includes an adhesive layer 101a made of a suitable adhesive material, a colored base film 101b (base layer; antenna base layer) made of PET (polyethylene terephthalate) or the like, an adhesive layer 101c (adhesive layer) made of a suitable adhesive material, and a separation sheet 101d (separation material layer), which are laminated in the stated order from the side wound on the inner side (the right side in FIG. 5) toward the side opposite thereto (the left side in FIG. 5).

On the back side (the left side in FIG. 5) of the base film 101b, a loop antenna 152 (tag-side loop antenna) that is formed in a loop coil-like configuration and performs transmission/reception of information is provided integrally in this example, with an IC circuit part 151 for storing information being formed so as to connect to the loop antenna 152. These components constitute each RFID circuit element To.

The above-mentioned adhesive layer 101a for adhering the cover film 103 later is formed on the front side (the right side in FIG. 5) of the base film 101b. Further, on the back side (the left side in FIG. 5) of the base film 101b, the separation sheet 101d is adhered onto the base film 101b by means of the above-mentioned adhesive layer 101c provided so as to contain the RFID circuit element To.

The separation sheet 101d is peeled off when affixing the finally completed RFID label T having a label-shaped configuration onto a predetermined item or the like, thus allowing adhesion of the RFID label T onto the item or the like by means of the adhesive layer 101c. Predetermined release processing (not shown) is performed on both sides (the adhesive layer 101c side and the side opposite thereto) of the separation sheet 101d so as to prevent firm adhesion of (facilitate separation of) the adhesive layer 101c or the adhesive layer 101a that is adjacent to the separation sheet 101d in the state with the base tape 101 being wound into the first roll 102. Further, on the surface of the separation sheet 101d, a predetermined identifier for feed control (which in this example is a black-painted identifier. Alternatively, this may also be a hole bored by laser machining or the like so as to substantially penetrate the base tape 101, or the like. See FIG. 19C that will be described later) PM is provided at a predetermined position corresponding to each RFID circuit element To (which in this example is a position located on the side further forward with respect to the distal end of the antenna 152 located on the forward side in the feed direction).

It should be noted that at the trailing end portion of the base tape 101 with respect to the feed direction (the winding start end of the base tape 101 in the first roll 102), an identifier PH (end mark) may be provided continuous to the identifier PM as appropriate. In this case, the end mark PH is formed by a hole bored by punching using a Thompson or Victoria type die-cutter, laser machining, or the like so as to substantially penetrate the base tape 101. In the state with the cover film 103 bonded onto the base tape 101, the hole as the end mark PH is covered by the cover film 103 that is transparent on the antenna base layer 101b side.

The second roll 104 has the cover film 103 wound around a reel member 104a. In the cover film 103 paid out from the second roll 104, the ink ribbon 105 driven by the ribbon-supply-side roll 111, which is arranged on the back surface side (that is, the side where the cover film 103 is adhered onto the base tape 101) of the cover film 103, and the ribbon take-up roller 106 is pressed by the print head 23 into abutment with the back surface of the cover film 103.

The ribbon take-up roller 106 and the tape feed roller 27 are rotationally driven in synchronization with a ribbon take-up roller drive shaft 107 and a tape-feed-roller drive shaft 108 as the drive force of a feed motor 119 (see FIG. 15 that will be described later) that is, for example, a pulse motor provided outside the cartridge 7 is transmitted to the ribbon take-up roller drive shaft 107 and the tape-feed-roller drive shaft 108 via a gear mechanism (not shown), respectively.

On the other hand, at this time, the print head 23 equipped with a large number of heater elements is mounted to a head mounting portion 24 provided upright to the cartridge holder 6, and is arranged on the upstream side of the tape feed roller 27 with respect to the feed direction of the cover film 103.

Further, a roller holder 25 is rotatably pivoted by means of a support shaft 29 on the portion of the cartridge holder 6 located forward of the cartridge 7 (the lower side in FIG. 4), and can be switched by means of a switching mechanism between a printing position (abutting position; see FIG. 4) and a release position (separated position). A platen roller 26 and a tape pressure-contact roller 28 are rotatably disposed in the roller holder 25. When the roller holder 25 is switched to the above-mentioned printing position, the platen roller 26 and the tape pressure-contact roller 28 are brought into press contact with the print head 23 and the tape feed roller 27, respectively.

In the above-described construction, the base tape 101 paid out from the first roll 102 is supplied to the tape feed roller 27. On the other hand, in the cover film 103 paid out from the second roll 104, the ink ribbon 105 driven by the ribbon-supply-side roll 111, which is arranged on the back surface side (that is, the side where the cover film 103 is adhered onto the base tape 101) of the cover film 103, and the ribbon take-up roller 106 is pressed by the print head 23 into abutment with the back surface of the cover film 103.

When the cartridge 7 is loaded onto the cartridge holder 6 and the roller holder 25 is moved from the release position to the printing position, the cover film 103 and the ink ribbon 105 are held between the print head 23 and the platen roller 26, and also the base tape 101 and the cover film 103 are held between the tape feed roller 27 and the pressure roller 28.

Then, due to the drive force of the feed motor 119, the ribbon take-up roller 106 and the tape feed roller 27 are rotationally driven in synchronization with each other in the directions indicated by the arrow B and the arrow C, respectively. At this time, the tape-feed-roller drive shaft 108, the pressure roller 28 and the platen roller 26 are coupled together by a gear mechanism (not shown). As the tape-feed-roller drive shaft 108 is driven, the tape feed roller 27, the pressure roller 28, and the platen roller 26 rotate, and the base tape 101 is paid out from the first roll 102 and supplied to the tape feed roller 27 as described above. On the other hand, the cover film 103 is paid out from the second roll 104, and the plurality of heater elements of the print head 23 are energized by a print-head drive circuit 120 (see FIG. 15 that will be described later). As a result, a label print R (see FIG. 18 that will be described later), which corresponds to the information stored in the RFID circuit elements To on the base tape 101 onto which the cover film 103 is to be bonded, is formed on the back surface of the cover film 103. Then, the base tape 101 and the cover film 103 on which printing has been performed as described above are adhered and integrated together by means of the tape feed roller 27 and the pressure roller 28, thus forming the tag label tape 109 with print, which is carried to the outside of the cartridge 7 by the tape discharging portion 30. The ink ribbon 105 for which printing on the cover film 103 has been finished is taken up on the ribbon take-up roller 106 due to the drive of the ribbon take-up roller drive shaft 107.

It should be noted that a tape specific indication portion 8, which indicates, for example, the width, color, and the like of the base tape 101 incorporated in the cartridge 7, is provided in the upper surface of the housing 7A of the cartridge 7. When the cartridge 7 is loaded onto the cartridge holder 6 and the open/close cover 3 is closed, the above-mentioned see-through window 5 and the tape specific indication portion 8 are opposed to each other, thus allowing the tape specific indication portion 8 to be viewed from the outside of the main body 2 through the transparent cover of the see-through window 5. This allows the kind or the like of the cartridge 7 loaded on the cartridge holder 6 to be readily identified visually from the outside of the main body 2 through the see-through window 5.

On the other hand, as described above, the internal unit 20 includes the cutting mechanism 15 and the label discharge mechanism 22. The internal unit 20 further includes a loop antenna LC for performing reading or writing of information via wireless communication with respect to the RFID circuit element To equipped in the base tape 101 (the tag label tape with print after the bonding; the same applies hereinafter). After reading or writing of information from or to the RFID circuit element To is performed by the loop antenna LC with respect to the tag label tape 109 with print produced through the bonding process as described above, the tag label tape 109 with print is cut by the cutting mechanism 15 automatically or by operating the cutter driving button 16 (see FIG. 2), thereby producing the RFID label T. This RFID label T is then further discharged by the label discharge mechanism 22 from the label discharge port 11 formed in the side wall 10 (see FIG. 2).

The cutting mechanism 15 includes a stationary blade 40, a movable blade 41 for performing cutting operation together with the stationary blade 40, a cutter helical gear 42 coupled to the movable blade 41, and a cutter motor 43 coupled to the cutter helical gear 42 through a gear train.

The label discharge mechanism 22 is disposed near the label discharge port 11 provided in the side wall 10 of the main body 2, and functions for forcibly discharging from the label discharge port 11 the tag label tape 109 with print that has been cut by the cutting mechanism 15 (in other words, the RFID label T; the same applies hereinafter). That is, the label discharge mechanism 22 includes a drive roller 51, a pressing roller 52 opposed to the drive roller 51 with the tag label tape 109 with print therebetween, a pressing actuation mechanism portion 53 that is actuated so as to press the pressing roller 52 against the tag label tape 109 with print or to release the pressing, and a discharge drive mechanism portion 54 that operates in synchronization with the pressing release operation of the pressing actuation mechanism portion 53 to rotate the drive roller 51 so that the tag label tape 109 with print is discharged by the drive roller 51.

At this time, first guide walls 55, 56 and second guide walls 63, 64 for guiding the tag label tape 109 with print toward the label discharge port 11 are provided on the inner side of the label discharge port 11 (see FIG. 4). The first guide walls 55, 56 and the second guide walls 63, 64 are respectively formed integrally, and are arranged so as to be spaced apart from each other by a predetermined distance at the discharge position of the tag label tape 109 with print that has been cut by the stationary blade 40 and the movable blade 41.

Further, the label discharge mechanism 22 has a mark sensor 127 (details of which will be described later) that is composed of a known light-emitting diode and a phototransistor and detects the identifier PM provided to the separation sheet 101d of the tag label tape 109 with print.

The pressing actuation mechanism portion 53 includes a roller supporting holder 57, a roller supporting portion 58 that is mounted to the roller supporting holder 57 and retains the pressing roller 52 at its distal end portion, a holder supporting portion 59 that rotatably supports the roller supporting holder 57, a cam 60 that operates in synchronization with the cutting mechanism 15 to drive the pressing actuation mechanism portion 53, and an urging spring 61.

The roller supporting portion 58 is rotatably supported in place so as to sandwich the pressing roller 52 from above and below. When, due to the rotation of the cutter helical gear 42, the roller supporting holder 57 is pivoted counterclockwise (the arrow 71 direction in FIG. 3) about the holder supporting shaft 59 through the cam 60, the pressing roller 52 is pressed against the tag label tape 109 with print. Further, when the cutter helical gear 42 is rotated again, the holder supporting shaft 59 is pivoted in the direction opposite to the above-mentioned direction due to the urging spring 61, thus releasing the pressing roller 52 from the tag label tape 109 with print.

The discharge drive mechanism portion 54 is composed of a tape discharging motor 65 and a gear train 66. After the tag label tape 109 with print is pressed against the drive roller 51 by the pressing roller 52, the tape discharging motor 65 is driven and the drive roller 51 is rotated in the direction for discharging the tag label tape 109 with print, whereby the tag label tape 109 with print is forcibly discharged in the discharging direction.

Figure 6:
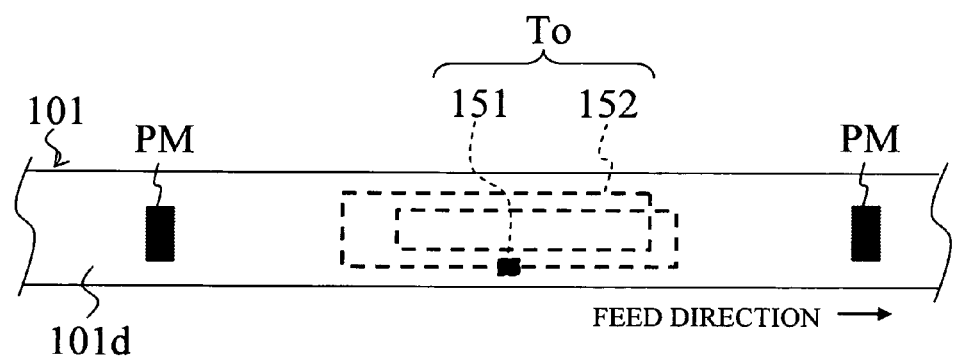
FIG. 6 is a diagram as seen in the direction of the arrow D of FIG. 5, showing the conceptual structure of an RFID circuit element.

FIG. 6 is a conceptual diagram as seen in the direction of the arrow D of FIG. 5, showing the conceptual structure of the RFID circuit element To equipped in the base tape 101 paid out from the first roll 102. In FIG. 6, the RFID circuit element To is composed of the loop antenna 152 that is formed in a loop coil-like configuration and performs transmission/reception of information, and an IC circuit part 151 that is connected to the loop antenna 152 and stores information. In the base tape 101, the above-mentioned identifier PM is provided in an associated manner at a predetermined distance from the RFID circuit element To with respect to the feed direction.

Figure 7A:
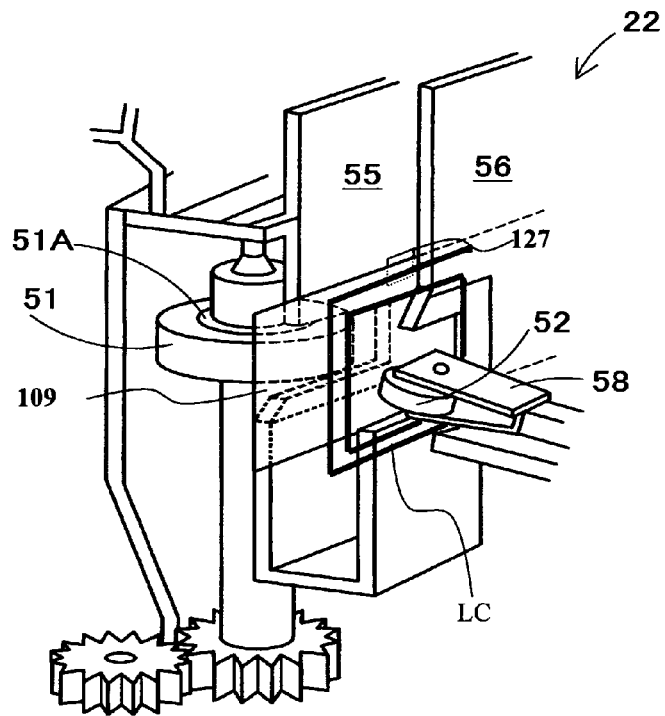
FIG. 7A is a partially extracted perspective view showing the detailed construction of the main potion of a label discharge mechanism.
Figure 7B:
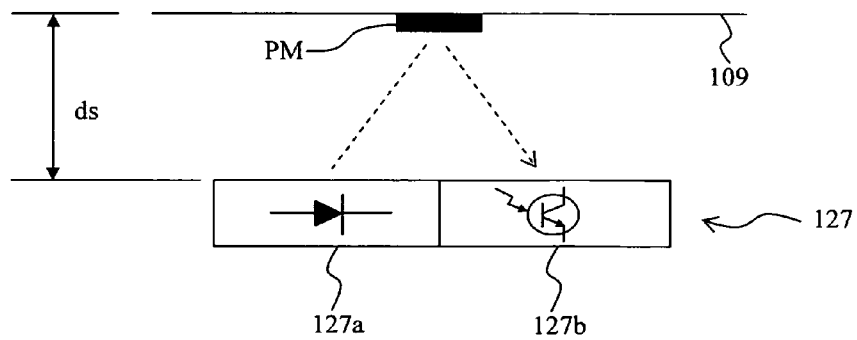
FIG. 7B is a perspective view showing the conceptual structure of the sensor shown in FIG. 7A.

FIG. 7A is a partially extracted perspective view showing the detailed construction of the main portion of the label discharge mechanism 22. FIG. 7B is a drawing conceptually showing the structure of the mark sensor 127 shown in FIG. 7A. In FIG. 7A, as described above, in addition to the mark sensor 127 for detecting the identifier PM, the pressing roller 52 is provided so as to be movable with respect to the feed path of the tag label tape 109 with print. Further, the first guide walls 55, 56 are cutout at their vertically midway portions, with the drive roller 51 being provided to the first guide wall 55 so as to face the discharge position of the tag label tape 109 with print from the cutout portion. It should be noted that the drive roller 51 has a roller cutout portion 51A formed by a concentric groove on its upper surface.

In the other first guide wall 56, the pressing roller 52 is supported on the roller supporting portion 58 of the pressing actuation mechanism portion 53 so as to face the discharge position of the tag label tape 109 with print from the cutout portion. It should be noted that FIG. 7A shows the case when the pressing roller 52 is in the release position. Accordingly, when the pressing roller 52 is brought into a regulating position (a pressure contact position where the pressing roller 52 abuts the tape 109 in this case) for regulating the feed path of the tag label tape 109 with print to be within a predetermined range, the roller supporting portion 58 of the pressing actuation mechanism portion 53 moves in the direction toward the feed path of the tag label tape 109 with print, and the pressing roller 52 is inserted into the cutout portion of the first guide wall 56 so as to approach the feed path of the tag label tape 109 with print.

The loop antenna LC (whose arranging position is conceptually shown in FIG. 7A) is arranged near the pressing roller 52 with the pressing roller 52 being positioned at the center in the radial direction thereof (on the inner side in the radial direction; more specifically, on the coil center axis). Access to (reading of information from or writing of information to) the RFID circuit element To equipped in the tag label tape 109 with print is performed by magnetic induction (electromagnetic induction, magnetic coupling, and other such non-contact induction method performed via an electromagnetic field). It should be noted that while in this example the loop antenna LC is arranged so that the pressing roller 52 is positioned at the center in the radial direction of the loop antenna LC, this should not be construed restrictively; the loop antenna LC may be arranged so that the pressing roller 52 is positioned on the outer side in the radial direction. Further, the loop antenna LC may be arranged not on the pressing roller side 52 with respect to the feed path of the tag label tape 109 with print but on the drive roller 51 side.

Further, the mark sensor 127, which can detect the identifier PM (see FIG. 6 or the like) provided to the separation sheet 101d of the tag label tape 109 with print (base tape 101) in correspondence with the position of each RFID circuit element, is provided on the upstream side of the drive roller 51 with respect to the feed direction (in other words, between a half-cutter 34 that will be described later and the loop antenna LC).

As shown in FIG. 7B, the mark sensor 127 is, for example, a known reflection-type photoelectric sensor composed of a light projector 127a consisting of a light-emitting diode, and a light receiver 127b consisting of a phototransistor. If the above-mentioned black-painted identifier PM is present between the light projector 127a and the light receiver 127b, the light from the light projector 127a is absorbed by the identifier PM and the amount of light that returns to the light receiver 127b decreases, so the control output from the light receiver 127b is inverted, whereby the presence of the identifier PM is detected. It should be noted that the first guide wall 56 opposed to the mark sensor 127 is formed such that the surface of the first guide wall 56 is of a color that does not reflect the light from the light projector or is inclined so that the light receiver does not receive the reflection light.

Figure 8:
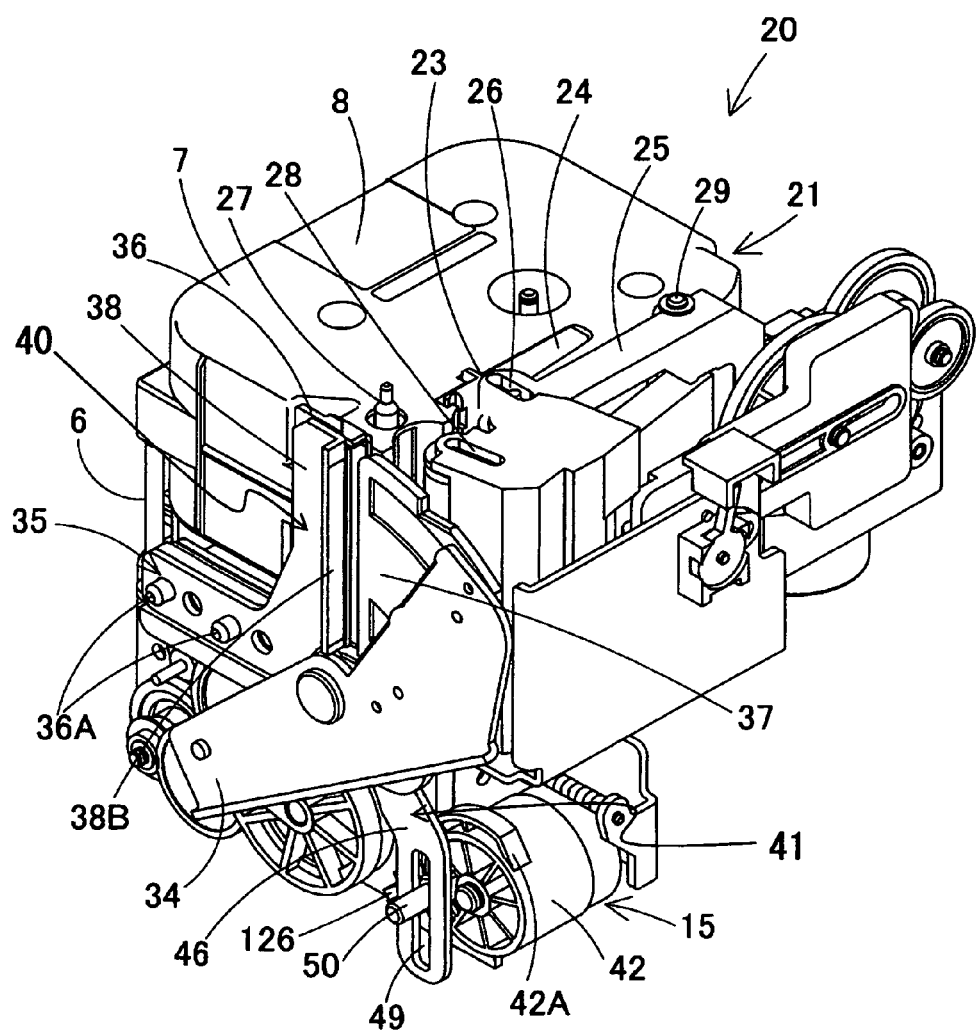
FIG. 8 is a perspective view showing the outward appearance of the internal unit, with the label discharge mechanism removed from the construction shown in FIG. 3.

FIG. 8 is a perspective view showing the outward appearance of the internal unit 20 with the label discharge mechanism 22 removed from the construction shown in FIG. 3.

In FIG. 8, the cutter helical gear 42 is provided with a boss 50 in the form of a projection, and the boss 50 is inserted into an elongated hole 49 of the movable blade 41 (see also FIG. 11 or 9 that will be described later). Further, on the downstream side of the stationary blade 40 and the movable blade 41 along the tape discharge direction, the half-cut unit 35 is mounted so as to be located between the stationary blade 40 and the movable blade 41, and the first guide walls 55, 56 (see FIG. 4).

The half-cut unit 35 is composed of a pad 38 arranged in alightment with the stationary blade 40, the half-cutter 34 opposed to the pad 38 and arranged on the movable blade 41 side, a first guide portion 36 arranged in alignment with the stationary blade 40 between the stationary blade 40 and the pad 38, and a second guide portion 37 opposed to the first guide portion 36 and arranged in alignment with the movable blade 41 (see also FIG. 11 that will be described later). The first guide portion 36 and the second guide portion 37 are formed integrally, and mounted to a side plate 44 (see FIG. 4) together with the stationary blade 40 by means of a guide fixing portion 36A provided at a position corresponding to a fixing hole 40A of the stationary blade 40.

A half-cutter motor 129 (not shown; see FIG. 15 that will be described later) is provided to pivot the half-cutter 34 about a predetermined pivot point (not shown). Although its detailed illustration is omitted, in the drive mechanism of the half-cutter 34 using the half-cutter motor 129, for example, a crank member equipped with a pin is connected to the half-cutter motor 129 via a gear train, and the pin of the crank member is engaged with an elongated hole bored in the half-cutter 34 so that when the half-cutter motor 129 rotates, the half-cutter 34 rotates due to the pin of the crank member. Accordingly, as a result, the half-cutter 34 moves in a direction crossing the feed direction of the tag label tape 109 with print (substantially orthogonal direction in this example). That is, as the motor 129 rotates in forward, the half-cutter 34 is pivoted in the cutting direction with respect to the tag label tape 109 with print into a regulating position for regulating the feed path of the tag label tape 109 with print (to be within a predetermined range)(in this case, the half-cutter 34 abuts the tape 109), and as the motor 129 rotates in reverse, the half-cutter 34 is pivoted in the direction away from the tag label tape 109 with print, into a release position where the half-cutter 34 is spaced apart from the feed path of the tag label tape 109 with print.

The pad 38 is bent so that its end portion opposed to the tag label tape 109 with print discharged from the tape discharge portion 30 becomes parallel to the tape, thus forming a receiving surface 38B. At this time, as described above, the tag label tape 109 with print is of a five-layer structure obtained by bonding together the cover film 103 and the base tape 101 that has a four-layer structure consisting of the adhesive layer 101a, the base film 101b, the adhesive layer 101c, and the separation sheet 101d (see also FIG. 19 that will be described later). Then, by pressing the half-cutter 34 against the receiving surface 38B using the drive force of the half-cutter motor 129 as mentioned above, the cover film 103, the adhesive layer 101a, the base film 101b, and the adhesive layer 101c are cut off from the tag label tape 109 with print located between the half-cutter 34 and the receiving surface 38B, and only the separation sheet 101d is left uncut, whereby half-cut lines HC (see FIG. 18 or the like that will be described later) are formed substantially along the tape width direction. Preferably, after the half-cutter 34 comes into abutment against the receiving surface 38B, an overload is prevented from occurring in the half-cutter motor 129 by means of, for example, a sliding clutch (not shown) that is interposed in the gear train in the case of the above-described construction. The receiving surface 38B also serves to guide the tag label tape 109 with print toward the label discharge port 11 together with the first guide portions 55, 56.

Figure 9:
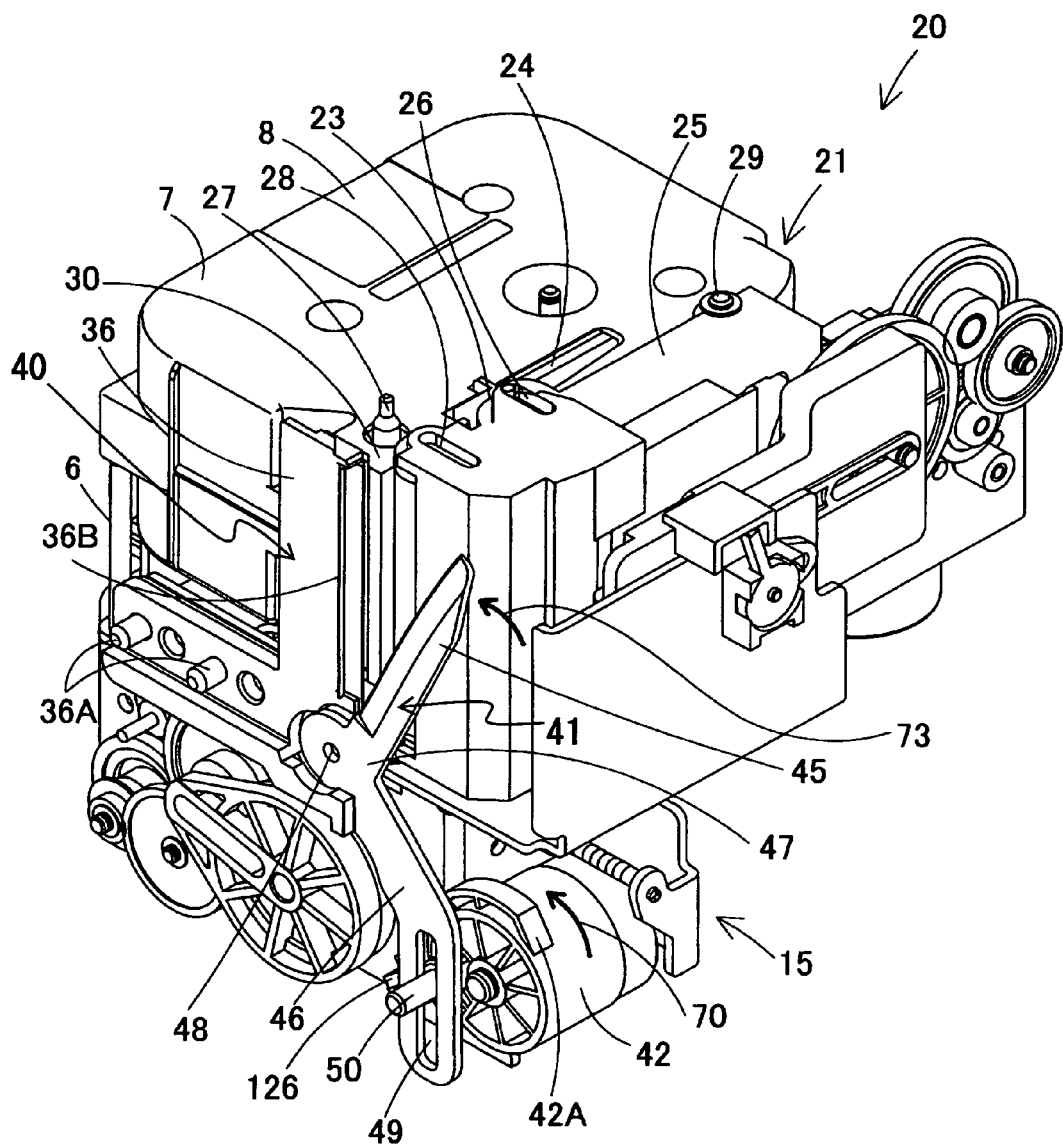
FIG. 9 is a perspective view showing the outward appearance of a cutting mechanism, with a half-cutter removed from the internal unit.
Figure 10:
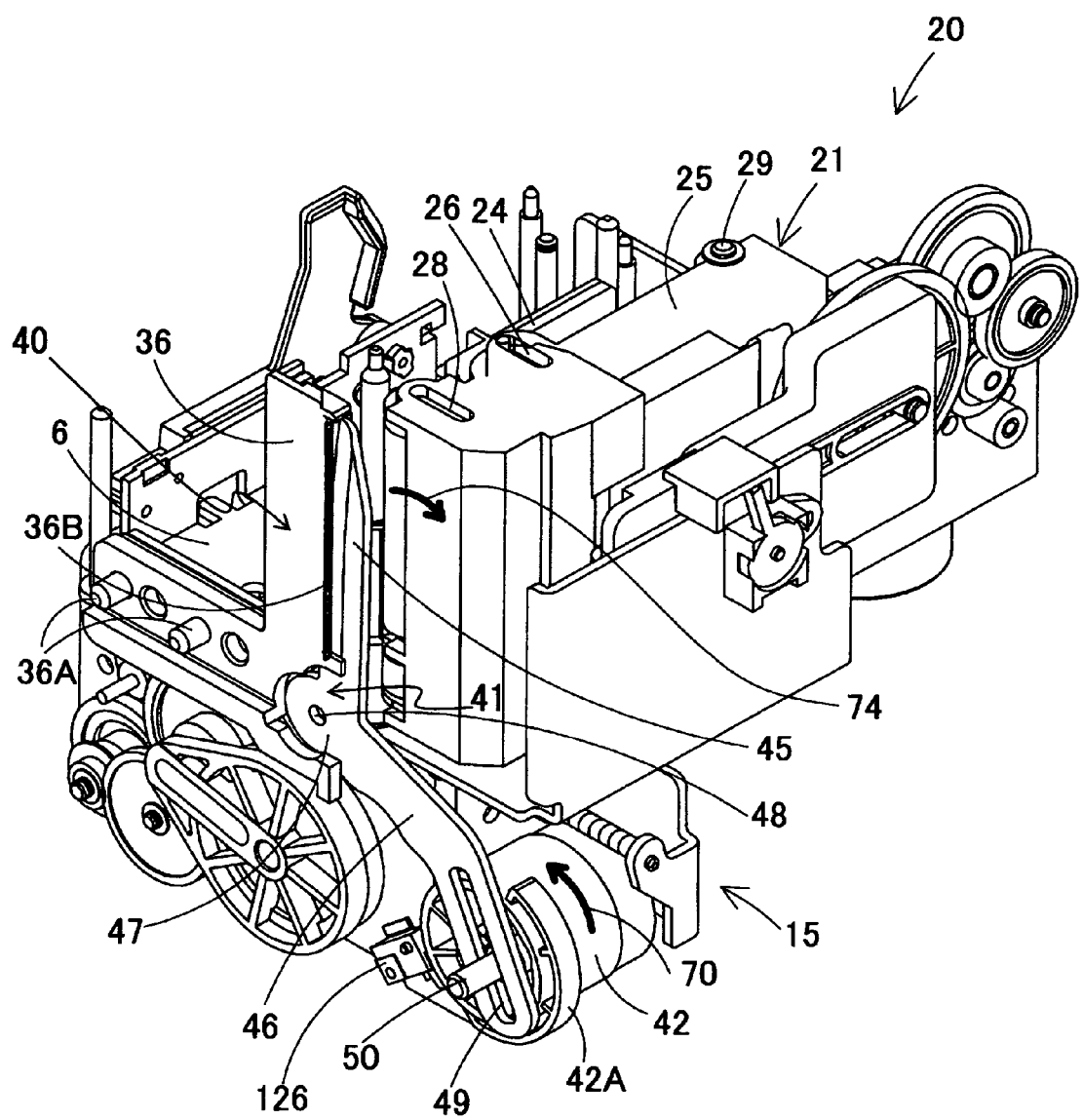
FIG. 10 is a perspective view showing the outward appearance of the cutting mechanism, with the half-cutter removed from the internal unit.

FIGS. 9 and 10 are perspective views each showing the outward appearance of the cutting mechanism 15 with the half-cutter 34 removed from the internal unit 20.

In FIGS. 9 and 10, in the cutting mechanism 15, when the cutter helical gear 42 is rotated by the cutter motor 43 (see FIG. 3), the movable blade 41 swings about a shaft hole 48 due to the boss 50 and the elongated hole 49, thereby cutting the tag label tape 109 with print.

That is, first, when the boss 50 of the cutter helical gear 42 is located on the inner side (the left side in FIG. 9), the movable blade 41 is positioned away from the stationary blade 40 (hereinafter, this state will be referred to as the initial state; see FIG. 9). Then, when the cutter motor 43 is driven in this initial state, and the cutter helical gear 42 rotates counterclockwise (the arrow 70 direction), the boss 50 moves to the outer side, and the movable blade 41 pivots counterclockwise (the arrow 73 direction) about the shaft hole 48 to cut the tag label tape 109 with print together with the stationary blade 40 fixed to the internal unit 20 (hereinafter, this state will be referred to as the cut state; see FIG. 10).

After the tag label tape 109 with print is cut in this way to produce an RFID label, it is necessary to return the movable blade 41 to the initial state in order to cut the next tag label tape 109 with print that is fed. Accordingly, the cutter motor 43 is driven again to rotate the cutter helical gear 42 counterclockwise (the arrow 70 direction), so the boss 50 is moved to the inner side again and the movable blade 41 pivots clockwise (the arrow 74 direction), thus separating the movable blade 41 away from the stationary blade 40 (see FIG. 9). This makes the movable blade 41 ready for cutting the next tag label tape 109 with print to be cut and fed by the cartridge 7.

It should be noted that at this time, a cutter helical gear cam 42A is provided on the cylindrical outer wall of the cutter helical gear 42. When the cutter helical gear 42 is rotated by the cutter motor 43, a micro switch 126 that is provided adjacent to the cutter helical gear 42 is switched from the OFF state to the ON state through the operation of the cutter helical gear cam 42A. The cut state of the tag label tape 109 with print can be thus detected.

Figure 11:
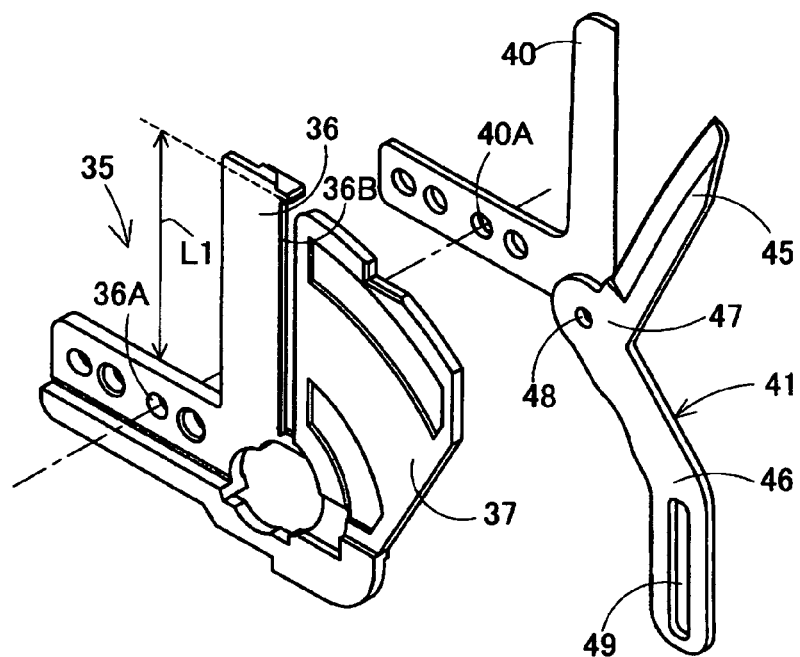
FIG. 11 is a perspective view showing the detailed construction of a movable blade and stationary blade together with a half-cut unit.
Figure 12:
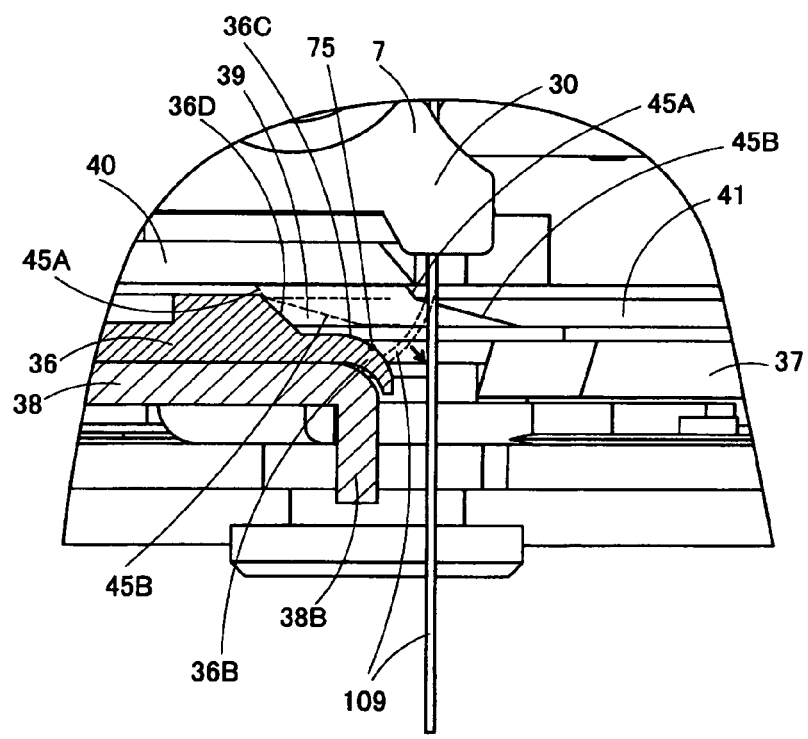
FIG. 12 is a partial enlarged sectional view of the detailed construction of the movable blade and stationary blade.

FIG. 11 is a perspective view showing the detailed construction of the movable blade 41 and stationary blade 40 together with the half-cut unit 35. FIG. 12 is a partial enlarged sectional view of FIG. 11. In FIGS. 11 and 12, the stationary blade 40 is fixed to the side plate 44 (see FIG. 4), which is provided upright on the left side of the cartridge holder 6 inside the cutting mechanism 15, through the fixing hole 40A by means of a screw or the like.

The movable blade 41 is substantially V-shaped and includes a blade portion 45 provided at the cutting part, a handle portion 46 located opposite to the blade portion 45, and a bent portion 47. The shaft hole 48 is provided in the bent portion 47, and the movable blade 41 is supported onto the side plate 44 at the shaft hole 48 so as to be pivotable about the bent portion 47. Further, the elongated hole 49 is formed in the handle potion 46 on the side opposite to the blade portion 45 provided at the cutting part of the movable blade 41. The blade portion 45 is formed by a two-step blade whose blade surface includes two inclined surfaces of different inclination angles, namely a first inclined surface 45A and a second inclined surface 45B, which cause the thickness of the blade portion 45 to gradually decrease.

On the other hand, an end portion 36B of the first guide portion 36 of the above-described half-cut unit 35 which is opposed to the discharged tag label tape 109 with print is projected along the receiving surface 38B formed at an end portion of the pad 38, and is bent in the discharging direction of the tag label tape 109 with print. At the end portion 36B of the first guide portion 36, a contact surface 36C with respect to the tag label tape 109 with print discharged from the cartridge 7 has a gently curved surface with respect to the discharge direction of the tag label tape 109 with print.

Since the end portion 36B of the first guide portion 36 is projected and the contact surface 36C is formed as a curved surface, the leading end portion of the tag label tape 109 with print curled at a predetermined curvature or more first comes into abutment with the contact surface 36C of the first guide portion 36. At this time, when the leading end portion of the tag label tape 109 with print abuts a position on the downstream side (the lower side in FIG. 12) in the discharge direction of the tag label tape 109 with print with respect to a boundary point 75 on the contact surface 36C of the first guide portion, the leading end portion of the tag label tape 109 with print moves to the downstream side along the curved surface, whereby the tag label tape 109 with print is guided toward the label discharge port 11 without entering between the stationary blade 40 and the first guide portion 36 or the pad 38.

Further, the first guide portion 36 is formed so that its guide width L1 (see FIG. 11) corresponding to the feed path of the tag label tape 109 with print is wider than the maximum width of the tag label tape 109 with print to be loaded (36 mm in the embodiment), and an inner surface 36D is formed so as to extend continuous to the contact surface 36C. The inner surface 36D is formed so as to be opposed to the first and second inclined surfaces 45A, 45B (details of which will be described later) of the movable blade 41. When performing cutting, the first and second inclined surfaces 45A, 45B of the movable blade 41 partially abut the inner surface 36D (see FIG. 12). Since the blade portion of the movable blade 41 is formed by a two-step blade as described above, upon cutting the tag label tape 109 with print by the movable blade 41, a gap 39 is formed between each of the contact surface 36C, which corresponds to the end portion of the first guide portion 36, and the inner surface 36D, and the second inclined surface 45B of the movable blade 41 (see FIG. 12).

Figure 13:
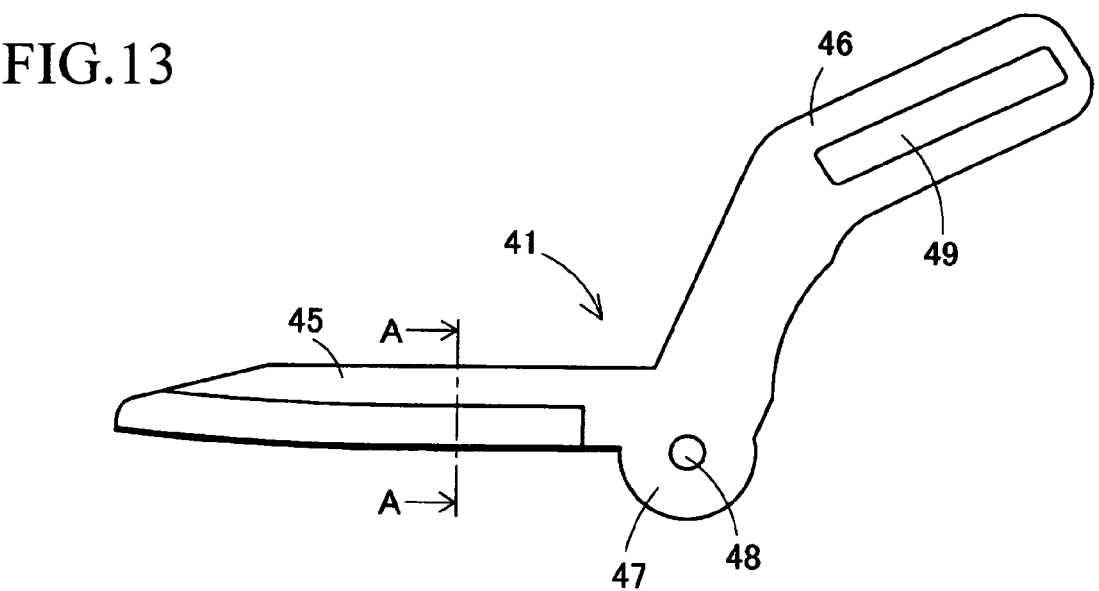
FIG. 13 is a front view showing the outward appearance of the movable blade.
Figure 14:
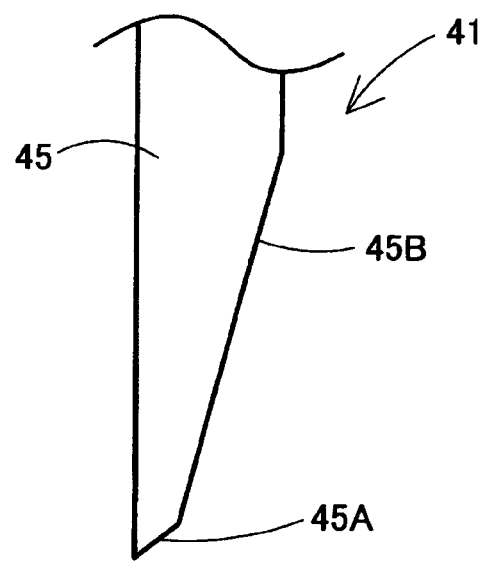
FIG. 14 is a cross-sectional view taken along the line A-A of FIG. 13.

FIG. 13 is a front view showing the outward appearance of the movable blade 41, and FIG. 14 is a cross-sectional view taken along the line A-A of FIG. 13.

In FIGS. 13 and 14, the angle formed between the first inclined surface 45A and the back surface of the blade portion 45 on the side opposite to the first inclined surface 45A is 50 degrees in this embodiment.

Figure 15:
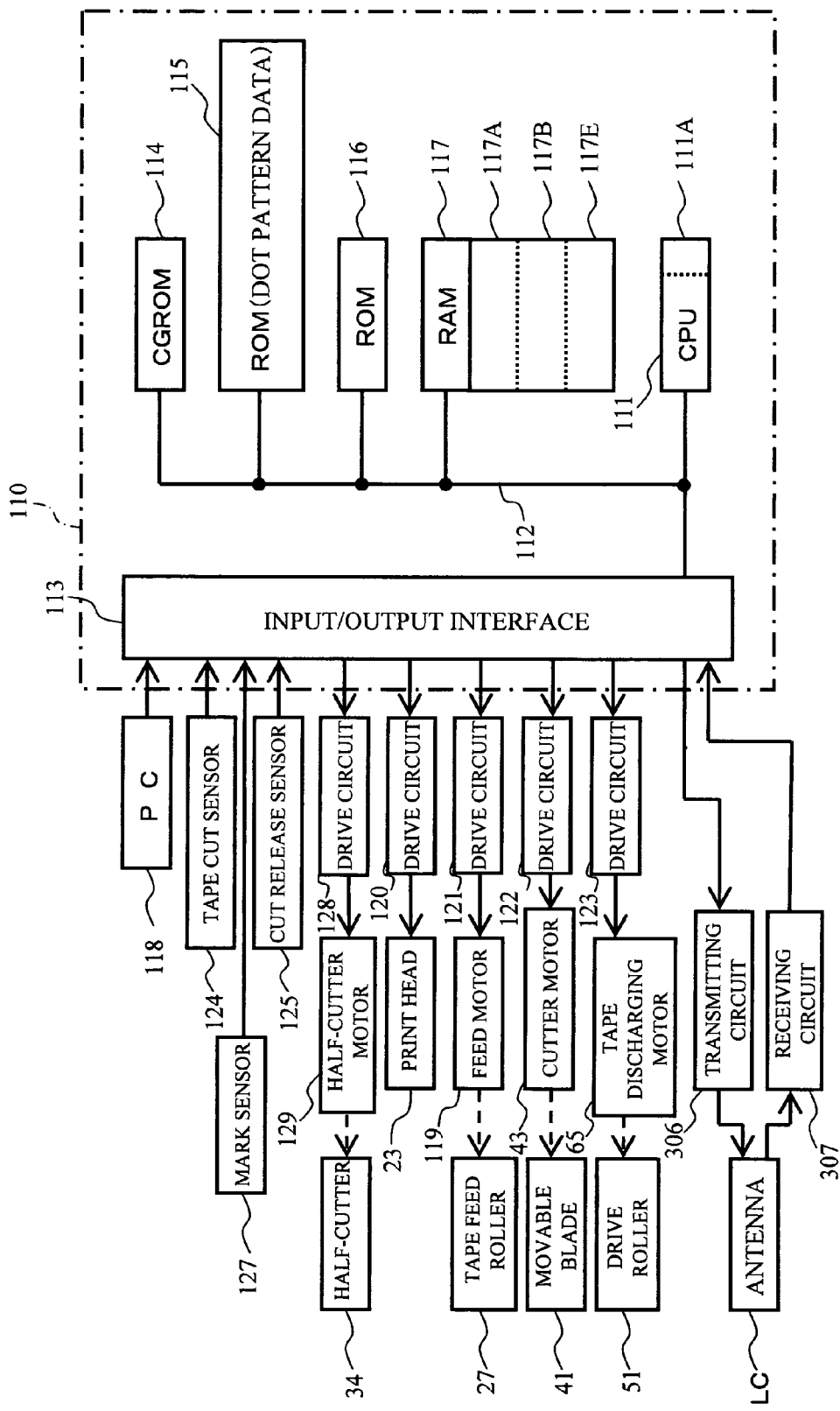
FIG. 15 is a functional block diagram showing the control system of the tag-label producing device.

FIG. 15 is a functional block diagram showing the control system of the tag-label producing device 1 according to this embodiment. In FIG. 15, a control circuit 110 is arranged on a control board (not shown) of the tag-label producing device 1.

The control circuit 110 includes a CPU 111 that has a timer 111A provided therein and controls respective devices, an input/output interface 113 that is connected to the CPU 111 through a data bus 112, a CGROM 114, ROMs 115, 116, and a RAM 117.

In the CGROM 114, dot pattern data for display is stored in correspondence with code data with respect to each of a large number of characters.

In the ROM (dot pattern data memory) 115, dot pattern data is stored with respect to each of a large number of characters for printing characters such as alphabet letters or signs while being classified into respective typefaces (gothic type typeface, Mincho typeface, and the like) in correspondence with the size of the print letter for each typeface. Graphic pattern data for printing graphic images including grayscale expressions are also stored in the ROM 115.

The ROM 116 stores a print drive control program for driving the print head 23, the feed motor 119, and the tape discharging motor 65 by reading data of a print buffer in correspondence with code data of characters such as letters or numerals input from the PC 118, a pulse number determining program for determining the number of pulses corresponding to the amount of energy for forming each print dot, a cutting drive control program for driving the feed motor 119 upon the completion of printing to feed the tag label tape 109 with print to the cutting position, and driving the cutter motor 43 to cut the tag label tape 109 with print, a tape discharging program for forcibly discharging the cut tag label tape 109 with print (=RFID label T) through the tape discharge port 11 by driving the tape discharging motor 65, and other various programs necessary for controlling the tag-label producing device 1. The CPU 111 performs various computations on the basis of these various programs that are stored in the ROM 116.

The RAM 117 is provided with a text memory 117A, a print buffer 117B, a parameter storing area 117E, and the like. The text memory 117A stores document data input from the PC 118. The print buffer 117B stores as dot pattern data a plurality of dot patterns for printing letters, signs, and the like, or the number of applied pulses representing the amount of energy for forming each dot. The print head 23 performs dot printing in accordance with the dot pattern data stored in the print buffer 117B. Various computation data are stored in the parameter storing area 117E.

Connected to the input/output interface 113 are the PC 118, the print-head drive circuit 120 for driving the print head 23, a feed-motor drive circuit 121 for driving the feed motor 119, a cutter-motor drive circuit 122 for driving the cutter motor 43, a half-cutter motor drive circuit 128 for driving the half-cutter motor 129, a tape-discharging-motor drive circuit 123 for driving the tape discharging motor 65, a transmitting circuit 306 that generates a carrier wave for making access to (performing reading/writing with respect to) the RFID circuit element To via the loop antenna LC, and modulates the carrier wave on the basis of a control signal input from the control circuit 110, a receiving circuit 307 that performs demodulation of a reply signal received from the RFID circuit element To via the loop antenna LC, and outputs the resultant to the control circuit 110, a tape cut sensor 124 and a cut release sensor 125.

In the control system built around the control circuit 110 as described above, upon input of letter data or the like via the PC 118, the text (document data) thereof is sequentially stored into the text memory 117A, and the print head 23 is driven via the drive circuit 120; the respective heater elements are selectively heated and driven in correspondence with printing dots of one line to thereby perform printing of dot pattern data stored in the print buffer 117B, and in synchronization with this, the feed motor 119 performs tape feed control via the drive circuit 121. Further, the transmitting circuit 306 performs modulation control of the carrier wave on the basis of a control signal from the control circuit 110, and the receiving circuit 307 performs processing on a signal demodulated on the basis of a control signal from the control circuit 110.

The tape cut sensor 124 and the cut release sensor 125 are each composed of the cutter helical gear cam 42A and the micro switch 126 that are provided on the cylindrical outer wall of the cutter helical gear 42 (see FIG. 9 or 10). More particularly, when the cutter helical gear 42 is rotated by the cutter motor 43, the micro switch 126 is switched from OFF to ON through the operation of the cutter helical gear cam 42A, thus detecting the completion of cutting of the tag label tape 109 with print by the movable blade 45. The above-mentioned process constitutes the tape cut sensor 124. When the cutter helical gear 42 is further rotated, the micro switch 126 is switched from ON to OFF through the operation of the cutter helical gear cam 42A, thus detecting the return of the movable blade 45 to the release position. The above-mentioned process constitutes the cut release sensor 125.

Figure 16:
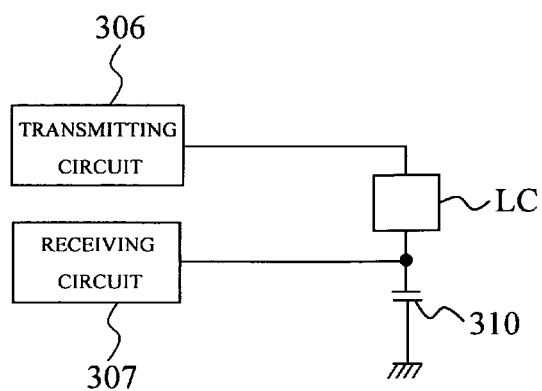
FIG. 16 is a simplified circuit diagram showing the circuit configuration of the connecting portion between a transmitting circuit, a receiving circuit, and a loop antenna.

FIG. 16 is a simplified circuit diagram showing the circuit configuration of the connecting portion between each of the transmitting circuit 306 and receiving circuit 307 with the loop antenna LC. In FIG. 16, the transmitting circuit 306 is connected to the device-side loop antenna LC, and the receiving circuit 307 is connected to a capacitor 310 that is connected in series with the device-side loop antenna LC.

Figure 17:
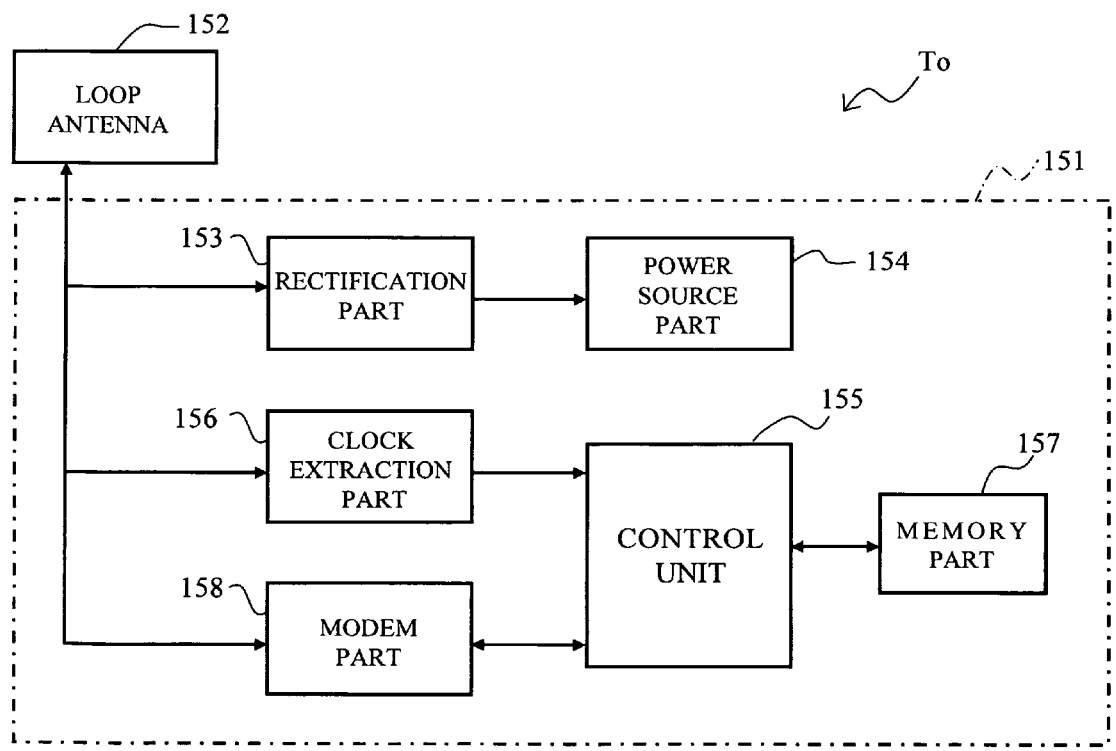
FIG. 17 is a functional block diagram showing the functional configuration of the RFID circuit element.

FIG. 17 is a functional block diagram showing the functional configuration of the RFID circuit element To. In FIG. 17, the RFID circuit element To includes the loop antenna 152 for performing transmission/reception of a signal to/from the loop antenna LC on the tag-label producing device 1 side by magnetic induction in a non-contact manner, and the IC circuit part 151 connected to the loop antenna 152.

The IC circuit part 151 includes a rectification part 153 for rectifying the carrier wave received by the loop antenna 152, a power source part 154 for storing the energy of the carrier wave rectified by the rectification part 153 to use the stored energy as a drive power source, a clock extraction part 156 for extracting a clock signal from the carrier wave received by the loop antenna 152 and supplying it to a control unit 155, a memory part 157 capable of storing a predetermined information signal, a modem part 158 connected to the loop antenna 152, and the control unit 155 for controlling the actuation of the RFID circuit element To via the rectification part 153, the clock extraction part 156, the modem part 158, and the like.

The modem part 158 performs demodulation of a communication signal from the loop antenna LC of the tag-label producing device 1 received by the loop antenna 152, and on the basis of a reply signal from the control unit 155, modulates the carrier wave received by the loop antenna 152 and transmits it again as a reflected wave from the loop antenna 152.

The control unit 155 executes a basic control, such as interpreting the received signal demodulated by the modem part 158, generating a reply signal on the basis of an information signal stored in the memory part 157, and returning the reply signal by the modem part 158.

Figure 18A:
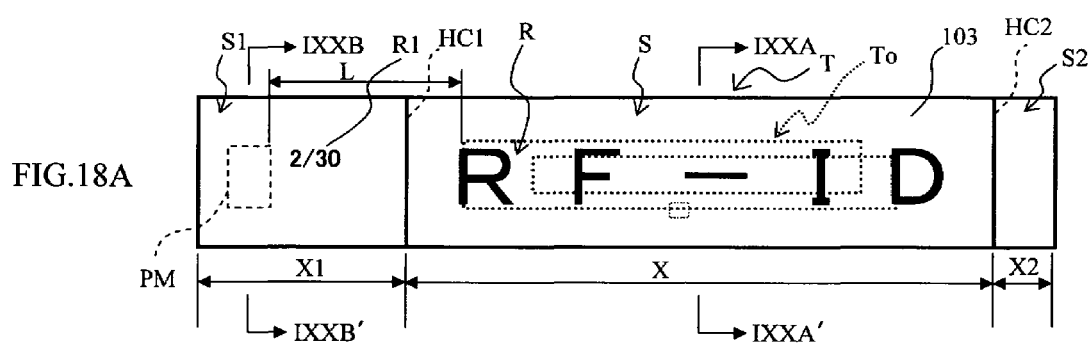
FIG. 18A is a top view showing an example of the outward appearance of an RFID label T.
Figure 18B:
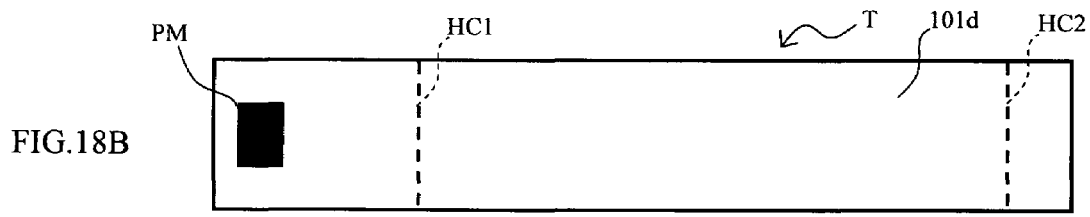
FIG. 18B is a bottom view showing an example of the outward appearance of an RFID label T.
Figure 19A:
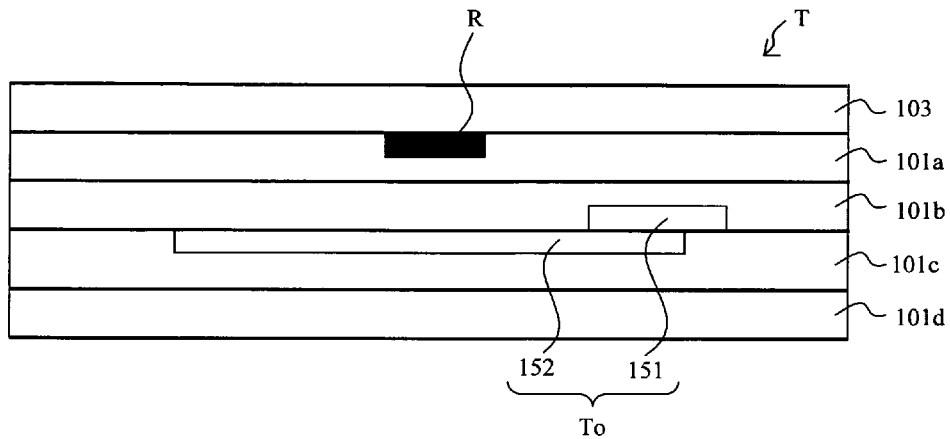
FIG. 19A is a view obtained by rotating the cross-sectional views, which is taken along the lines IXXA-IXXA' of FIG. 18, counterclockwise by 90°.
Figure 19B:
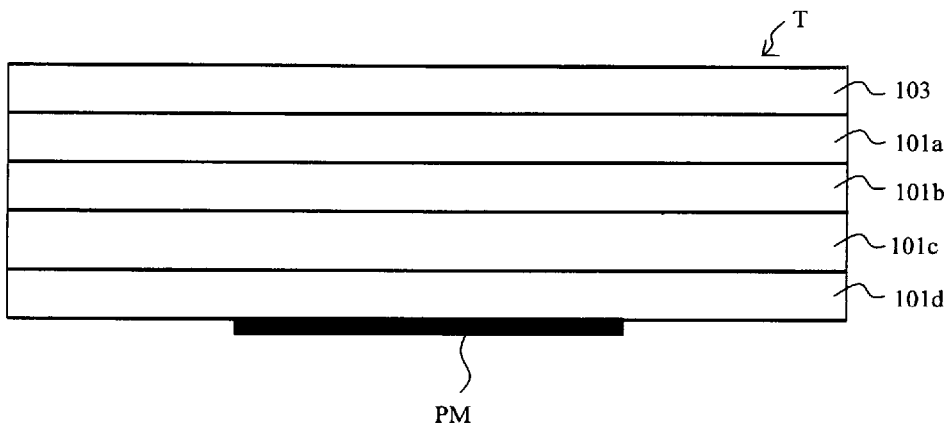
FIG. 19B is a view obtained by rotating the cross-sectional views, which is taken along the lines IXXB-IXXB' of FIG. 18, counterclockwise by 90°.
Figure 19C:
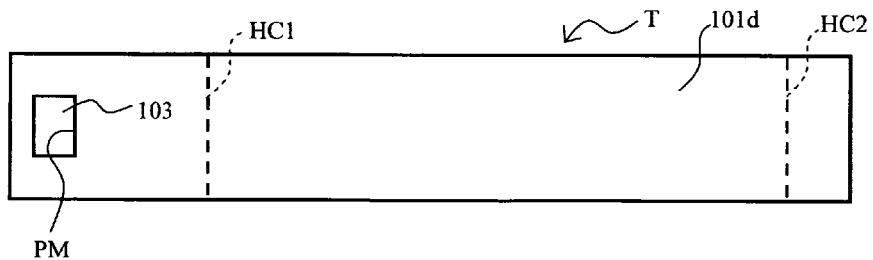
FIG. 19C is a view showing an example of the outward appearance of an RFID label T.

FIGS. 18A and 18B are views each showing an example of the outward appearance of the RFID label T formed after completing writing (or reading) of information to the RFID circuit element To and cutting of the tag label tape 109 with print. FIG. 18A is a top view, and FIG. 18B is a bottom view. Further, FIG. 19A is a view obtained by rotating the cross-sectional view taken along the line IXXA-IXXA' in FIG. 18 counterclockwise by 90°. FIG. 19B is a view obtained by rotating the cross-sectional view taken along the line IXXB-IXXB' in FIG. 18 counterclockwise by 90°.

In FIGS. 18A, 18B, 19A, and 19B, as described above, the RFID label T is of a five-layer structure with the cover film 103 added to the four-layer structure shown in FIG. 5. The five layers consist of the cover film 103, the adhesive layer 101a, the base film 101b, the adhesive layer 101c, and the separation sheet 101d that are laminated in the stated order from the cover film 103 side (the upper side in FIG. 19) toward the side opposite thereto (the lower side in FIG. 19). Further, as described above, the RFID circuit element To including the loop antenna 152 provided on the back side of the base film 101b is equipped inside each of the base film 101b and adhesive layer 101c, and the label print R (in this example, the letters "RF-ID" indicating the kind of the RFID label T) corresponding to information stored in the RFID circuit element To, or the like is printed on the back surface of the cover film 103.

As has been already described above, the half-cut lines HC (half-cutting part; this example includes two half-cut lines HC, a front half-cut line HC1 and a rear half-cut line HC2, details of which will be described later) are formed by the half-cutter 34 substantially along the tape width direction in the cover film 103, the adhesive layer 101a, the base film 101b, and the adhesive layer 101c. The area of the cover film 103 sandwiched between these half-cut lines HC1, HC2 serves as a print area S where the label print R is printed, and the areas on both sides of the print area S across the half-cut lines HC1, HC2 with respect to the tape length direction respectively serve as a front margin area S1 and a rear margin area S2. In the tag-label producing device 1, using a pair of base tape 101 and cover film 103 as described above, a plurality of RFID labels T are sequentially produced from the tag label tape 109 with print obtained by bonding the base tape 101 and the cover film 103 together. In this embodiment, information on the remaining number of RFID circuit elements To in the base tape 101 (in this example, information on the sequential order of an RFID circuit element To relating to the RFID label T. That is, usage number information indicating that the RFID circuit element To being used is the second RFID circuit element To out of 30 RFID circuit elements To equipped in the base tape 101) R1 is printed in the front margin area S1 of the cover film 103 of each RFID label T.

It should be noted that the total length of the label is set to a predetermined value in advance (fixedly at a value substantially equal to the arrangement pitch of the RFID circuit elements To, for example). The dimension (the distance from the leading end of the tape to the half-cut line HC1) X1 of the front margin area with respect to the tape length direction is also set to a predetermined value (fixedly in this example) in advance. The dimension X (the distance from the half-cut line HC1 to the half-cut line HC2) of the print area S with respect to the tape length direction is also set so as to be variable in accordance with the content or form (for example, the number of letters, font, or the like) of the label print R. The dimension (the distance from the half-cut line HC2 to the rear end of the tape) X2 of the rear margin area with respect to the tape length direction is set so as to be variable in accordance with the value of the dimension X of the print area S (however, as will be described later, there are cases where the rear half-cut line HC2 is not provided). Further, the above-mentioned identifier PM remains in the separation sheet 101d, and the distance from the leading end of the identifier PM in the tape feed direction to the leading end of the RFID circuit element To in the tape feed direction, which is offset with respect to the identifier PM, is set to a predetermined value L. It should be noted that instead of providing a black-painted marking as shown in each of FIGS. 19A and 19B as the identifier PM as already described above, as shown in FIG. 19C, a hole bored by laser machining or the like so as to substantially penetrate the base tape 101 may also serve as the identifier PM. In this case, when the mark sensor 127 is formed by a known reflection-type photoelectric sensor composed of a light projector and a light receiver, as the identifier PM formed by the above-mentioned hole comes to the position between the light projector and the light receiver, light from the light projector passes through the hole of the identifier PM and the transparent cover film 103 and is no longer reflected and hence no longer received by the light receiver, whereby the control output from the light receiver is inverted.

FIG. 20 is a view showing an example of the screen displayed on the PC 118 (the terminal 118*a* or the general purpose computer 118*b*) mentioned above when making access to (performing reading from or writing to) the RFID tag information of the IC circuit part 151 of the RFID circuit element To by the tag-label producing device 1 as described above.

In FIG. 20, in this example, the tag label kind (access frequency and tape dimensions), the label print R printed in correspondence with the RFID circuit element To, an access (reading or writing) ID as identification information (tag ID) unique to that RFID circuit element To, the address of item information stored in the information server IS, and the storage destination addresses of those corresponding information in the route serer RS, and the like can be displayed on the PC 118. Through operation on the PC 118, the tag-label producing device 1 is activated and the label print R is printed onto the cover film 103, and also information such as the writing ID or item information is written to the IC circuit part 151 (or information such as the reading ID or item information previously stored in the IC circuit part 151 is read).

It should be noted that at the time of performing reading and writing as described above, the correspondence between the tag ID of the RFID circuit element To of the produced RFID label T and information read from the IC circuit part 151 (or information written into the IC circuit part 151) of that RFID label T is stored in the route server RS described above and can be referenced as required.

The most prominent feature of this embodiment resides in that, in the tag-label producing device 1 having the basic configuration as described above, at the time when the RFID circuit element To reaches the communication position with the loop antenna LC as the tag label tape 109 with print is fed, the subsequent control on the print head 23 or the loop antenna LC is switched in accordance with whether or not printing by the print head 23 has been completed at that time. The control behaviors according to the feed position will be described below with reference to FIGS. 21 to 29.

(A) When the Print Length is Relatively Long

FIGS. 21A to 21K are explanatory views each showing the positional relation between the identifier PM, RFID circuit element To, and print area S for label print R of the tag label tape 109 with print that is continuously paid out, and the loop antenna LC, the mark sensor 127, the half-cut unit 35, the cutting mechanism 15, and the print head 23. It should be noted that as illustrated in the drawings, in this embodiment, the distance L in the base tape 101 from the leading end position of the identifier PM in the tape feed direction to the leading end of the RFID circuit element To in the tape feed direction is set in advance so to be equal to the distance Lo in the tape feed direction between the mark sensor 127 and the print head 23.

A bonding portion consisting of the tape feed roller 27 and the pressure roller 28 is provided (as shown in FIG. 5 mentioned above) between the print head 23 and the cutting mechanism 15. FIG. 21A shows a state in which, after the base tape 101 paid out from the first roll 102 of the cartridge 7 and the cover film 103 paid out from the second roll 104 are bonded together by the tape feed roller 27 and the pressure roller 28, the leading end of the bonded tape reaches the cutting mechanism 15. For the convenience of description, a tape that has been bonded but for which printing has yet been performed by the print head 23 onto the cover film 103 will herein be also referred to as the tag label tape 109 with print. In the state shown in FIG. 21A, the beginning of the tag label tape 109 with print is being fed, and the identifier PM has not been detected by the mark sensor 127.

When the feeding of the tag label tape 109 with print further proceeds in this state (in other words, the feeding of the base tape 101 and cover film 103; the same applies hereinafter), the portion in the vicinity of the leading end of the RFID circuit element To in the tape feed direction reaches the position of the print head 23 (FIG. 21B). At this time, since L=Lo as described above, when, due to the movement of the tag label tape 109 with print, the leading end of the identifier PM reaches the position of the mark sensor 127, the position of the cover film 103 corresponding to the RFID circuit element To (the position where the cover film 103 is to be bonded to the RFID circuit element To position of the base tape 101) reaches the position of the print head 23. When, in correspondence with this, the identifier PM is detected by the mark sensor 127, printing of the label print R onto the cover film 103 is started (FIG. 21C). In this example, as shown in FIGS. 21I to 21K that will be described later, a relatively long string of letters (alphabet letters "ABCDEFGHIJKLMN") is printed.

When the feeding of the tag label tape 109 with print further proceeds from the state as shown in FIG. 21C, the preset position of the front half-cut line HC1 (as described above, the position at the distance X1 from the leading end of the tape; see FIG. 18) reaches the position of the half-cut unit 35 (FIG. 21D). In this state, since the identifier PM has already been detected by the mark sensor 127 as described above, the detection of the arrival at this position is performed by detecting that the tag label tape 109 with print has moved by a predetermined distance from the state shown in FIG. 21B mentioned above (identifier PM detection start state). In response to this detection, the feeding of the tag label tape 109 with print is stopped, and the front half-cut line HC1 is formed by means of the half-cut unit 35 (FIG. 21D).

Thereafter, the feeding of the tag label tape 109 with print is resumed, and as the feeding of the tag label tape 109 with print further proceeds from the state shown in FIG. 21D mentioned above (FIG. 21E), the RFID circuit element To reaches the position of the loop antenna LC (FIG. 21F). At this time, since a relatively long letter string ("ABCDEFGHIJKLMN") is printed as the label print R in this example, not all of the printing in the print area S has been finished at this point. Accordingly, the feeding and printing of the tag label tape 109 with print are temporarily stopped (interrupted), and after performing wireless communication with the RFID circuit element To by means of the loop antenna LC in this feeding stopped state, the feeding and printing are resumed (FIG. 21G), thus eventually completing printing of all of the string of letters ("ABCDEFGHIJKLMN") (FIG. 21H).

When the feeding of the tag label tape 109 with print further proceeds from the above-mentioned state shown in FIG. 21H, the preset position of the rear half-cut line HC2 (as described above, the position at the distance X2 from the rear end of the tape; see FIG. 18) reaches the position of the half-cut unit 35. As in the detection of the position of the front half-cut line HC1 as described above, the detection of the arrival at this position is performed by detecting that the tag label tape 109 with print has moved by a predetermined distance from the state shown in FIG. 21B. In response to this detection, the feeding of the tag label tape 109 with print is stopped, and the rear half-cut line HC2 is formed by means of the half-cut unit 35 (FIG. 21I).

In this embodiment, as described above, in each RFID label T, information on the remaining number of RFID circuit elements To is printed in the front margin area S1 of the cover film 103. In view of the positional relation of the loop antenna LC, the print head 23, and the like with respect to the front-to-rear direction as described above, the remaining-number information relating to a given RFID label T is printed in the front margin area S1 of the cover film 103 at the time of producing the previous immediately preceding RFID label T. That is, as the feeding of the tag label tape 109 with print further proceeds from the state shown in FIG. 21I mentioned above, the front margin area S1 of the cover film 103 corresponding to the above-mentioned next RFID label T reaches the position of the print head 23. In the same manner as described above, the detection of the arrival at this position is performed by detecting that the tag label tape 109 with print has moved by a predetermined distance from the state shown in FIG. 21B. In response to this detection, printing of finished print number R1 as the above-mentioned remaining-number information is started with respect to the cover film 103 (FIG. 21J).

As the feeding of the tag label tape 109 with print further proceeds from the state shown in FIG. 21J mentioned above, the position of a cutting line CL (cutting part) corresponding to the dimension X of the print area S of each RFID label T with respect to the tape length direction, which is set so as to be variable in accordance with the length of the label print R, reaches the position of the cutting mechanism 15 (at this stage, the printing of the above-mentioned finished print number R1 has been completed). In the same manner as described above, the detection of the arrival at this position is also performed by detecting that the tag label tape 109 with print has moved by a predetermined distance from the state shown in FIG. 21B. In response to this detection, the feeding of the tag label tape 109 with print is stopped, and cutting is performed by the cutting mechanism 15 at the cutting line CL (FIG. 21K), so the leading end side of the tag label tape 109 with print is cut off to produce the RFID label T.

FIGS. 22A and 22B are views, substantially corresponding to FIG. 18A described above, each showing an example of the RFID label T completed as described above. FIG. 22A shows the example of an RFID label T-1 that is produced for the first time (that is, the first RFID label) using a new base tape 101 and a new cover film 103. FIG. 22B shows the example of another RFID label T-2 (that is, the second RFID label onward). In each of the RFID labels T-1 and T-2, the RFID circuit element To is arranged on the center side in the tape length direction, the label print R is printed in the print area S corresponding to the RFID circuit element To, and the front margin area S1 where the identifier PM is present, and the rear margin area S2 are provided across the front and rear half cut lines HC1, HC2, respectively, from the print area S. As described above, since the RFID label shown in FIG. 22A is the first RFID label T-1, the remaining-number information is not printed in the front margin area S1, whereas the finished print number R1 is printed in the front margin area S1 of the second RFID label T-2 onward (in this example, the second RFID label) shown in FIG. 22B.

It should be noted while the length of the print area S varies according to the form of the label print R as described above, if the length of the print area S becomes larger than a certain length for reasons such as the large number of letters in the label print R, the rear half-cut line HC2 is omitted (that is, the rear margin area S2 is not set), so the area extending all the way up to the rear end of the tag label tape 109 with print serves as the print area S where the label print R is printed.

FIGS. 23A and 23B are views, respectively corresponding to FIGS. 22A and 22B mentioned above, each showing an example of such an RFID label T with no rear margin area S2. FIG. 23A shows the example of the RFID label T-1 that is produced for the first time using a new base tape 101 and a new cover film 103 (that is, the first RFID label). FIG. 23B shows the example of another RFID label T-2 (that is, the second RFID label onward). In each of the RFID labels T-1 and T-2, the RFID circuit element To is arranged on the center side in the tape length direction, the label print R is printed in the print area S corresponding to the RFID circuit element To, and only the front margin area S1 where the identifier PM is present is provided across the front half-cut line HC1 from the print area S. Since the RFID label shown in FIG. 23A is the first RFID label T-1, the remaining-number information is not printed in the front margin area S1, whereas the finished print number R1 is printed in the front margin area S1 of the second RFID label T-2 onward shown in FIG. 23B.

(B) When the Print Length is Relatively Short

Like FIGS. 21A to 21K, FIGS. 24A to 24K are explanatory views each showing the positional relation between the identifier PM, RFID circuit element To, and print area S for label print R of the tag label tape 109 with print that is continuously paid out, and the loop antenna LC, the mark sensor 127, the half-cut unit 35, the cutting mechanism 15, and the print head 23. In this example, as shown in FIGS. 24F to 24K that will be described later, a relatively short string of letters (alphabet letters "AMCDEFJHIJ") is printed as an example.

First, FIGS. 24A to 24E are the same as FIGS. 21A to 21E. That is, when, after the paying out of the tag label tape 109 with print from the cartridge 7 is started (FIG. 24A), the tag label tape 109 with print is further fed and the leading end of the identifier PM reaches the position of the mark sensor 127 (FIG. 24B), the printing of the label print R onto the cover film 103 is started (FIG. 24C). When the feeding further proceeds, and the position of the front half-cut line HC1 reaches the position of the half-cut unit 35, the front half-cut line HC1 is formed by means of the half-cut unit 35 (FIG. 24D); thereafter, the feeding of the tag label tape 109 with print is resumed, and the feeding of the tag label tape 109 with print further proceeds (FIG. 24E).

Then, since the number of letters in the label print R is relatively small in this example, the printing of the label print ("ABCDEFGHIJ") is completed before the RFID circuit element To reaches the position of the loop antenna LC (FIG. 24F).

Thereafter, as the feeding proceeds, the RFID circuit element To reaches the position of the loop antenna LC (FIG. 24G). Here, unlike in the case (A) described above, all of the printing with respect to the print area S has been finished at this point. Accordingly, the feeding of the tag label tape 109 with print is temporarily stopped (interrupted), and after performing wireless communication with the RFID circuit element To by means of the loop antenna LC in this feeding stopped state, the feeding is resumed (FIG. 24H).

The subsequent operations in FIGS. 24I to 24K are the same as those in FIGS. 21I to 21K described above. That is, when the feeding of the tag label tape 109 with print further proceeds from the state shown in FIG. 24H mentioned above, and the position of the half-cut line HC2 reaches the position of the half-cut unit 35, the feeding of the tag label tape 109 with print is stopped, and the rear half-cut line HC2 is formed by means of the half-cut unit 35 (FIG. 24I). When the feeding further proceeds and the front margin area S1 of the cover film 103 corresponding to the next RFID label T reaches the position of the print head 23, the printing of the finished print number R1 is started (FIG. 24J). When the feeding further proceeds and the position of the cutting line CL reaches the position of the cutting mechanism 15, the feeding is stopped, and cutting is performed by the cutting mechanism 15 at the cutting line CL (FIG. 24K), so the leading end side of the tag label tape 109 with print is cut off to produce the RFID label T.

FIGS. 25A and 25B are views, substantially corresponding to FIGS. 22A and 22B described above, each showing an example of the RFID label T completed as described above. Similarly as described above, since the RFID label shown in FIG. 25A is the first RFID label T-1, the remaining-number information is not printed in the front margin area S, whereas the finished print number R1 is printed in the front margin area S of the second RFID label T-2 onward shown in FIG. 25B.

(C) When Printing Corresponding to Communication Error is Performed

In either of the cases (A) and (B) mentioned above, the description is based on the assumption that the communication between the loop antenna LC and the RFID circuit element To has succeeded and that the writing of information to the IC circuit part 151 of the RFID circuit element To (or reading of information from the IC circuit part 151) has succeeded. However, there may be cases where such transmission/reception of information fails (=communication error) due to some circumstances. In these cases, the corresponding printing may be performed in order to clearly notify the operator to that effect.

(C-1) When the Print Length is Relatively Long

FIGS. 26A to 26F, 26G' to 26I', and 26J and 26K are explanatory views, corresponding to FIG. 21 mentioned above, showing the processing when the above-mentioned communication error occurs in the above-mentioned case (A) where the print length is relatively long.

FIGS. 26A to 26F are completely the same as FIGS. 21A to 21F. As described above with reference to FIG. 21F, in response to the arrival of the RFID circuit element To at the position of the loop antenna LC at this time (FIG. 26F) (not all of the printing in the print area S has been finished at this point), the feeding and printing of the tag label tape 109 with print are temporarily stopped (interrupted), and wireless communication with the RFID circuit element To is performed by means of the loop antenna LC in the feeding stopped state. In this example, printing is interrupted in the state where printing of "ABCDEFGHIJK", out of "ABCDEFGHIJKLMN" to be finally printed, has been substantially completed.

Here, if transmission/reception of information by the above-mentioned wireless communication succeeds, then, as described above with reference to the case (A), the feeding and printing are resumed and printing of all of the letter string "ABCDEFGHIJKLMN" is finally completed by printing the remaining letters "LMN" (see FIGS. 21G and 21H described above). If the transmission/reception of information has not succeeded, instead of the remaining letter "L", printing of another form of print R' (in this case, a string of small letters "NG" indicating a failure. It should be noted that large letters may conversely be used, or the number of rows, thickness, or the like may be changed; in short, it suffices that these letters be presented in a form visually different from the normal one) is performed immediately after the letter "K" in order to indicate the failure (FIGS. 26G' and 26H').

Since such a tag label tape 109 with print for which writing of information to or reading of information from the RFID circuit element To has failed is not used as an RFID label, the feeding is continued as it is (FIG. 26I') without stopping the feeding and forming the half-cut line HC2 as described above with reference to FIG. 21I. Then, as in FIG. 21J described above, when the front margin area S1 of the cover film 103 corresponding to the next RFID label T reaches the position of the print head 23, the printing of the above-mentioned finished print number R1 onto the cover film 103 is started (FIG. 26J). When the position of the cutting line CL corresponding to the dimension X of the print area S of the RFID label T with respect to the tape length direction, which is set to a predetermined value, reaches the position of the cutting mechanism 15, cutting is performed by the cutting mechanism 15 at the cutting line CL (FIG. 26K), thus producing an RFID label T' that is not intended for actual use.

Figures 27A, 27B:
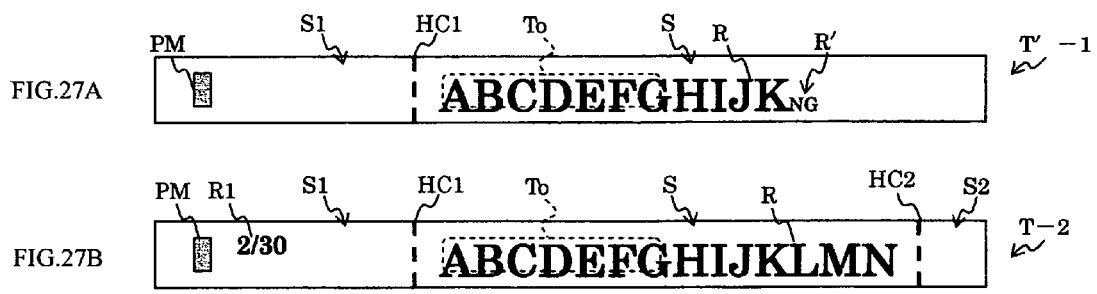
FIG. 27A, 27B are respectively view showing the RFID label completed in a communication failure state.

FIG. 27A is a view, corresponding to FIG. 22A described above, showing an (in this example, the first) RFID label T'-1 completed as described above (in the communication failure state). Since the rear half-cut line HC2 is omitted as described above, in the RFID label T'-1, the RFID circuit element To is arranged on the center side in the tape length direction, the label print R and the above-described other form of print R' are printed in the print area S corresponding to the RFID circuit element To, and the front margin area S1 where the identifier PM is present is provided across the front half-cut line HC1 from the print area S. FIG. 27B shows a case where after the production of the RFID label T'-1, communication has succeeded with the next RFID circuit element To onward (FIG. 27B is substantially the same as FIG. 22B). Even when communication fails as described above, the printing of the remaining-number information is performed as usual for the next label to be produced (see FIG. 26J or 26K described above). Accordingly, in this example, the finished print number R1 is printed in the front margin area S1 in the second RFID label T-2.

(C-2) When the Print Length is Relatively Short

Like FIGS. 26A to 26F, 26G' to 26I', and 26J and 26K mentioned above, FIG. 28A to 28G, 28H' to 28I', and 28J and 28K are explanatory views showing the processing when the above-mentioned communication error occurs in the case where the print length is relatively short. In this example, as will be described later, a relatively short string of letters (alphabet letters "ABCDEFGHIJ") is printed.

FIGS. 28A to 28G are completely the same as FIGS. 24A to 24G. As described above with reference to FIG. 24G, in response to the arrival of the RFID circuit element To at the position of the loop antenna LC at this time (FIG. 28G) (all of the printing in the print area S has been finished at this point), the feeding of the tag label tape 109 with print is temporarily stopped (interrupted), and wireless communication with the RFID circuit element To is performed by means of the loop antenna LC in the feeding stopped state. In this example, printing is interrupted in the state where printing of all of the letter string "ABCDEFGHIJ" to be finally printed has been completed.

At this time, if transmission/reception of information by the above-mentioned wireless communication has succeeded, as described with reference to the case (2), the feeding is simply resumed (printing is not performed; see FIG. 24H); if transmission/reception of information has not succeeded, in order to clearly indicate this, printing of another form of print R' (in this example, a string of small letters "NG" indicating a failure) is additionally performed. In this case, since the position of the print head 23 is spaced apart from the last letter J of the label print R, the printing of the other form of print R' is started at a position slightly away from the last letter "J" (FIG. 28H').

Since such a tag label tape 109 with print for which writing of information to or reading of information from the RFID circuit element To has failed is not used as an RFID label, the feeding is continued as it is (FIG. 28I') without stopping the feeding and forming the half-cut line HC2 as described above with reference to FIG. 24I. Then, as in FIG. 24J described above, when the front margin area S1 of the cover film 103 corresponding to the next RFID label T reaches the position of the print head 23, the printing of the above-mentioned finished print number R1 onto the cover film 103 is started (FIG. 28J). When the position of the cutting line CL corresponding to the dimension X of the print area S of the RFID label T with respect to the tape length direction, which is set to a predetermined value, reaches the position of the cutting mechanism 15, cutting is performed by the cutting mechanism 15 at the cutting line CL (FIG. 28K), thus producing an RFID label T' that is not intended for actual use.

Figure 28J:
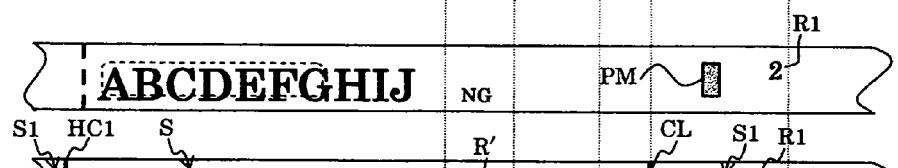
Figure 28K:
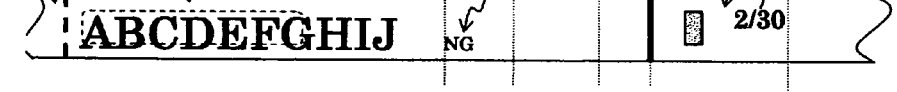
Figures 29A, 29B:
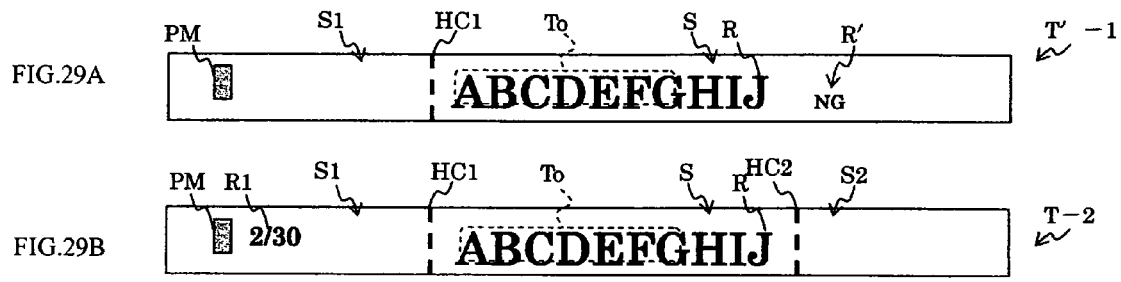
FIG. 29A, 29B are respectively view showing the RFID label completed in a communication failure state.

FIG. 29A is a view, corresponding to FIG. 25A described above, showing an (in this example, the first) RFID label T'-1 completed as described above (in the communication failure state). Since the rear half-cut line HC2 is omitted as described above, in the RFID label T'-1, the RFID circuit element To is arranged on the center side in the tape length direction, the label print R (printing of all the letters has been completed) and the above-described other form of print R' are printed in the print area S corresponding to the RFID circuit element To, and the front margin area S1 where the identifier PM is present is provided across the front half-cut line HC1 from the print area S. FIG. 29B shows a case where after the production of the RFID label T'-1, communication has succeeded with the RFID circuit element To onward (FIG. 29B is substantially the same as FIG. 25B). Even when communication fails as described above, the printing of the remaining-number information is performed as usual for the next label to be produced (see FIGS. 28J and 28K described above). Accordingly, in this example, the finished print number R1 is printed in the front margin area S1 in the second RFID label T-2.

As described above, in this embodiment, a control is performed in which, depending on whether or not printing with the print head 23 has been completed at the time when the RFID circuit element To reaches the communication position with the loop antenna LC, the subsequent operations of the print head 23, loop antenna LC, and the like are switch-controlled in a coordinated manner.

Figure 30:
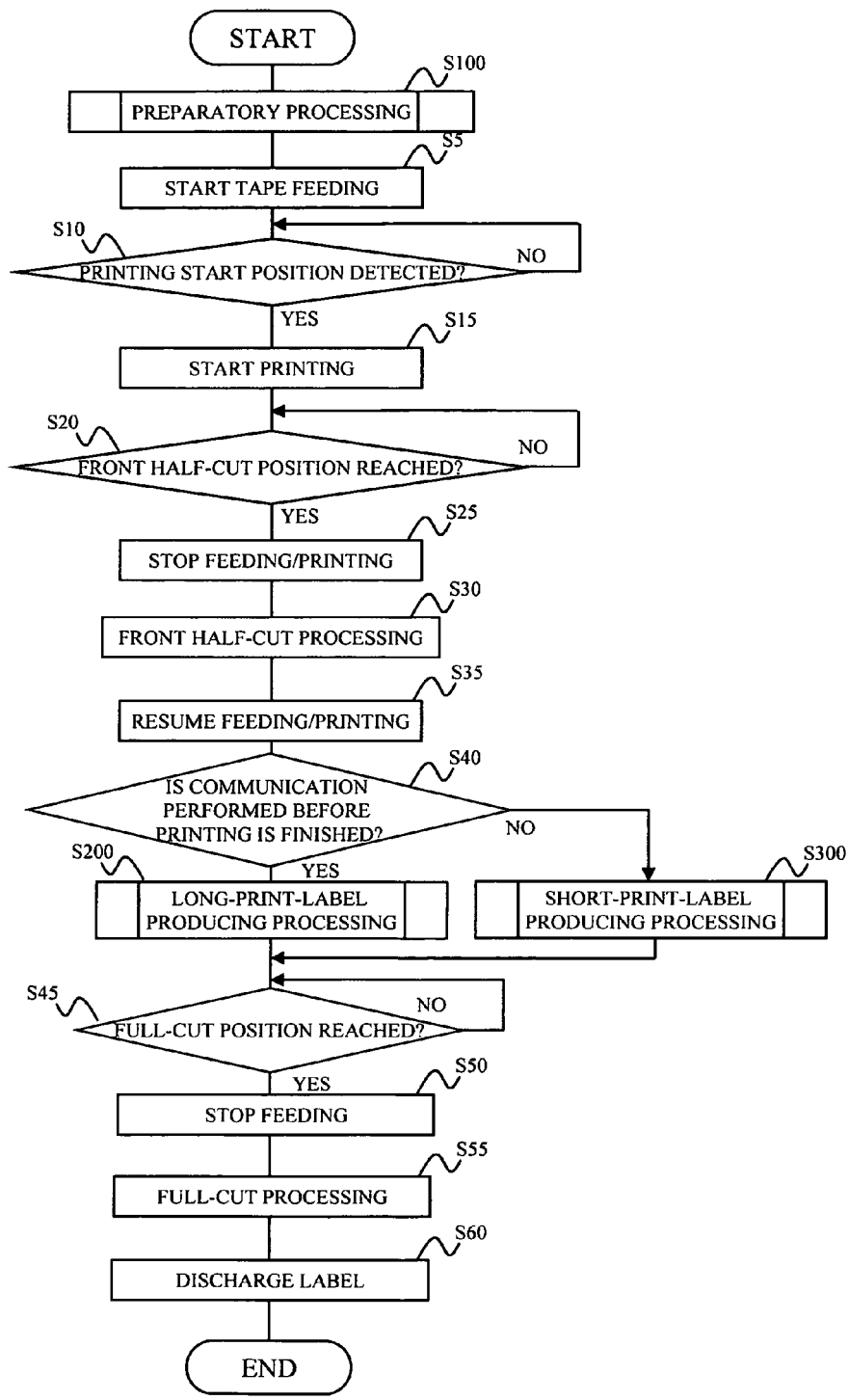
FIG. 30 is a flowchart showing the procedure of control executed by a control circuit.

FIG. 30 is a flowchart showing the procedure of control executed by the control circuit 110 in order to perform the above-described control.

In FIG. 30, this flow is started when a predetermined RFID label producing operation is performed by the tag-label producing device 1 via the PC 118. First, in step S100, preparatory processing (for details, see FIG. 31 that will be described later) is executed. In the preparatory processing, an operation signal from the PC 118 is input (via the communication line NW and the input/output interface 113), and on the basis of this operation signal, setting of print data or communication data with the RFID element To, or the like is performed.

Thereafter, the process transfers to step S5 where a control signal is output to the feed-motor drive circuit 121 via the input/output interface 113, and the tape feed roller 27 and the ribbon take-up roller 106 are rotationally driven by the drive force of the feed motor 121. Further, a control signal is output to the tape discharging motor 65 via the tape-discharging-motor drive circuit 123, and the drive roller 51 is rotationally driven. Due to these operations, the base tape 101 is paid out from the first roll 102 and supplied to the tape feed roller 27, and the cover film 103 is paid out from the second roll 104. By means of the tape feed roller 27 and the pressure roller 28, the base tape 101 and the cover film 103 are adhered and integrated together to form the tag label tape 109 with print, which is carried in the direction to the outside of the cartridge 7 and further to the outside of the tag-label producing device 1.

Thereafter, in step S10, on the basis of a detection signal of the mark sensor 127 input via the input/output interface 113, it is determined whether or not the identifier PM of the tag label tape 109 with print has been detected (in other words, whether or not the tag label tape 109 with print has reached the printing start position). The determination is not satisfied and this procedure is repeated until the identifier PM is detected, and upon detecting the identifier PM, the determination is satisfied, and the process transfers to the next step S15.

In step S15, a control signal is output to the print-head drive circuit 120 via the input/output interface 113, and the print head 23 is energized, thus starting printing of the label print R such as letters, signs, or barcodes corresponding to the print data generated in step S100, with respect to the above-described print area S (=the area to be substantially bonded onto the back surface of the RFID circuit elements To that are arranged in the base tape 101 at predetermined equal intervals) of the cover film 103 (see FIGS. 21B and 21C).

Thereafter, in step S20, it is determined whether or not the tag label tape 109 with print has been fed to the above-described front half-cut position (in other words, whether or not the tag label tape 109 with print has reached the position where the half-cutter 34 of the half-cut mechanism 35 directly faces the front half-cut line HC1 set in step S100). The determination at this time may be performed by, for example, detecting by a predetermined known method the distance by which the tag label tape 109 with print has been fed after the detection of the identifier PM of the base tape 101 in step S10 mentioned above (such as by counting the number of pulses output by the feed-motor drive circuit 121 for driving the feed motor 119 that is a pulse motor). The determination is not satisfied until the arrival at the half-cut position and this procedure is repeated, and upon the arrival at the half-cut position, the determination is satisfied and the process transfers to the next step S25.

In step S25, a control signal is output to each of the feed-motor drive circuit 121 and the tape-discharging-motor drive circuit 123 via the input/output interface 113, and the drives of the feed motor 119 and tape discharging motor 65 are stopped to thereby stop the rotations of the tape feed roller 27, ribbon take-up roller 106, and drive roller 51. Accordingly, as the tag label tape 109 with print paid out from the cartridge 7 moves in the discharge direction, the paying out of the base tape 101 from the first roll 102, the paying out of the cover film 103 from the second roll 104, and the feeding of the tag label tape 109 with print are stopped in the state with the half-cutter 34 of the half-cut mechanism 35 directly facing the front half-cut line HC1 set in step S100. Further, at this time, a control signal is also output to the print-head drive circuit 120 via the input/output interface 113, and the energization of the print head 23 is stopped to thereby stop (interrupt) the printing of the label print R.

Thereafter, in step S30, a control signal is output to the half-cutter motor drive circuit 128 via the input/output interface 113 to drive the half-cutter motor 129, and the half-cutter 34 is pivoted to perform front half-cut processing of cutting the cover film 103, adhesive layer 101a, base film 101b, and adhesive layer 101c of the tag label tape 109 with print to thereby form the front half-cut line HC1 (see FIG. 21D).

Then, the process transfers to step S35 where, in the same manner as in step S5 mentioned above, the feeding of the tag label tape 109 with print is resumed by rotationally driving the tape feed roller 27, the ribbon take-up roller 106, and the drive roller 51, and in the same manner as in step S15, the print head 23 is energized to resume the printing of the label print R.

Thereafter, in step S40, in accordance with the print end position (see step S130 that will be described later), which is set so as to be variable in accordance with the content of print (the number of print letters, font, and the like) in step S100, and the tag rear end position (see step S145 that will be described later), which is set in accordance with the information on the kind of the cartridge 7 included in the operation signal input by the operator in step S100, it is determined with respect to the tag label tape 109 with print whether or not the communication position with the RFID circuit element To (the position where the RFID circuit element To directly faces the loop antenna LC) is reached before the printing of all of the label print R with respect to the print area S is finished (the state shown in FIG. 21F described above), or whether or not the printing of all of the label print R with respect to the print area S is finished before the communication position with the RFID circuit element To (the position where the RFID circuit element To directly faces the loop antenna LC) is reached (the state shown in FIG. 24G described above).

For example, if the length of the label print R to be printed is relatively long and the positional relation as shown in FIG. 21F mentioned above results, the determination of step S40 mentioned above is satisfied, and the process transfers to step S200 where the processing of producing a long print label is performed. That is, once the tag label tape 109 with print has been fed to the communication position with the RFID circuit element To (the position where the RFID circuit element To directly faces the loop antenna LC), the feeding and printing are stopped to perform transmission/reception of information; thereafter, the feeding and printing are resumed to complete the printing, and after the feeding is further continued and then stopped at the rear half-cut position to form the rear half-cut line HC2, printing (margin printing) of the finished print number R1 for the next RFID label T is performed (see FIG. 32 that will be described later).

On the other hand, for example, if the length of the label print R to be printed is relatively short and the positional relation as shown in FIG. 24G mentioned above results, the determination of step S40 mentioned above is not satisfied, and the process transfers to step S300 where the processing of producing a short print label is performed. That is, after the feeding and printing are continued as they are to complete the printing first, the feeding is further continued; upon arrival at the communication position with the RFID circuit element To (the position where the RFID circuit element To directly faces the loop antenna LC), the feeding is stopped to perform transmission/reception of information, and after the feeding is further continued and then stopped at the rear half-cut position to form the rear half-cut line HC2, printing (margin printing) of the finished print number R1 for the next RFID label T is performed (see FIG. 33 that will be described later).

Once step S200 or step S300 has been finished as described above, the process transfers to step S45 (at this point, the feeding of the tag label tape 109 with print has been resumed in step S200 or step S300). In step S45, it is determined whether or not the tag label tape 109 with print has been fed to the above-described full-cut position (in other words, whether or not the tag label tape 109 with print has reached the position where the movable blade 41 of the cutting mechanism 15 directly faces the cutting line CL set in step S100). In the same manner as described above, the determination at this time as well may be performed by, for example, detecting by a predetermined known method the distance by which the tag label tape 109 with print has been fed after the detection of the identifier PM of the base tape 101 in step S10 mentioned above (such as by counting the number of pulses output by the feed-motor drive circuit 121 for driving the feed motor 119 that is a pulse motor). The determination is not satisfied until the arrival at the front full-cut position and this procedure is repeated, and upon the arrival at the front full-cut position, the determination is satisfied and the process transfers to the next step S50.

In step S50, in the same manner as step S25 mentioned above, the rotations of the tape feed roller 27, ribbon take-up roller 106, and drive roller 51 are stopped to thereby stop the feeding of the tag label tape 109 with print. Accordingly, in the state with the movable blade 41 of the cutting mechanism 15 directly facing the cutting line CL set in step S100, the paying out of the base tape 101 from the first roll 102, the paying out of the cover film 103 from the second roll 104, and the feeding of the tag label tape 109 with print stop.

Thereafter, in step S55, a control signal is output to the cutter-motor drive circuit 122 to drive the cutter motor 43, and the movable blade 41 of the cutting mechanism 15 is pivoted to perform full-cut processing of cutting (severing) all of the cover film 103, adhesive layer 101a, base film 101b, adhesive layer 101c, and separation sheet 101d of the tag label tape 109 with print to form the cutting line CL (see FIG. 21K). Due to the severing by the cutting mechanism 15, a label-shaped RFID label T from which RFID tag information of the RFID circuit element To has been read and on which corresponding predetermined printing has been performed, is produced as it is cut off from the tag label tape 109 with print.

Thereafter, the process returns to step S60 where a control signal is output to the tape-discharging motor drive circuit 123 via the input/output interface 113 to resume the drive of the tape discharging motor 65, thereby rotating the drive roller 51. Accordingly, the feeding by the drive roller 51 is resumed, the RFID label T produced in a label shape in step S55 mentioned above is fed toward the label discharge port 11 and discharged to the outside of the tag-label producing device 1 from the label discharge port 11, and this flow is ended.

It should be noted that the cutting processing in step S55 and the label discharge processing in step S60 mentioned above may be performed in synchronization with each other as described below, for example.

For example, first, at the time of the cutting operation by the cutting mechanism 15, the cutter motor 43 is driven via the input/output interface 113 and the cutter-motor drive circuit 122, the cutter helical gear 42 is rotated counterclockwise (the arrow 70 direction in FIG. 3), and the roller supporting holder 57 is pivoted counterclockwise (the arrow 71 direction in FIG. 3) about the holder supporting portion 59 via the boss 50 and the cam 60. Then, immediately before the cutting of the tag label tape 109 with print with the stationary blade 40 and the movable blade 41 is started, the tag label tape 109 with print is pressed against the drive roller 51 by the pressure roller 52, and the tag label tape 109 with print is retained until the tape is cut.

Thereafter, whether or not the cutting of the tag label tape 109 with print has been completed is determined by the control circuit 110 on the basis of the detection signal of the tape cut sensor 124. If the detection signal of the micro switch 126 is switched from OFF to ON, and it is determined that the cutting has been completed, the rotation of the cutter motor 43 is temporarily stopped via the input/output interface 113 and the cutter-motor drive circuit 122. On the other hand, if the cutting has not been completed, the drive of the cutter motor 43 is continued until the micro switch 126 is switched from OFF to ON.

Once the cutting is completed and the cutter motor 43 stops, the tape discharging motor 65 is rotated via the input/output interface 113 and the tape-discharging-motor drive circuit 123, and the drive roller 51 is rotated via the gear train 66, thereby discharging the tape (RFID label T) that has been retained. Then, the determination as to whether or not the RFID label T has been discharged is made in the control circuit 110 on the basis of whether or not a predetermined period of time (for example, 0.5 to 1.0 sec) has elapsed after starting the discharge of the tape. In case it is determined that the RFID label T has been discharged, the rotation of the tape discharging motor 65 is stopped via the input/output interface 113 and the tape-discharging-motor drive circuit 123, and if the RFID label T has not been discharged, the rotation is continued until the discharge is completed.

After the rotation of the tape discharging motor 65 is stopped, the cutter motor 43 is rotated again via the input/output interface 113 and the cutter-motor drive circuit 122. Accordingly, also the cutter helical gear 42 rotates again, thus pivoting and returning the movable blade 41 to the release position again (see FIG. 12). At the same time, the roller supporting holder 57 is pivoted by means of the urging spring 61 in the direction away from the pressure roller 52 (the direction opposite to the arrow 71 direction in FIG. 3), and retained by the stopper 72 while leaving a certain spacing. Thereafter, on the basis of the detection signal from the cut release sensor 125, the detection as to whether or not the above-mentioned cut release operation has been completed is made by the control circuit 110. If the micro switch 126 has not been switched from ON to OFF, and the cut release operation has not been completed, the rotation of the cutter motor 43 is continued until the completion of the cut release operation. Further, if the micro switch 126 has been switched from ON to OFF and the cut release operation has been completed, the rotation of the cutter motor 43 is stopped, thus finishing the full-cut processing and label discharge processing mentioned above.

Figure 31:
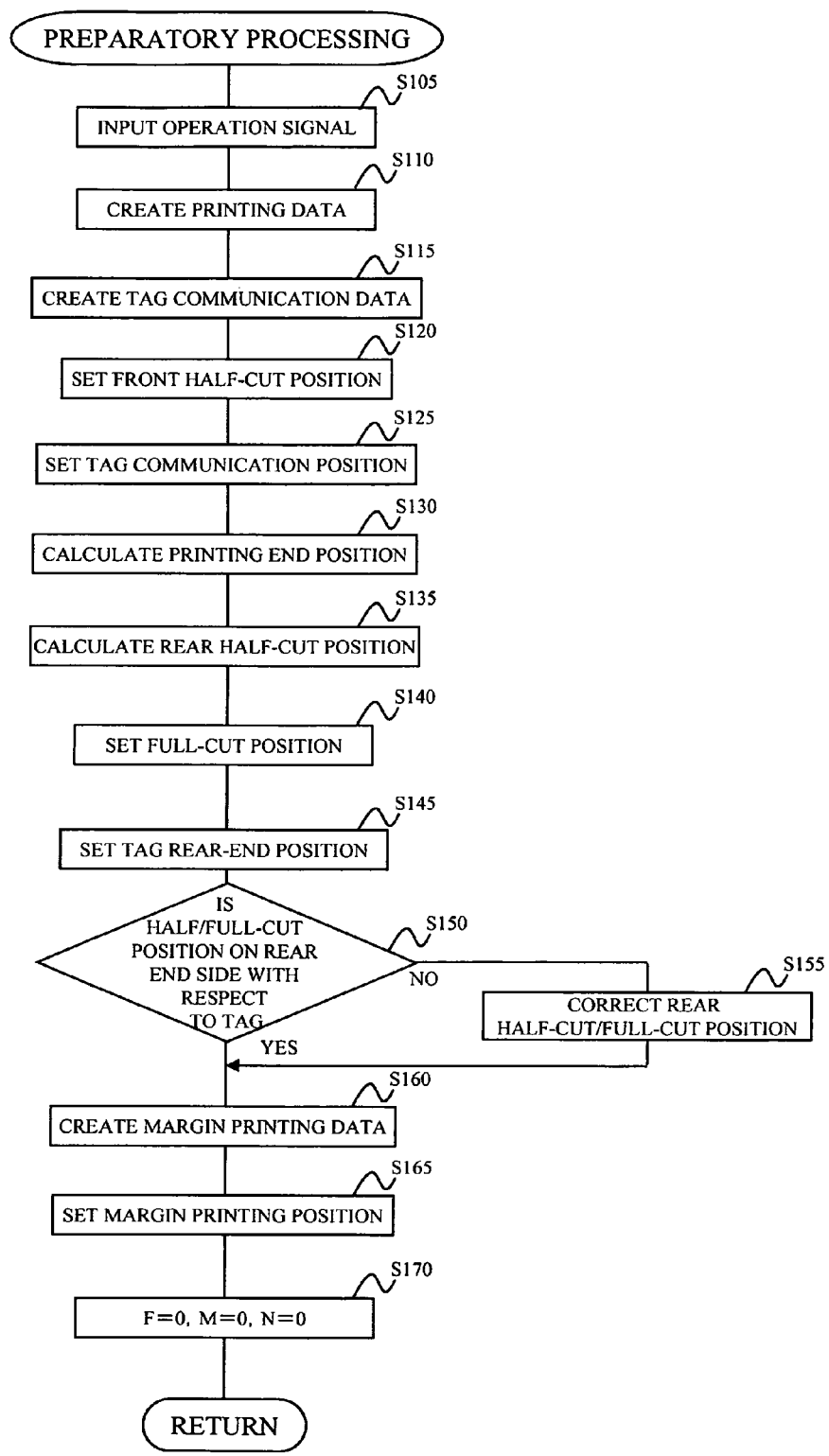
FIG. 31 is a flowchart showing the detailed procedure of step S100.

FIG. 31 is a flowchart showing the detailed procedure of step S100 descried above. In the flow shown in FIG. 31, first, in step S105, an operation signal for which input operation has been made from the PC 118 is input (identified) via the input/output interface 113. This operation signal contains print information including, for example, the letter, design, pattern, and the like of the label print R and finished print number R1 designated by the operator or the font (typeface, size, thickness, and the like) thereof, or the code data of characters such as letters and numerals. When performing writing of information with respect to the RFID circuit element To, the operation signal also contains this writing information (RFID tag information including at least tag ID as identification information). Further, the operation signal also contains information on the kind of the cartridge 7 loaded on the cartridge holder 6 (in other words, tag attribute information such as the arrangement interval of the RFID circuit elements in the base tape 101, the tape width of the base tape 101, and the like).

It should be noted that as for this cartridge information, a portion to be detected (for example, an identifier with an uneven configuration or the like), which is separately provided to the cartridge 7, may be detected by suitable detection device (those performing mechanical detection such as a mechanical switch, a sensor performing optical detection, a sensor performing magnetic detection, or the like), with the kind of the cartridge 7 being automatically detected and retrieved on the basis of the resulting detection signal.

Thereafter, the process transfers to step S110, and print data corresponding to the above-mentioned printing information is created on the basis of the operation signal input in step S105 mentioned above.

Then, in step S115, on the basis of the operation signal input in step S105 mentioned above, communication data corresponding to the above-mentioned writing information is created. It should be noted that as described above, although this procedure is executed in the case where the RFID label T is produced by performing writing of information to the RFID circuit element To, in the case where the FID label T is produced by performing reading of information previously stored in the RFID circuit element To, this procedure may be omitted.

Thereafter, the process transfers to step S120, and the position of the front half-cut line HC1 described above is set. In this setting, on the basis of the operation signal input in step S105 mentioned above, the position of the front half-cut line HC1 on the tape corresponding to the above-mentioned cartridge information is set. That is, as described above, the arrangement interval (in other words, the distance between the cutting line CL and the cutting line CL, or the length of one RFID label T) of the RFID circuit elements in the base tape 101 is uniquely determined by the kind of the cartridge 7. Further, the position of the front half-cut line HC1 is (unlike the rear half-cut line HC2) previously determined (for example, stored in a suitable location of the control circuit 110 in the form of a table) by the length of this RFID label T to be a certain position from the leading end of the tag label tape 109 with print, irrespective of the content of the label print R. In this procedure, under the assumption as mentioned above, the position of the front half-cut line HC1 mentioned above is (fixedly) set to a position that is previously defined for each cartridge 7.

Then, in step S125, the communication position on the tape with the RFID circuit element To described above is set. As in step S120 mentioned above, in this setting as well, on the basis of the operation signal input in step S105 mentioned above, the arrangement position of the RFID circuit element To in the tag label tape 109 with print is (fixedly) set to a position previously defined for each cartridge 7 under the assumption that the kind (size) and arrangement position of the RFID circuit element To are previously determined by the kind of the cartridge 7 to be a certain position from the leading end of the tag label tape 109 with print.

Thereafter, the process transfers to step S130, and on the basis of the print data prepared in step S110 mentioned above, the position on the tape where the printing of the label print R ends is calculated. That is, this position varies in accordance with the content of the label print R such that when the print length is long, the printing end position becomes (relatively) closer to the rear end portion of the label, and when the print is short, the printing end position becomes (relatively) closer to the front end portion of the label.

Then, in step S135, the position of the rear half-cut line HC2 described above is set. In this setting, on the basis of the operation signal input in step S105 mentioned above and the printing end position calculated in step S130 mentioned above, the position of the rear half-cut line HC2 on the tape corresponding to the above-mentioned cartridge information is set. That is, on the basis of the operation signal input in step S105 mentioned above, under the assumption that the distance from the printing end position to the rear half-cut line HC2 is previously determined to a certain distance by the kind of the cartridge 7, the position of the rear half-cut line HC2 on the tape is calculated by adding (intervening) the determined distance with respect to the printing end position calculated in step S130 mentioned above.

Thereafter, the process transfers to step S140, and the position (full-cut position) of the cutting line CL of the tag label tape 109 with print is set. As in step S120 mentioned above, in this setting as well, on the basis of the operation signal input in step S105 mentioned above and under the assumption that the size of the label is previously determined to be a certain size by the kind of the cartridge 7, the cutting position of the tag label tape 109 with print is (fixedly) set to a position that is previously defined for each cartridge 7.

Then, in step S145, the rear end position of the RFID circuit element To on the tape mentioned above is set. In this setting as well, in the same manner as described above, on the basis of the operation signal input in step S105 mentioned above and under the assumption that the kind (size) and the arrangement position of an RFID circuit element To is previously determined by the kind of the cartridge 7, the rear end position of the RFID circuit element To in the tag label tape 109 with print is (fixedly) set to a position that is previously defined for each cartridge 7.

Then, the process transfers to step S150, and it is determined whether or not the position of the rear half-cut line HC2 set in step S135 or the position of the cutting line CL set in step S140 is located on the label rear end side with respect to the rear end position of the RFID circuit element To set in step S145. If the position of the rear half-cut line HC2 or the position of the cutting line CL is set on the label rear end side, the determination is satisfied, and the process transfers to step S160.

If the position of the rear half-cut line HC2 or the position of the cutting line CL is set on the label front end side with respect to the rear end position of the RFID circuit element To, the determination is not satisfied, and the process transfers to step S155. Since there is a possibility that a part of the RFID circuit element To may be cut if this state is left as it is, in order to avoid this, in step S155, positional correction (resetting) is performed so that the position of the rear half-cut line HC2 and the position of the cutting line CL are both on the label rear end side with respect to the rear end position of the RFID circuit element To, and the process transfers to step S160.

Thereafter, the process transfers to step S160 where, on the basis of the operation signal input in step S105 mentioned above, margin printing data (remaining-number information data) corresponding to the above-mentioned printing information is created. As for the counting of the remaining number, as described above, upon loading the cartridge 7 onto the cartridge holder 6 by the operator, for example, how-manieth RFID label the first RFID label T is out of the remaining number of RFID labels that can be produced with all the RFID circuit elements To in the cartridge 7 (or how-manieth the first RFID label T is out of the total RFID labels so far produced) may be input through operation (Thereafter, for each label production, the total number of RFID labels T may be added up by a counter that is separately provided inside the tag-label producing device 1). Alternatively, like the above-described cartridge information, for each label production, the count may be done and stored on a server or the like associated with a portion to the detected which is separately provided to the cartridge 7, the remaining number (usage number) being automatically acquired by performing a search on the server upon the loading of the cartridge 7. Further, the remaining number may also be acquired by performing transmission/reception of information with each RFID circuit element To (see a fourth embodiment that will be described later). It should be noted that in the four embodiment that will be described later, in this step S160, information R1 that will be described later is created as the margin printing data corresponding to the above-mentioned printing information.

Thereafter, the process transfers to step S165 where the printing position of the margin printing data (remaining-number information; information R1 in the fourth embodiment that will be described later) created in step S160 mentioned above is set. This setting is also performed in the same manner as described above. That is, on the basis of the operation signal input in step S105 mentioned above and under the assumption that the size of the label is previously determined to be a certain size by the kind of the cartridge 7, the position of the front margin area S1 where the margin printing is executed is (fixedly) set to a position that is previously defined for each cartridge 7, with the position (full-cut position) of the cutting line CL of the tag label tape 109 with print taken as a reference, for example.

Thereafter, in step S170, when performing communication with an RFID circuit element To from the loop antenna LC that will be described later, variables M, N for counting the number of times communication retry is performed (the number of times of access try) if there is no response from the RFID circuit element To, and a flag F indicating whether or not communication has succeeded are initialized to 0, and this routine is ended.

Figure 32:
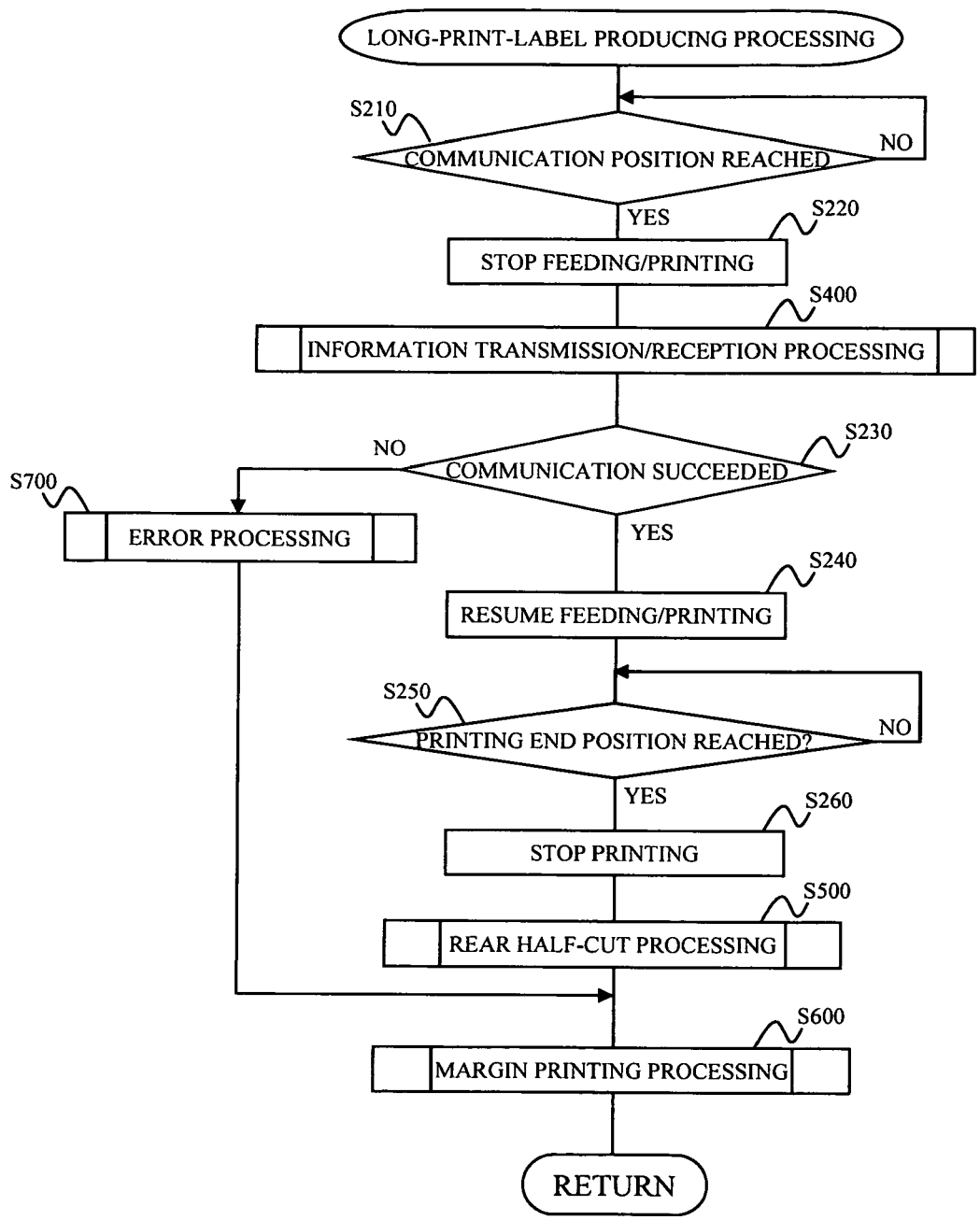
FIG. 32 is a flowchart showing the detailed procedure of step S200.

FIG. 32 is a flowchart showing the detailed procedure of step S200 described above. In the flow shown in FIG. 32, first, in step S210, it is determined whether or not the tag label tape 109 with print has been fed to the communication position with the loop antenna LC described above (in other words, whether or not the tag label tape 109 with print has substantially reached the position as set in step S125 mentioned above where the loop antenna LC substantially directly faces the position of the RFID circuit element To). As in step S20 of FIG. 30 described above, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the communication position and this procedure is repeated, and upon the arrival at the communication position, the determination is satisfied and the process transfers to the next step S220.

In step S220, as in step S25 mentioned above, the rotations of the tape feed roller 27, ribbon take-up roller 106, and drive roller 51 are stopped, and feeding of the tag label tape 109 with print is stopped in the state with the loop antenna LC substantially directly facing the RFID circuit element To. Further, the energization of the print head 23 is stopped to thereby stop (interrupt) the printing of the above-mentioned label print R (see FIG. 21F).

Figure 34:
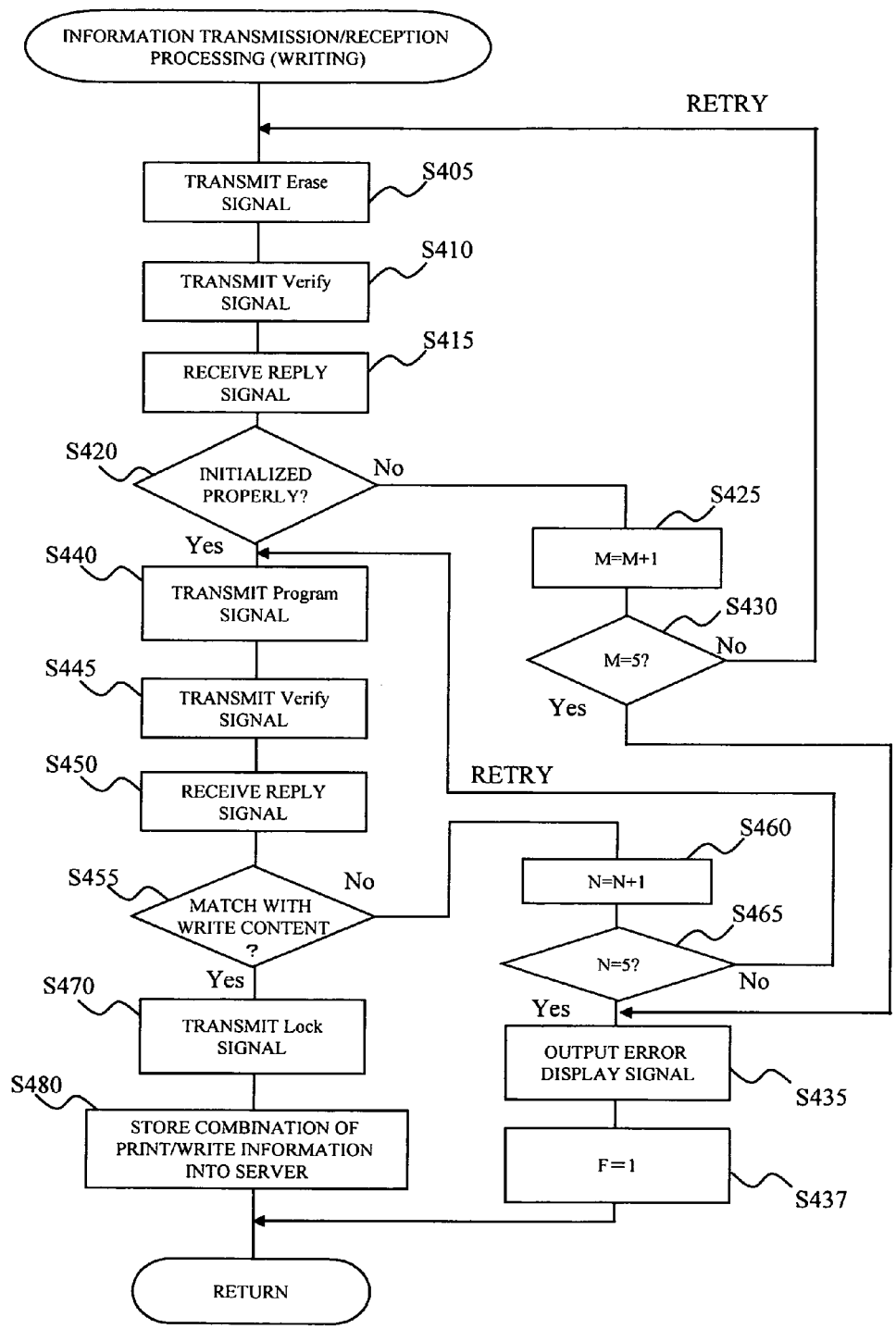
FIG. 34 is a flowchart showing the detailed procedure of step S400.

Thereafter, the process transfers to step S400, and transmission/reception of information is performed via wireless communication between the antenna LC and the RFID circuit element To, thereby performing information transmission/reception processing of writing the information created in step S115 of FIG. 31 mentioned above to the IC circuit part 151 of the RFID circuit element To (or reading information previously stored in the IC circuit part) (for details, see FIG. 34 that will be described later).

Thereafter, the process transfers to step S230 where it is determined whether or not transmission/reception of information has succeeded in step S400 mentioned above. Specifically, since the above-mentioned flag F should be F=1 if the communication has failed in step S400 (see step S437 of FIG. 34 that will be described later), it is determined whether or not F=0.

If F=1, the determination is not satisfied, and it is regarded that the communication with respect to the RFID circuit element To has failed. The process thus transfers to step S700, and error processing (details of which will be described later) for notifying the operator of this communication failure on the label is carried out. The process then transfers to step S600.

On the other hand, if F=0, the determination is satisfied, and the communication with respect to the RFID circuit element To is regarded to have succeeded, so the process transfers to step S240.

In step S240, in the same manner as in step S35 of FIG. 30, the tape feed roller 27, the ribbon take-up roller 106, and the drive roller 51 are rotationally driven to resume the feeding of the tag label tape 109 with print, and the print head 23 is energized to resume the printing of the label print R.

At this time, if the print head 23 has been stopped for a somewhat long time after step S220 due to such reasons as the large number of times of communication try (number of times of retry) in step S400 mentioned above, there is a possibility that the temperature of the print head 23 may have dropped. Accordingly, in order to cope with this, the amount of energization (the amount of energy applied per unit time) of the print head 23 may be increased than usual at the time of resuming the printing in step S240 mentioned above.

After step S240 mentioned above, the process transfers to step S250, and it is determined whether or not the tag label tape 109 with print has been fed to the above-described printing end position (calculated in step S130 of FIG. 31 mentioned above). The determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the printing end position and this procedure is repeated, and upon the arrival at the printing end position, the determination is satisfied and the process transfers to the next step S260.

In step S260, as in step S25 of FIG. 30 mentioned above, the energization of the print head 23 is stopped to stop the printing of the above-mentioned label print R. This completes the printing of the label print R with respect to the print area S (see FIG. 21H).

Thereafter, the process transfers to step S500, and rear half-cut processing, in which the formation of the rear half-cut line HC2 is performed using the half-cutter 34 of the half-cut unit 35 after the tag label tape 109 with print is fed to a predetermined rear half-cut position, is carried out (for details, see FIG. 35 that will be described later).

Once step S500 as described above or step S700 mentioned above is finished, the process transfers to step S600. In step S600, margin printing processing, in which printing of the finished print number R1 described above is performed with respect to the front margin area S1 (of the next RFID label T) located on the tape rear end side with respect to the above-mentioned cutting line CL, is executed (for details, see FIG. 36 that will be described later), and this routine is ended.

Figure 33:
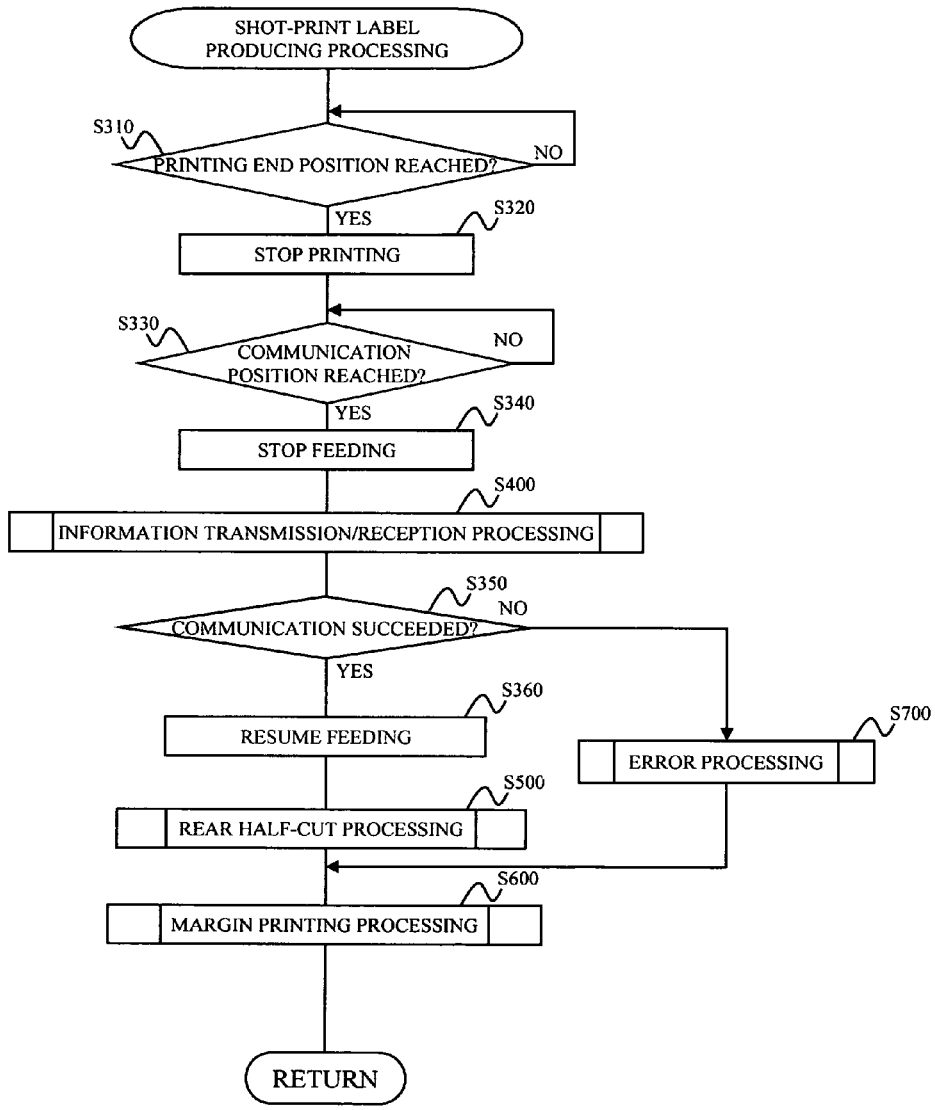
FIG. 33 is a flowchart showing the detailed procedure of step S300.

FIG. 33 is a flowchart showing the detailed procedure of step S300 described above. In the flowchart shown in FIG. 33, first, in step 310, in the same manner as in step S250 of FIG. 32, it is determined whether or not the tag label tape 109 with print has been fed to the above-described printing end position (calculated in step S130 of FIG. 31 mentioned above). The determination at this time as well may be performed in the same manner as in step S250. The determination is not satisfied until the arrival at the printing end position and this procedure is repeated, and upon the arrival at the printing end position, the determination is satisfied and the process transfers to the next step S320.

In step S320, in the same manner as in step S260 of FIG. 32 mentioned above, the energization of the print head 23 is stopped to thereby stop the printing of the above-mentioned label print R. This completes the printing of the label print R with respect to the print area S (see FIG. 24F).

Thereafter, the process transfers to step S330, and in the same manner as in step S210 of FIG. 32 mentioned above, it is determined whether or not the tag label tape 109 with print has been fed to the communication position with the loop antenna LC described above. The determination at this time as well may be performed in the same manner as in step S210. The determination is not satisfied until the arrival at the communication position and this procedure is repeated, and upon the arrival at the communication position, the determination is satisfied and the process transfers to the next step S340.

In step S340, in the same manner as in step S220 mentioned above, the rotations of the tape feed roller 27, ribbon take-up roller 106, and drive roller 51 are stopped, and feeding of the tag label tape 109 with print is stopped in the state with the loop antenna LC substantially directly facing the RFID circuit element To (see FIG. 24G).

The step S400 after step S340 is the same as that of FIG. 32, and information transmission/reception processing of performing transmission/reception of information via wireless communication between the antenna LC and the RFID circuit element To is carried out (for details, see FIG. 34 that will be described later).

Thereafter, the process transfers to step S350, and as in step S230 of FIG. 32, whether or not the transmission/reception of information in step S400 has succeeded is determined on the basis of whether or not F=0.

The determination is not satisfied if F=1, and as in FIG. 32, the process transfers to step S700 where error processing (details of which will be described later) is performed. The process then transfers to step S600. If F=0, the determination is satisfied, and the communication with respect to the RFID circuit element To is regarded to have succeeded, so the process transfers to step S360.

In step S360, as in step S240 of FIG. 32, the tape feed roller 27, the ribbon take-up roller 106, and the drive roller 51 are rotationally driven to resume the feeding of the tag label tape 109 with print (see FIG. 24H).

Since steps S500 and S600 after step S360 are the same as those of FIG. 32, the description thereof is omitted.

FIG. 34 is a flowchart showing the detailed procedure of step S400 described above with reference to FIGS. 32 and 33. It should be noted that in this example, of the information writing and information reading described above, the description is directed to the case of information writing.

First, in step S405 of the flow shown in FIG. 34, a control signal is output to the above-described transmitting circuit 306 (see FIG. 15 or the like) via the input/output interface 113, and as an "Erase" signal for initializing information stored in the memory part 157 of the RFID circuit element To, a carrier wave on which predetermined modulation has been performed is transmitted via the loop antenna LC to the RFID circuit element To to which information is to be written. The memory part 157 of the RFID circuit element To is thus initialized.

Next, in step S410, a control signal is transmitted to the transmitting circuit 306 via the input/output interface 113, and as a "Verify" signal for verifying the contents of the memory part 157, a carrier wave on which predetermined modulation has been performed is transmitted via the loop antenna LC to the RFID circuit element To to which information is to be written, thus urging a reply.

Thereafter, in step S415, a reply signal transmitted from the RFID circuit element To, to which writing is to be performed, in response to the above-mentioned "Verify" signal is received via the loop antenna LC, and taken in via the receiving circuit 307 (see FIG. 15 or the like) and the input/output interface 113.

Next, in steps S420, on the basis of the reply signal received as mentioned above, information in the memory part 157 of that RFID circuit element To is checked to determine whether or not the memory part 157 has been properly initialized.

In case the determination is not satisfied, the process transfers to step S425 where 1 is added to M, and further in step S430, it is determined whether or not M=5. If M≦4, the determination is not satisfied, and the process returns to step S405 to repeat the same procedure. If M=5, the process transfers to step S435. In step S435, an error display signal is output to the above-mentioned PC 118 via the input/output interface 113 and the communication line NW, and a corresponding writing failure (error) display is made. Further, in step S437, the above-described flag F is set as F=1, and this routine is ended. In this way, even when the initialization is unsuccessful, retry is performed up to 5 times.

In case the determination in step S420 is satisfied, the process transfers to step S440 where a control signal is output to the transmitting circuit 306, and as a "Program" signal for writing desired data to the memory part 157, a carrier wave on which predetermined modulation has been performed is transmitted to the RFID circuit element To to which information is to be written, thus performing writing of information.

Thereafter, in step S445, a control signal is output to the transmitting circuit 306, and as the "Verify" signal, a carrier wave on which predetermined modulation has been performed is transmitted via the loop antenna LC to the RFID circuit element To to which information is to be written, thus urging a reply. Thereafter, in step S450, a reply signal transmitted from the RFID circuit element To, to which writing is to be performed, in response to the received "Verify" signal mentioned above is received via the loop antenna LC, and taken in via the receiving circuit 307 and the input/output interface 113.

Next, in step S455, on the basis of the received reply signal mentioned above, information stored in the memory part 157 of that RFID circuit element To is checked, and it is determined using a known error detecting code (CRC code: Cyclic Redundancy Check or the like) whether or not the predetermined information transmitted as described above has been properly stored into the memory part 157.

In case the determination is not satisfied, the process transfers to step S460 where 1 is added to N, and further in step S465, it is determined whether or not N=5. If N≦4, the determination is not satisfied, and the process returns to step S440 to repeat the same procedure. If N=5, the process transfers to step S435, and in the same manner as described above, a writing failure (error) display corresponding to the PC 118 is made. In step S437, the above-described flag F is set as F=1, and this routine is ended. In this way, even when the writing of information is unsuccessful, retry is performed up to 5 times.

In case the determination in step S455 is satisfied, the process transfers to step S470. In step S470, a control signal is output to the transmitting circuit 306, and a carrier wave on which predetermined modulation has been performed is transmitted as a "Lock" command via the loop antenna LC to the RFID circuit element To to which information is to be written, thereby prohibiting additional writing of information to that RFID circuit element To. This completes the writing of RFID tag information to the RFID circuit element To to which writing is to be performed.

Thereafter, the process transfers to step S480, and a combination of the information written to the RFID circuit element To in step S440 mentioned above, and the print information of the label print R that has already been printed in the print area S by the print head 23 in correspondence with the above-mentioned information, is output via the input/output interface 113 and the communication network NW and stored into the information server IS or the route server RS. It should be noted that this storage data is stored and retained in the database of each of the servers IS and RS, for example, so that it can be referenced by the PC 118 as required. In this way, this routine is ended.

Figure 35:
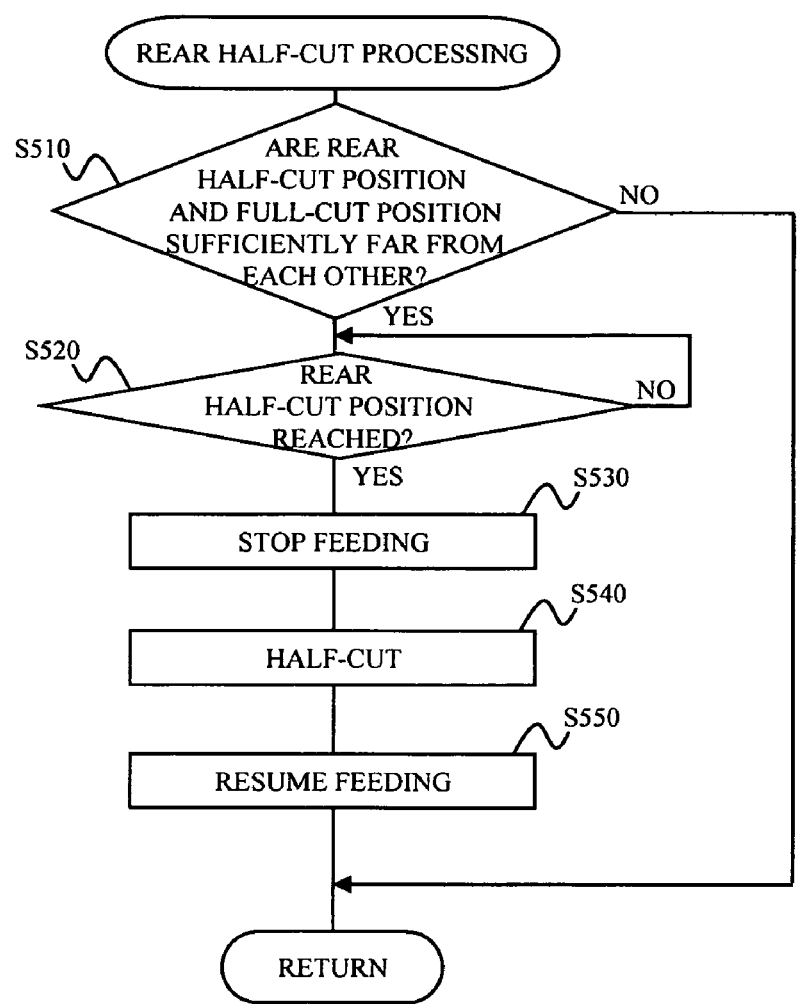
FIG. 35 is a flowchart showing the detailed procedure of step S500.

FIG. 35 is a flowchart showing the detailed procedure of step S500 described above with reference to FIGS. 32 and 33.

First, in step S510 of the flow shown in FIG. 35, it is determined whether or not there is a preset predetermined distance or more between the position of the rear half-cut line HC2 set in step S135 mentioned above, and the position of the cutting line CL set in step S140 mentioned above. This determination is not satisfied if the position of the rear half-cut line HC2 and the position of the cutting line CL are too close to each other, and it is regarded inappropriate to provide the rear half-cut line HC2 separately from the cutting line CL, so this routine is ended. On the other hand, this determination is satisfied if the position of the rear half-cut line HC2 and the position of the cutting line CL are sufficiently far from each other, and the process transfers to step S520. It should be noted that step S510 mentioned above is a procedure aimed at, for example, preventing the label from peeling at the time of full-cutting by the cutting mechanism 15 because the positions of the cutting line CL and rear half-cut line HC2 are too close to each other, or for preventing the peeled tape from sticking to the movable blade 41 of the cutting mechanism 15 or the like to cause a glitch in the operation of the device.

In step S520, in the same manner as in step S20, it is determined whether or not the tag label tape 109 with print has been fed to the above-described rear half-cut position (in other words, whether or not the tag label tape 109 with print has reached the position where the half-cutter 34 of the half-cut mechanism 35 directly faces the rear half-cut line HC2 calculated in step S135). In the same manner as described above, the determination at this time as well may be performed by, for example, detecting by a predetermined known method the distance by which the tag label tape 109 with print has been fed after the detection of the identifier PM of the base tape 101 in step S10 mentioned above (such as by counting the number of pulses output by the feed-motor drive circuit 121 for driving the feed motor 119 that is a pulse motor). The determination is not satisfied until the arrival at the rear half-cut position and this procedure is repeated, and upon the arrival at the rear half-cut position, the determination is satisfied and the process transfers to the next step S530.

In step S530, in the same manner as in step S50 or the like described above, a control signal is output to the feed-motor drive circuit 121 and the tape-discharging-motor drive circuit 123 via the input/output interface 113, and the drives of the feed motor 119 and tape discharging motor 65 are stopped, thus stopping the rotations of the tape feed roller 27, ribbon take-up roller 106, and drive roller 51. Accordingly, in the state with the half-cutter 34 of the half-cut mechanism 35 directly facing the rear half-cut line HC2 calculated in step S135, the paying out of the base tape 101 from the first roll 102, the paying out of the cover film 103 from the second roll 104, and the feeding of the tag label tape 109 with print stop.

Thereafter, the process transfers to step S540, and in the same manner as in step S30 mentioned above, a control signal is output to the half-cutter motor drive circuit 128 to pivot the half-cutter 34, thereby performing rear half-cutting processing of cutting the cover film 103, adhesive layer 101a, base film 101b, and adhesive layer 101c of the tag label tape 109 with print to form the rear half-cut line HC2 (see FIG. 21I or 24I).

Then, the process transfers to step S550 where, in the same manner as in step S35 mentioned above, the tape feed roller 27, the ribbon take-up roller 106, and the drive roller 51 are rotationally driven to resume the feeding of the tag label tape 109 with print, and this routine is ended.

Figure 36:
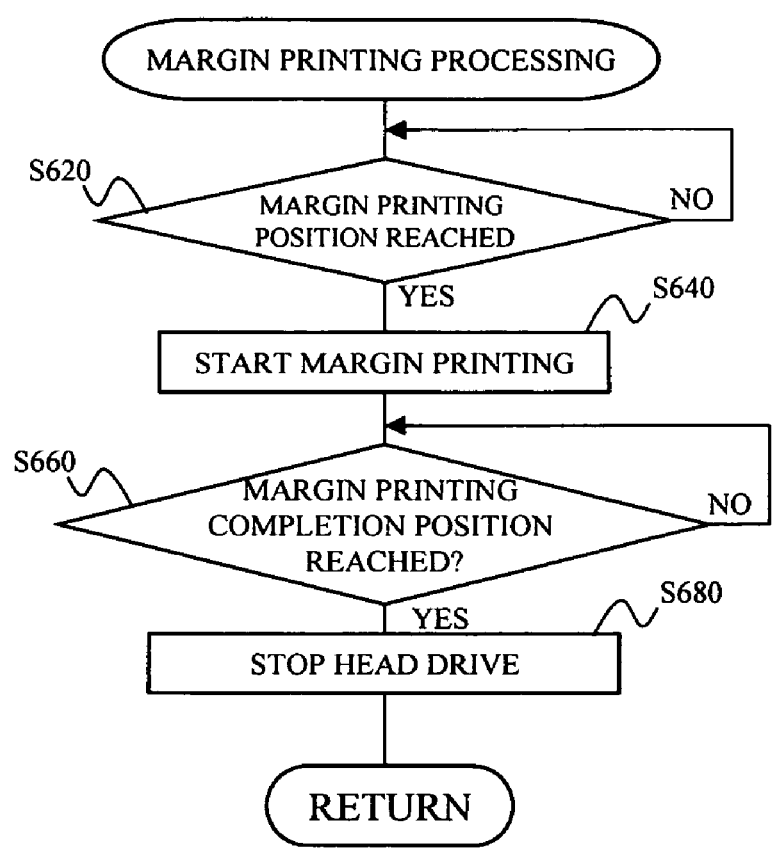
FIG. 36 is a flowchart showing the detailed procedure of step S600.

FIG. 36 is a flowchart showing the detailed procedure of step S600 described above with reference to FIG. 32 or 33. In the flow shown in FIG. 36, first, in step S620, it is determined whether or not the tag label tape 109 with print has been fed to the above-described margin printing start position (calculated in step S165 of FIG. 31 mentioned above). In the same manner as described above, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the margin printing start position and this procedure is repeated, and upon the arrival at the margin printing start position, the determination is satisfied and the process transfers to the next step S640.

In step S640, in the same manner as described above, the printing of the finished print number R1 is started by energizing the print head 23 (see FIG. 21J or 24J).

Thereafter, the process transfers to step S660, and it is determined whether or not the tag label tape 109 with print has been fed to the above-described margin printing end position (substantially set in steps S160 and S165 of FIG. 31 mentioned above). In the same manner as described above, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the margin printing end position and this procedure is repeated, and upon the arrival at the margin printing end position, the determination is satisfied and the process transfers to the next step S680.

In step S680, in the same manner as in step S260 described above, the energization of the print head 23 is stopped to stop the printing of the remaining-number information R. The printing of the remaining-number information R with respect to the front margin area S1 is thus completed, and this routine is ended.

Figure 37:
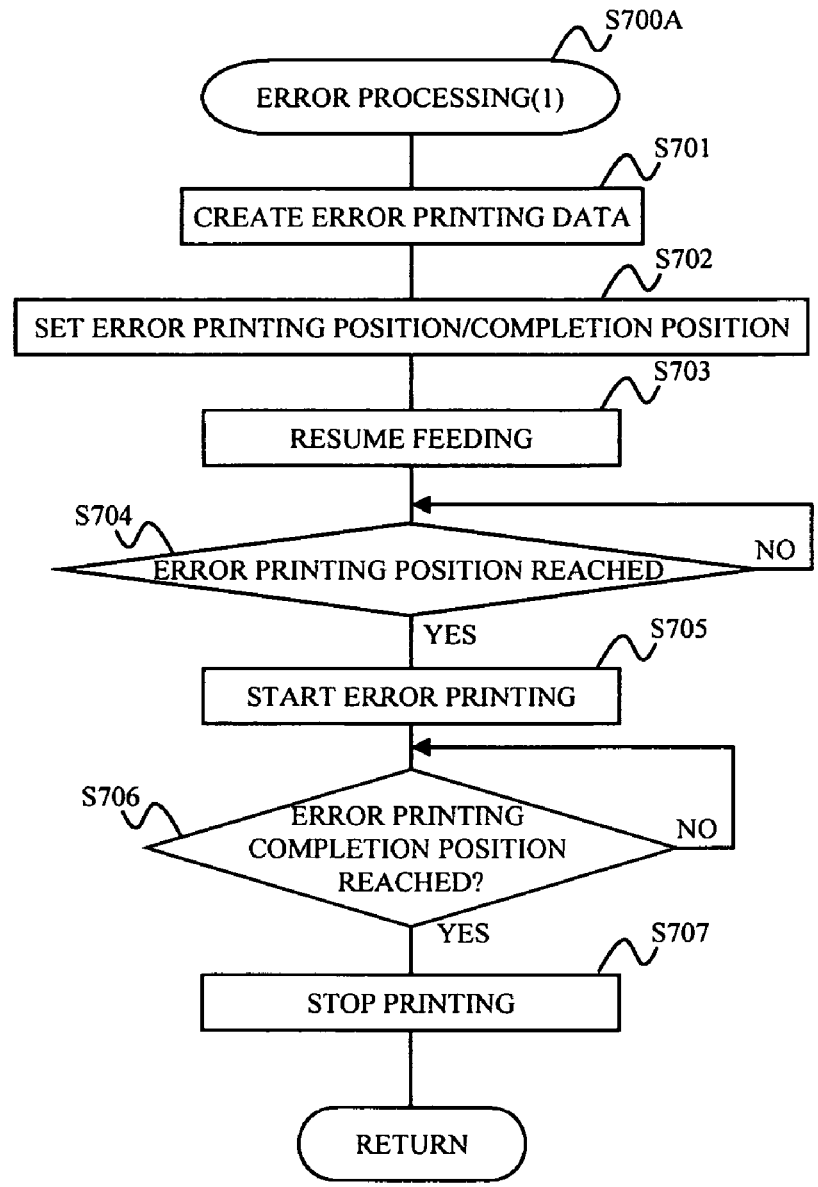
FIG. 37 is a flowchart showing step S700A as an example of the detailed procedure of step S700.

FIG. 37 is a flowchart showing step S700A as an example of the detailed procedure of step S700 shown in FIGS. 32 and 33. In this flow, at the time when a communication error occurs due to failed communication between the loop antenna LC and the RFID circuit element To, error processing (1) is executed in correspondence with this to perform printing of the above-mentioned other form of print R' indicative of the communication error.

First, in step S701 of the flow shown in FIG. 37, print data corresponding to the other form of print R' (the letter string "NG" in the example of FIG. 26 or FIG. 28 described above) printed at the time of the above-mentioned communication error is created. It should be noted that the content of the other form of print R' may be fixedly stored in advance in a suitable location of the control circuit 110, or may be designated or selected by the operator through the operation signal input in step S105. In step S701, on the basis of these, the creation of printing data is executed.

Thereafter, the process transfers to step S702, and the position on the tape where the printing of the other form of print R' corresponding to the above-mentioned communication error is performed is set. This setting is performed so that as for the printing start position, for example, in the state in which the tag label tape 109 with print has been fed by a predetermined distance (provided that this distance is 0, immediately after the above-mentioned state) from the communication position with the loop antenna LC (the feed position of the tag label tape 109 with print where the RFID circuit element To and the loop antenna LC substantially directly face each other) set in step S125 mentioned above, the printing is started (=printing is started from a tape position which the print head 23 substantially directly faces at the feed position that becomes the above-mentioned communication position). As for the printing completion position, in accordance with the content of the other from of print R' set in step S701 mentioned above, the setting is performed in correspondence with the print length thereof or the like.

Thereafter, the process transfers to step S703, and in the same manner as in step S240 of FIG. 32 or step S360 of FIG. 33, the tape feed roller 27, the ribbon take-up roller 106, and the drive roller 51 are rotationally driven to resume the feeding of the tag label tape 109 with print.

Thereafter, the process transfers to step S704, and it is determined whether or not the error printing start position set in step S702 has been reached. In the same manner as in step 210 of FIG. 32 or the like, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the error printing start position and this procedure is repeated, and upon the arrival at the error printing start position, the determination is satisfied and the process transfers to the next step S704. It should be noted that in the above-described example, if the error printing start position is set so that error printing is started immediately after the communication position, the determination of step S704 is satisfied immediately after resuming the feeding in step S703.

Figures 28A, 28I:
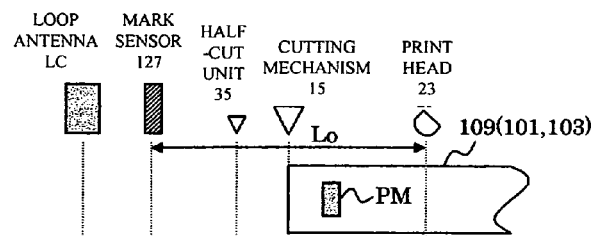
FIG. 28A-28K are respectively explanatory view showing the processing when a communication error occurs in the case where the print length is relatively short.
Figure 28B:
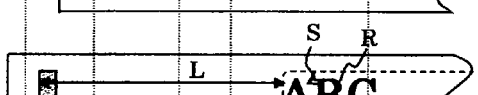
Figure 28C:
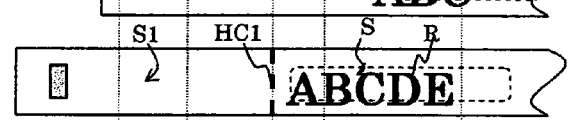
Figure 28D:
Figure 28E:
Figure 28F:
Figure 28G:
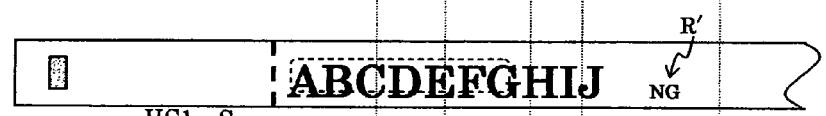
Figure 28H:

In step S705, in the same manner as in step S240 of FIG. 32, the print head 23 is energized to start the printing of the other form of print R' (see FIG. 26F or 28G).

Thereafter, the process transfers to step S706, and it is determined whether or not the error printing completion position set in step S702 has been reached. The determination at this time as well may be performed in the same manner as in step S250 of FIG. 32 or the like. The determination is not satisfied until the arrival at the error printing completion position and this procedure is repeated, and upon the arrival at the error printing completion position, the determination is satisfied and the process transfers to the next step S707.

In step S707, in the same manner as in step S260 of FIG. 32, the energization of the print head 23 is stopped to stop the printing of the above-mentioned other form of print R'. This completes the printing of the other form of print R' on the label rear-end side of the print area S (see FIG. 26G' or 28H').

Figure 38:
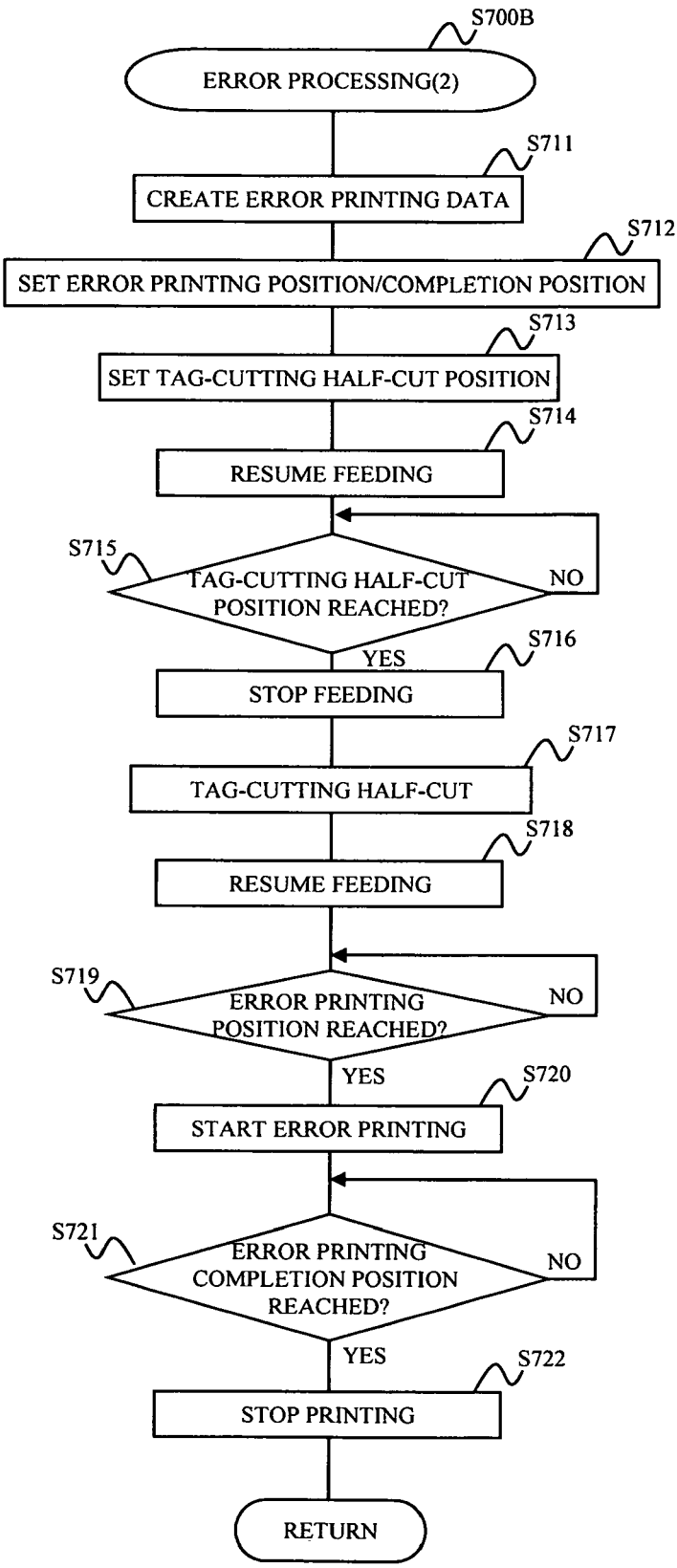
FIG. 38 is a flowchart showing step S700B as an example of the detailed procedure of step S700.

FIG. 38 is a flowchart showing step S700B as another example of the detailed procedure of step S700 shown in FIGS. 32 and 33. In this flow, at the time when a communication error occurs due to failed communication between the loop antenna LC and the RFID circuit element To, in response to this, printing of the above-mentioned other form of print R' indicative of this communication error is performed, and further, error processing (2) of cutting the RFID circuit element To with the half-cutter 34 of the half-cut unit 35 is executed.

Steps S711, S712 of the flow shown in FIG. 38 are the same as steps S701, S702 of FIG. 37 mentioned above, respectively. In steps S711, S712, printing data of the other form of print R' to be printed at the time of the communication error mentioned above is created, and the position on the tape where the other form of print R' is printed is set.

Thereafter, in step S713, the cutting position of the RFID circuit element To with the half-cutter 34 mentioned above is set. As for this position setting, for example, since the location of the RFID circuit element To from the front end to the rear end on the tape is known from steps S125 and S145 of FIG. 31 described above, the position setting is performed to determine which position within the above-mentioned location (for example, a position at a predetermined distance from the front end of the RFID circuit element To) is to be cut by the half-cutter 34. It should be noted that this position setting may be previously stored fixedly in a suitable location of the control circuit 110 (for example, always at the central portion of the RFID circuit element To with respect to the tape length direction or at the ¼ length position), or may be designated or selected by the operator through the operation signal input in step S105 described above.

Thereafter, the process transfers to step S714, and in the same manner as in step S703 of FIG. 37, the tape feed roller 27, the ribbon take-up roller 106, and the drive roller 51 are rotationally driven to resume the feeding of the tag label tape 109 with print.

Thereafter, substantially in the same manner as in steps S520, S530, S540, S550 described above with reference to FIG. 35, steps S715, S716, S717, S718 are executed. That is, in step S715, it is determined whether or not the tag label tape 109 with print has been fed to the tag-cutting half-cut position set in step S713 mentioned above. In case the determination is satisfied, in step S716, the feeding of the tag label tape 109 with print is stopped (in this state, the half-cutter 34 directly faces some location of the RFID circuit element To), and in step S717, a control signal is output to the half-cutter motor drive circuit 128 to pivot the half-cutter 34, thereby cutting some location of the RFID circuit element To. In step S718, the feeding of the tag label tape 109 with print is resumed.

Since steps S720, 721, 722 after step S719 are the same as steps S704, S705, S706, S707 of FIG. 37 mentioned above, the description thereof is omitted.

Figure 39:
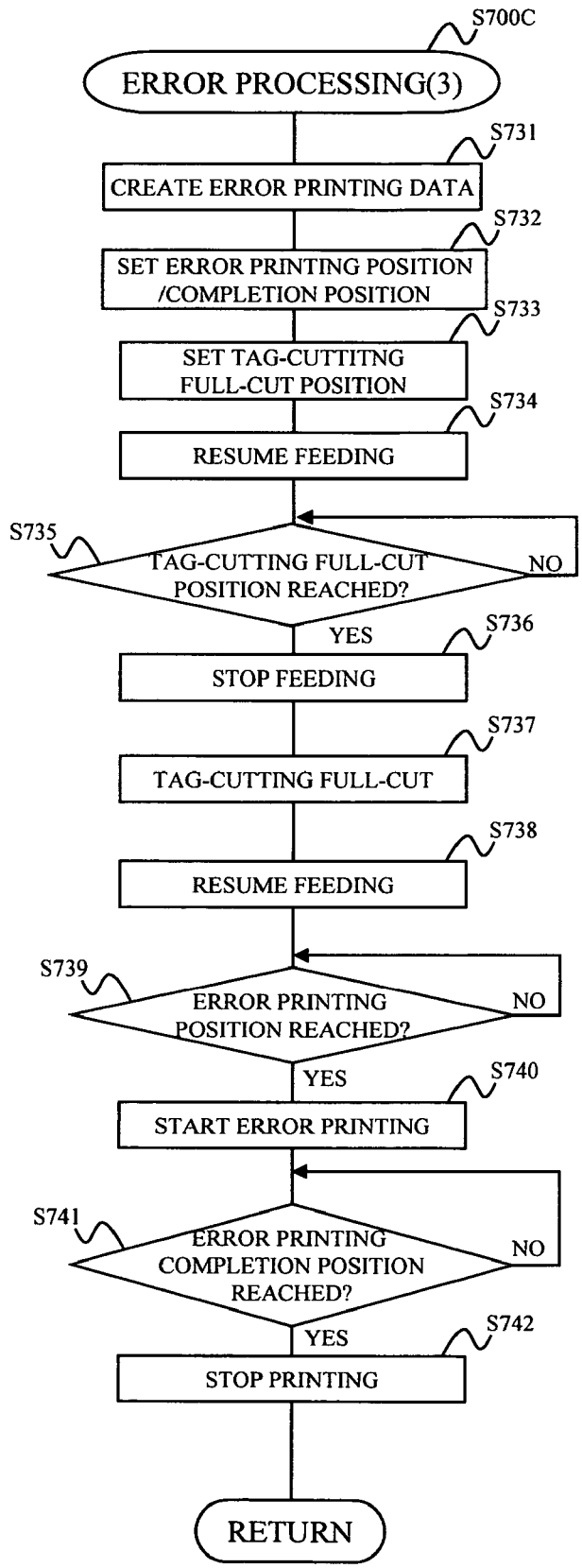
FIG. 39 is a flowchart showing step S700C as an example of the detailed procedure of step S700.

FIG. 39 is a flowchart showing step S700C as still another example of the detailed procedure of step S700 shown in FIGS. 32 and 33. In this flow, at the time when a communication error occurs due to failed communication between the loop antenna LC and the RFID circuit element To, in response to this, printing of the above-mentioned other form of print R' indicative of this communication error is performed, and further, error processing (3) of cutting the RFID circuit element To with the movable blade 41 of the cutting mechanism 15 is executed.

The respective procedures shown in the flow of FIG. 39 are identical to the respective procedures shown in FIG. 38 except only that the procedures relating to the half-cutter 34 are replaced by those relating to the movable blade 41. That is, in step S733 corresponding to step S713, the cutting position of the RFID circuit element To with the movable blade 41 is set. In step S735 corresponding to step S715, it is determined whether or not the full-cut position thus set has been reached, and if the full-cut position has been reached, in step S737 (corresponding to step S717), the movable blade 41 is driven by the cutter motor 43 to thereby perform cutting of the RFID circuit element To. The other procedures are the same as those of FIG. 38, so description thereof is omitted.

Figure 40:
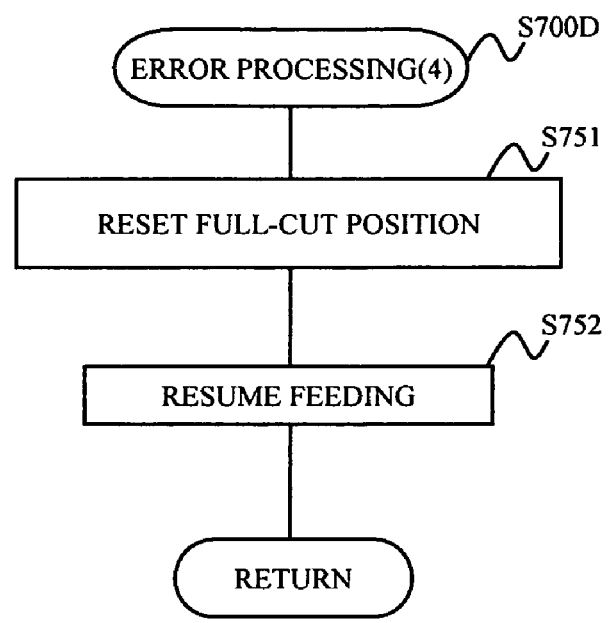
FIG. 40 is a flowchart showing step S700D as an example of the detailed procedure of step S700.

FIG. 40 is a flowchart showing step S700D as yet still another example of the detailed procedure of step S700 shown in FIGS. 32 and 33. In this flow, at the time when a communication error occurs due to failed communication between the loop antenna LC and the RFID circuit element To, the printing of the other form of print R' as described above is not performed but error processing (4) is executed instead, in which an RFID label T that is longer than usual is produced as an exceptional case to make the operator recognize the error.

In step S751 of the flow shown in FIG. 40, in order to produce an RFID label T that is longer than usual at the time of the communication error mentioned above, the full-cut position (the position of the cutting line CL on the tape where cutting is performed by the movable blade 41 of the cutting mechanism 15) once set in step S140 of FIG. 31 is reset. Specifically, for example, the position of the cutting line CL is largely offset to the tape rear-end side with respect to the position set in step S140 mentioned above.

Thereafter, in step S752, in the same manner as in step S703 or the like, the tape feed roller 27, the ribbon take-up roller 106, and the drive roller 51 are rotationally driven to resume the feeding of the tag label tape 109 with print, and this routine is ended.

In the label producing device 1 according to this embodiment configured as described above, the predetermined label print R is printed by the print head 23 with respect to the print area S of the cover film 103, and the tag label tape 109 with print of a laminate structure including three layers consisting of the cover film 103, the adhesive layer 101c, and the separation sheet 101d covering the adhesive layer 101c is fed, and this tag label tape 109 with print is cut by the cutting mechanism 15 into a predetermined length to thereby produce the RFID label T.

At this time, it is determined which one of the following two events, the arrival of the RFID circuit element To of the tag label tape 109 with print at the communication position with the antenna LC, and the completion of printing onto the print area S by the print head 23, chronologically precedes the other. Then, in accordance with the result of this determination, in case it is determined that the completion of printing with respect to the print area S takes place first, in the processing of producing a short print label in step S300, the feeding is stopped upon arrival at the above-mentioned communication position (step S340), and after performing transmission/reception of information via the loop antenna LC (step S400), the feeding is resumed (step S360). On the other hand, in case it is determined in step S40 that the arrival at the communication position takes place first, in the processing of producing a long print label in step S200, the feeding and printing are stopped upon arrival at the above-mentioned communication position (step S220), and after performing transmission/reception of information via the loop antenna LC (step S400), the feeding and the printing onto the print area S are resumed (step S240).

In this way, in accordance with the state at the time of arrival at the communication position, the subsequent operations are switch-controlled, thereby allowing finely coordinated control to be performed easily and quickly in such a manner that if it is possible and better to reflect the results of information transmission/reception, the success or failure of which has been determined in step S230 of FIG. 32 or step S35 of FIG. 33, on the printing, the results are reflected (see step S700 in FIG. 32 or 33), and if it is unnecessary and impossible to reflect the results on the printing, the results are not reflected (see the steps from step S240 of FIG. 32 onward, or the steps from step S360 of FIG. 33 onward). That is, when the transmission/reception of information has been successfully performed, since it is not particularly necessary to reflect the result of information transmission/reception (it suffices to notify the operator of the result only in the event of a failure), the printing by the print head 23 is resumed as it is, thus allowing the RFID label T to be reliably produced as usual. When the transmission/reception of information has failed, by performing predetermined error processing in step S700 (performing printing corresponding to the failure in step S700A, performing cutting of the RFID circuit element in step S700B or step S700C, or changing the length of the RFID label T in step S700D), the result of the information transmission/reception (=failure) can be made visually clear and recognized by the operator.

In this way, as the base tape 101 and the tag label tape 109 with print are fed (moved), predetermined processing on the basis of information related to that movement (the chronological relation between printing and communication in this example) is performed, thereby making it possible to enhance the convenience of the operator. This also proves advantageous in that in case it is determined in step S40 that the printing with respect to the print area S takes place first, in the processing of producing a short label print in step S300, the RFID label T can be produced quickly without performing the needless control of driving the print head 23 again after the arrival at the communication position.

Further, in this embodiment, in particular, the layers other than the separation sheet 101d are cut by the half-cut unit 35 to thereby form the front and rear half-cut lines HC1, HC2. Accordingly, when peeling off the separation sheet 101d from the other layers (the label main body 103, 101a to 101c) in order to affix the produced RFID label T onto a target affixing object, the separation sheet 101d can be easily peeled off with the fingertips. Further, since the length of the label main body 103, 101a to 101c (corresponding to the print length) to be actually peeled off and affixed can be regulated on the basis of the positions of the front and rear half-cut lines HC1, HC2, the length of a single RFID label T (in other words, the lengths of the tag label tape 109 with print, base tape 101, and cover film 103 used for one label production) can be made constant at all times irrespective of the length of the above-mentioned label main body 103, 101a to 101c to be affixed.

Further, since a label tape for which transmission/reception of information has failed cannot be used as a label, in this embodiment, in particular, as described above with reference to step S700A, for example, rather than forming the half-cut lines HC1, HC2 by the half-cut unit 35, which is normally performed at both end portions of the tape, only the half-cut line HC1 is formed, and the formation of the half-cut line HC2 is omitted without performing cutting, whereby unnecessary cutting operation by the half-cutter 34 can be eliminated to simplify the control. This also proves advantageous in that the absence of the half-cut line HC2 can make it visually clear to the operator that the label has failed in transmission/reception.

It should be noted that while the foregoing is directed to the example in which the half-cut unit 35 cuts off layers of the tag label tape 109 with print other than the separation sheet 101d, this should not be construed restrictively; conversely, only the separation sheet 101d may be cut off. In this case as well, the originally intended effect of the present disclosure, namely enhancing the convenience of the operator by switch-controlling, in accordance with the state at the time of arrival at the communication position, the subsequent operations.

Next, a tag-label producing device according to a second embodiment of the present disclosure will be described. According to this embodiment, even when transmission/reception of information with respect to one RFID circuit element has failed, transmission/reception of substantially the same information is automatically performed with respect to another succeeding RFID circuit element. In the drawings, the members or functions (control processing procedures) that are identical or equivalent to those of the first embodiment mentioned above are denoted by the same reference numerals, and description thereof is omitted.

Figure 41:
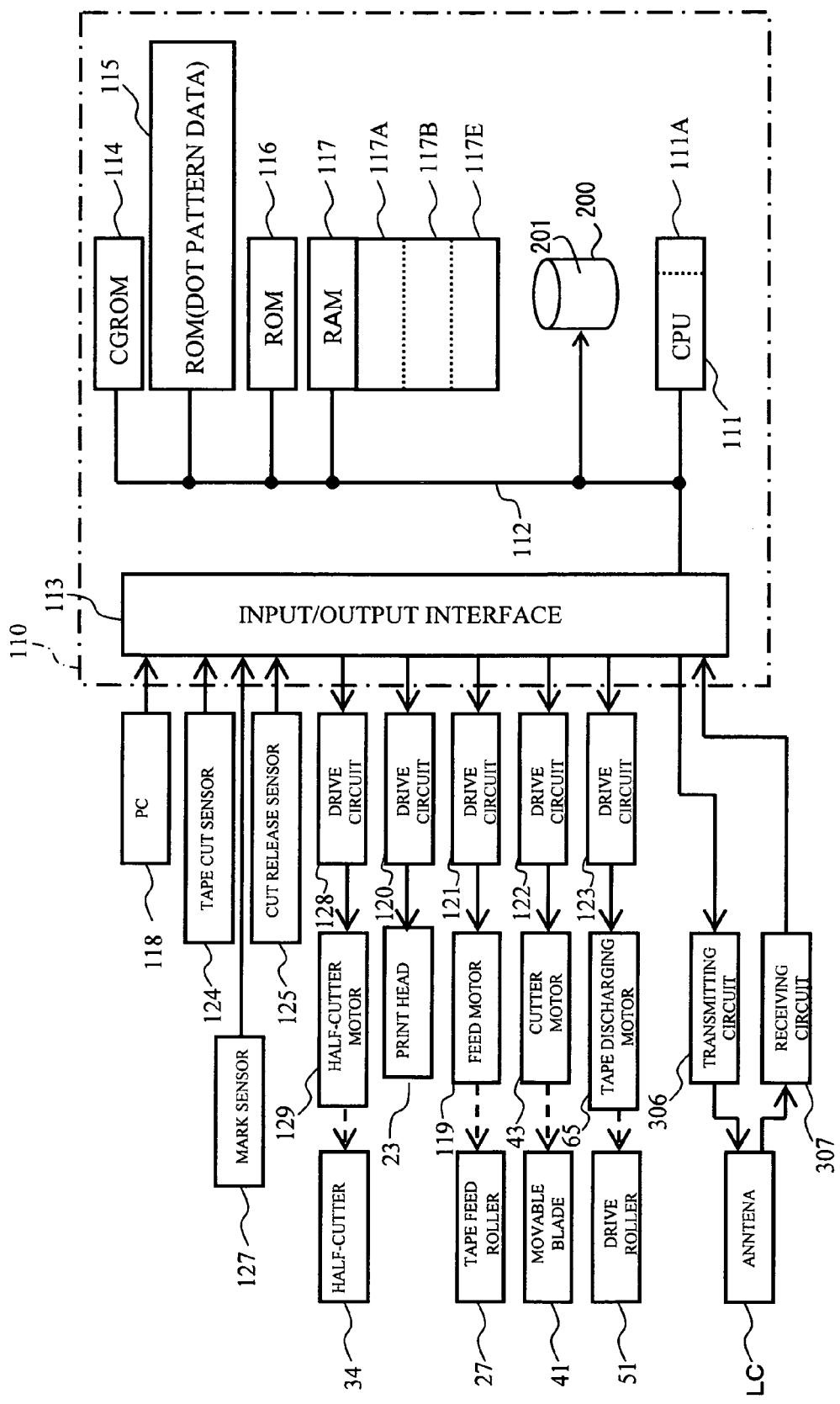
FIG. 41 is a functional block diagram showing the control system of a tag-label producing device according to a second embodiment of the present disclosure.

FIG. 41 is a functional block diagram showing the control system of the tag-label producing device according to this embodiment. In FIG. 41, the control circuit 110 of the tag-label producing device 1 according to this embodiment includes a storage device 200 consisting of, for example, a large-capacity hard disk having non-volatility or the like. The storage device 200 has a built-in database 201 in which employee information, merchandise information, customer information, and so on are registered. In this case, it is not necessary to provide a database in the information server IS as in the first embodiment described above.

Figure 42:
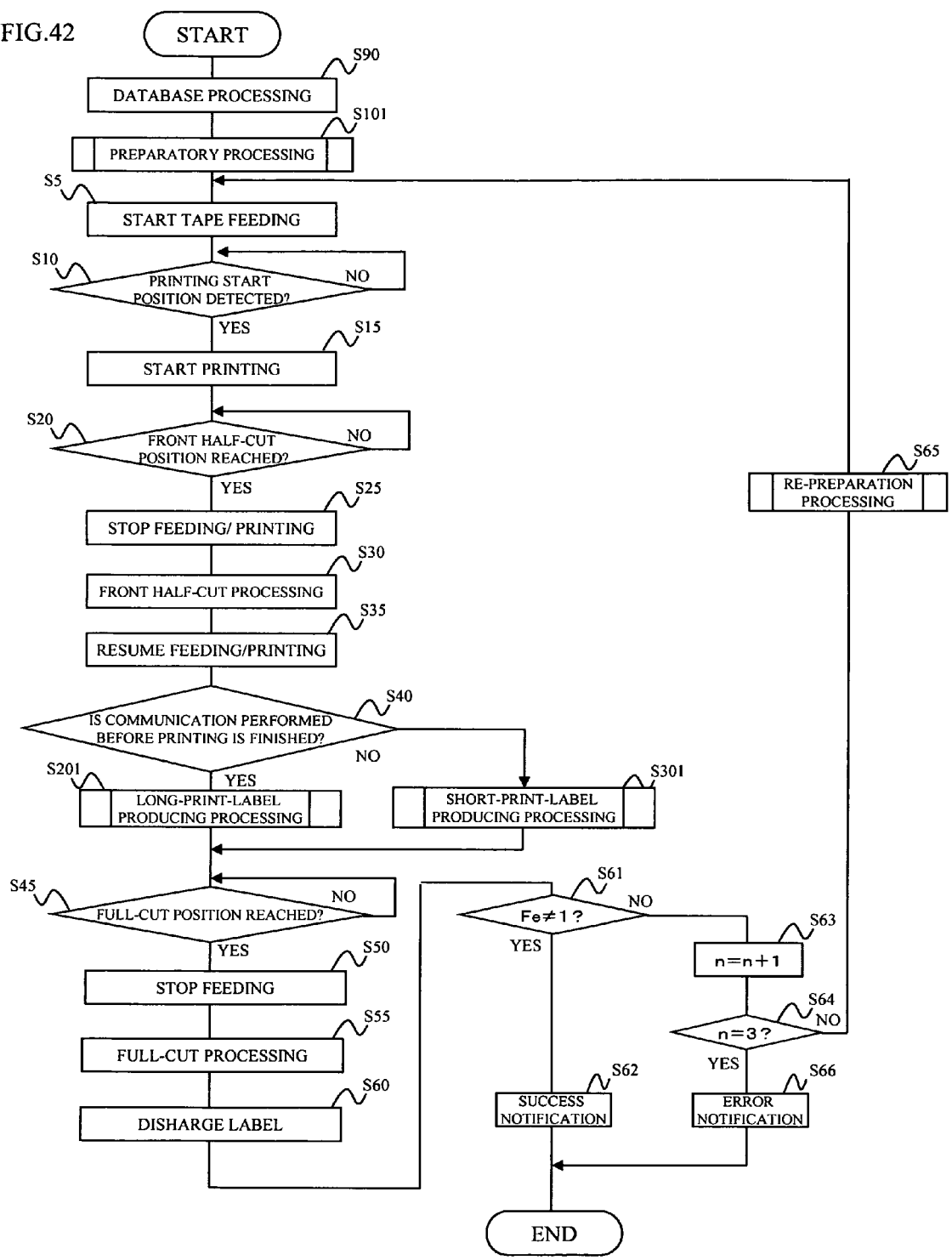
FIG. 42 is a flowchart showing the procedure of control executed by the control circuit.

FIG. 42 is a flowchart, corresponding to FIG. 30 described above, showing the procedure of control executed by the control circuit 110 in this embodiment.

In FIG. 42, before step S100 of FIG. 30, step S90 is newly added first, and after step S60, steps S61 to S66 are newly added. Further, as for steps S100, S200, and S300 as well, their detailed procedures are partially modified as steps S101, S201, and S301, respectively.

That is, first, in step S90, the appearance image of the RFID label T is registered into the database 201 of the storage device 200.

Specifically, when the operator first operates suitable operation device of the PC 118 to select which of data in the database 201 is to be used, the corresponding database reference command signal is sent to the control circuit 110, and the data record (group) of data already registered in the database 201 is extracted from the storage device 200 and displayed in, for example, a list form on suitable display device of the PC 118. The operator looks at the reference data thus displayed, and performs selection of data (selection and input via the above-mentioned operation device) necessary for the issuing of the RFID label T or the like. Then, the image of the outward appearance (print form) of the RFID label T to be issued is created and displayed on the above-mentioned display device of the PC 118. Then, the appearance image data of the RFID label T is stored and retained in the database 201 while being associated with information data or the like of the RFID label T or tag ID.

Thereafter, in step S101, preparatory processing (for details, see FIG. 43 that will be described later) is executed. In the preparatory processing, the operation signal from the above-mentioned PC 118 is input (via the communication line NW and the input/output interface 113), and on the basis of this operation signal, setting of print data or communication data with the RFID element To, or the like is performed.

Thereafter, steps S5 to S40 are carried out in order. At this time, for example, if the length of the label print R to be printed is relatively long and the positional relation as shown in FIG. 21F mentioned above results, the determination of step S40 mentioned above is satisfied, and the process transfers to step S201 where the processing of producing a long print label (for details, see FIG. 44 that will be described later) is performed. On the other hand, for example, if the length of the label print R to be printed is relatively short and the positional relation as shown in FIG. 24G mentioned above results, the determination of step S40 mentioned above is not satisfied, and the process transfers to step S301 where the processing of producing a short print label (for details, see FIG. 45 that will be described later) is performed.

Once step S201 or S301 is finished, after carrying out steps S45 to S60 mentioned above in order, the process transfers to step S61. In step S61, a determination is made as to whether a flag (details of which will be described later) Fe, which indicates that error processing has been performed due to failed communication with the RFID circuit element To, is not Fe=1, that is, whether Fe=0 (success) or not. Here, if the transmission/reception of information has succeeded in step S201 or S301, no error processing is performed and hence the above-mentioned flag Fe should be Fe=0; if the transmission/reception of information has failed, error processing is performed and hence the above-mentioned flag Fe should be F=1 (see step S236 of FIG. 44 or step S356 of FIG. 45 that will be described later).

If the communication has succeeded, since Fe=0 as described above, the determination is satisfied, and the process transfers to step S62. In step S62, a successful communication signal indicative of the success of the communication with respect to the RFID circuit element To is sent out to the above-mentioned PC 118 via the input/output interface 113 and the communication line NW, and this flow is ended.

On the other hand, if the communication has failed, since Fe=1 as described above, the determination is not satisfied, and the process transfers to step S63. In step S63, 1 is added to n indicating the number of different RFID circuit elements (number of times) for which communication of the same information is tried, and further in step S64, it is determined whether or not n=3.

At this time, the determination is not satisfied if $n \leq 2$, and the process transfers to step S65. In step S65, re-preparation processing (for details, see FIG. 46 that will be described later) of performing the setting of the print data or communication data with the RFID circuit element To or the like again is executed.

On the other hand, if n=3, the determination is satisfied, and the process transfers to step S66. In step S66, since it is known that attempts at communication with three RFID circuit elements To have failed consecutively in succession, an error notification signal is sent out to the above-mentioned PC 118 via the input/output interface 113 and the communication line NW, and this routine is ended. In this way, even when transmission/reception of information is unsuccessful, transmission/reception of substantially the same information is tried with respect to different RFID circuit elements up to three RFID circuit elements (three times).

It should be noted that in this example, the number of RFID circuit elements (number of times) for which transmission/reception of substantially the same information is tried is set as n=3, and an error notification is made when communication with respect to the RFID circuit elements has failed three times consecutively. However, the number of times is not particularly limited to three.

Figure 43:
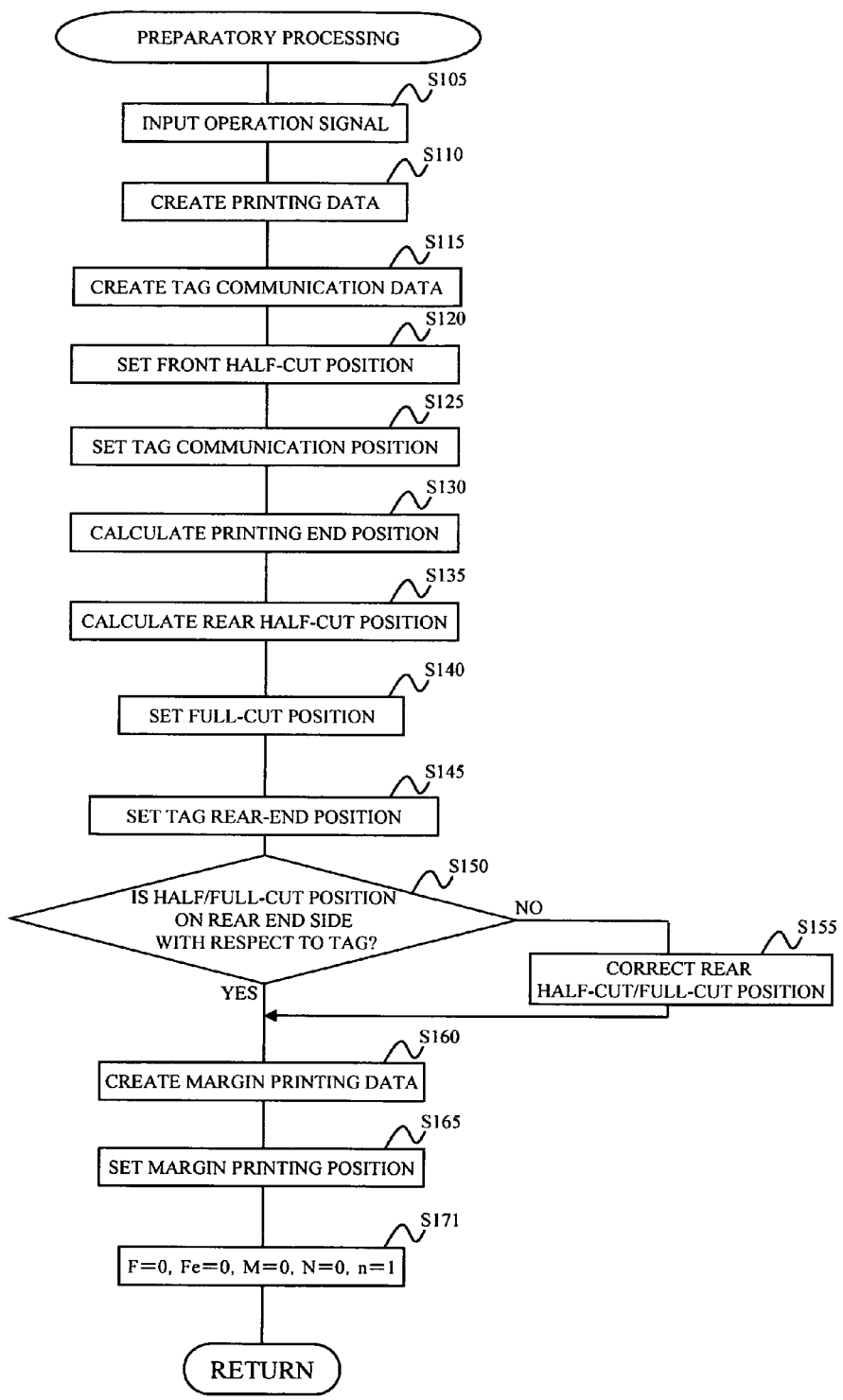
FIG. 43 is a flowchart showing the detailed procedure of step S101.

FIG. 43 is a flowchart, corresponding to FIG. 31 described above, showing the detailed procedure of step S101 mentioned above. In FIG. 43, instead of step S170 in FIG. 31, step S171 corresponding to this is provided.

In step S171, in the same manner as in step S170 in FIG. 31, variables M, N for counting the number of times access is tried if there is no response from the RFID circuit element To, and a flag F indicating whether or not communication has succeeded are initialized to 0. Further, in step S171, in addition to this, the variable n for counting the number of different RFID circuit elements To for which transmission/reception of substantially the same information is tried, is initialized as n=1, and the flag Fe, which indicates whether or not error processing has been performed due to failed transmission/reception of information, is initialized to 0, and this routine is ended.

Figure 44:
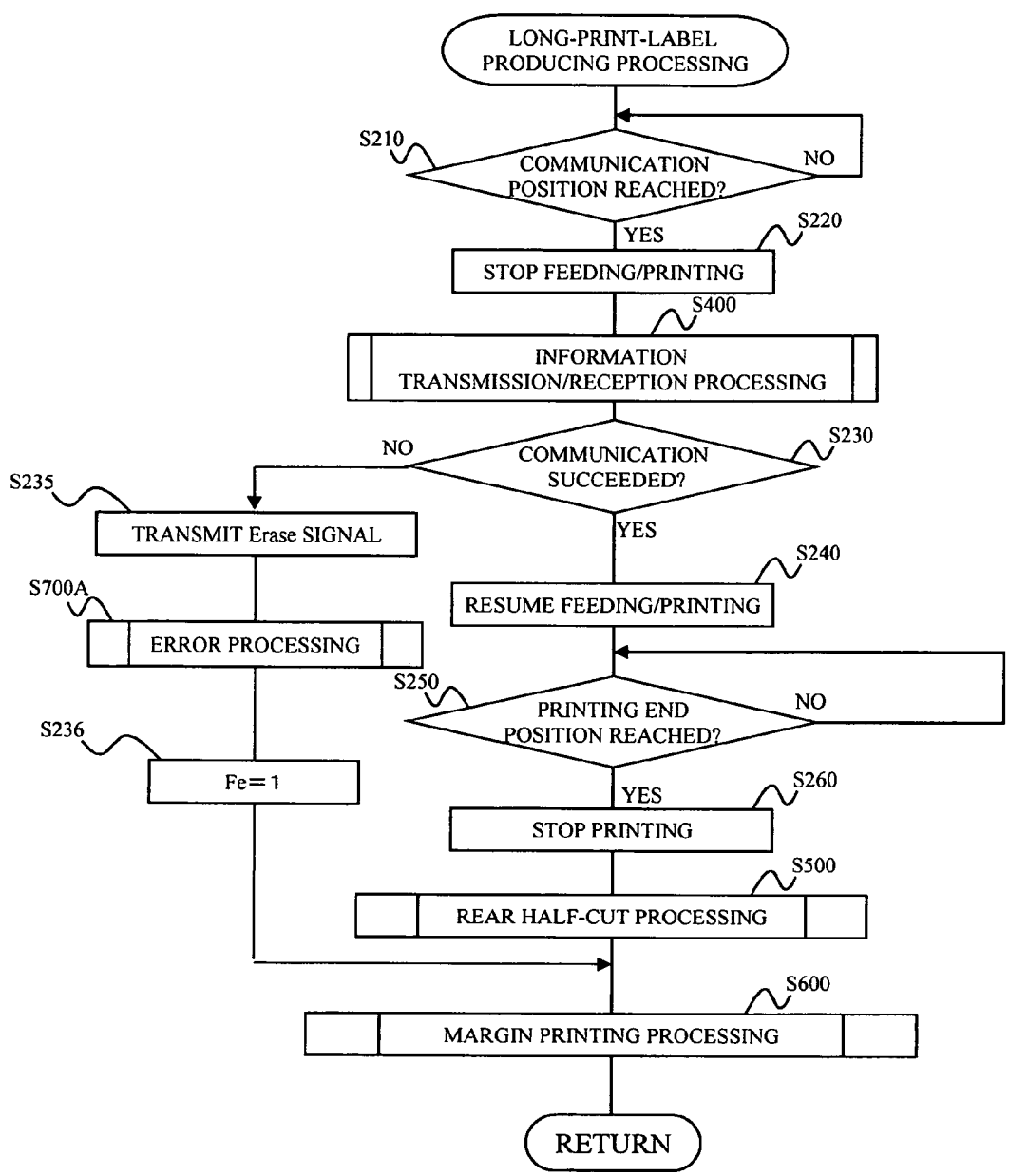
FIG. 44 is a flowchart showing the detailed procedure of step S201.

FIG. 44 is a flowchart, corresponding to FIG. 32 described above, showing the detailed procedure of step S201 mentioned above. In FIG. 44, step S235 is newly provided before the error processing of step S700 in FIG. 32, and step S236 is newly provided after the error processing of step S700. It should be noted that step S700A shown in FIG. 37 is employed as an example representing the error processing of step S700.

In step S235, in the same manner as in step S405 of FIG. 34, as an "Erase" signal for initializing information stored in the memory part 157 of the RFID circuit element To, a carrier wave on which predetermined modulation has been performed is transmitted via the loop antenna LC to the RFID circuit element To to which information is to be written. The memory part 157 of the RFID circuit element To is thus initialized.

Then, after carrying out the above-described error processing of step S700A, the process transfers to step S236. In step S236, since it is determined in step S230 that communication with respect to the RFID circuit element To has failed, and thus error processing has been performed in step S700A mentioned above, the corresponding flag Fe is set as Fe=1, and thereafter the process transfers to step S600.

Figure 45:
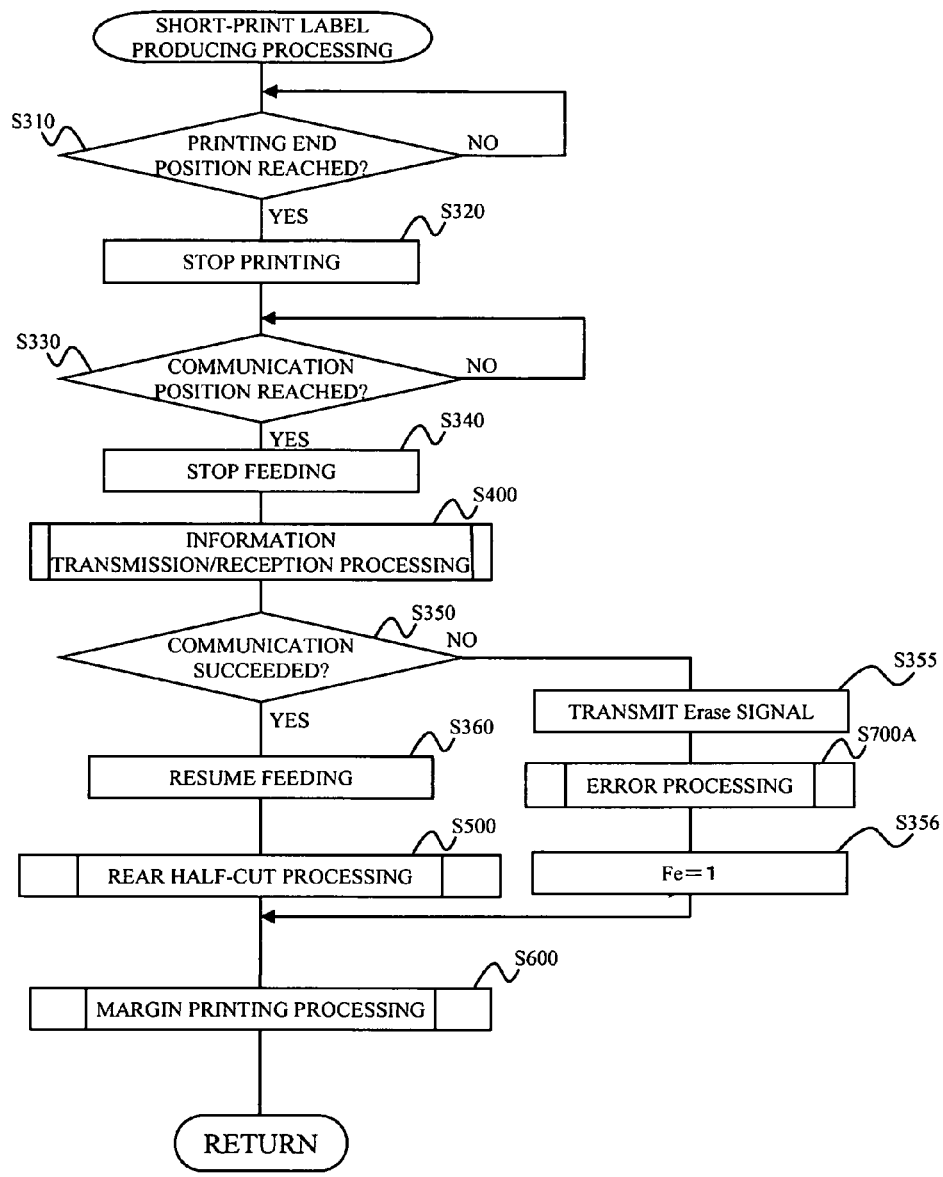
FIG. 45 is a flowchart showing the detailed procedure of step S301.

FIG. 45 is a flowchart, corresponding to FIG. 33 described above, showing the detailed procedure of step S301 mentioned above. In FIG. 45, step S355 is newly provided before the error processing of step S700 in FIG. 33, and step S356 is newly provided after the error processing of step S700. It should be noted that step S700A shown in FIG. 37 is employed as an example representing the error processing of step S700.

In step S355, in the same manner as in step S405 of FIG. 34, as an "Erase" signal for initializing information stored in the memory part 157 of the RFID circuit element To, a carrier wave on which predetermined modulation has been performed is transmitted via the loop antenna LC to the RFID circuit element To to which information is to be written. The memory part 157 of the RFID circuit element To is thus initialized.

Then, after carrying out the above-described error processing of step S700A, the process transfers to step S356. In step S356, since it is determined in step S350 that communication with respect to the RFID circuit element To has failed, and thus error processing has been performed in step S700A mentioned above, the corresponding flag Fe is set as Fe=1, and thereafter the process transfers to step S600.

Figure 46:
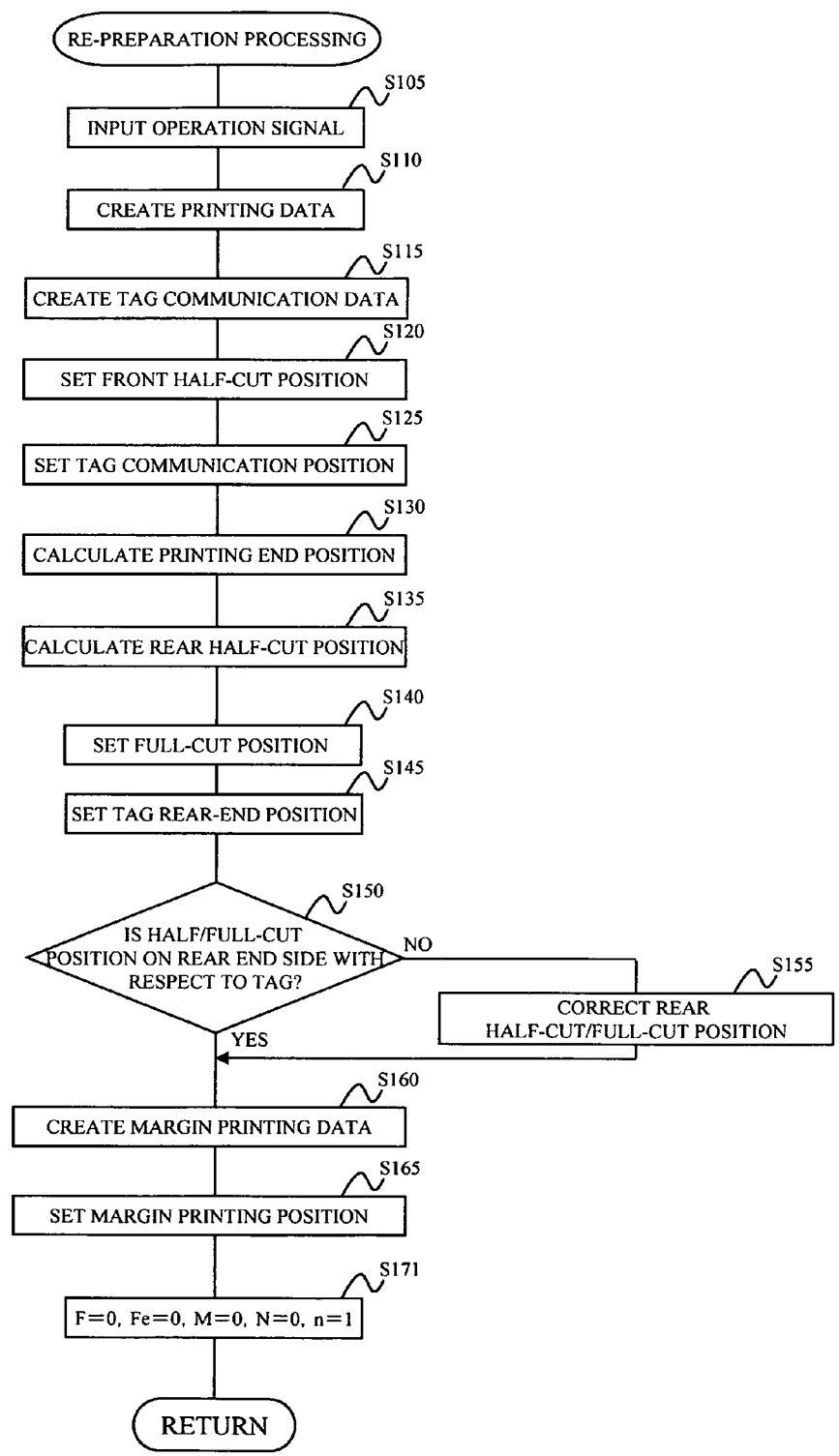
FIG. 46 is a flowchart showing the detailed procedure of step S65.

FIG. 46 is a flowchart showing the detailed procedure of "re-preparation processing" in step S65 mentioned above. Step S65 is similar to the procedure of the "preparatory processing" in FIG. 43 described above, and differs from the processing of FIG. 43 only in that step S105 is omitted.

In the second embodiment configured as described above, in addition to the effects similar to those of the above-mentioned first embodiment, even when the RFID label T is produced in the state where transmission/reception of information with respect to one RFID circuit element To has failed, after discharging this RFID label T, information that is substantially the same as the information of which transmission/reception has failed as described above, is transmitted/received to/from another RFID circuit element To arranged on the trailing side in the feed direction with respect to the RFID circuit element To, thereby producing another RFID label T. Accordingly, even when the transmission/reception of information has failed, the RFID label T can be automatically produced again without any additional operation by the operator, thereby making it possible to reduce the burden on the operator.

Next, a tag-label producing device according to a third embodiment of the present disclosure will be described. In this embodiment, the present disclosure is also adapted to the successive batch production of a plurality of RFID labels. In the drawings, the members or functions (control processing procedures) that are identical or equivalent to those of the two embodiments described above are denoted by the same reference numerals, and description thereof is omitted.

Figure 47:
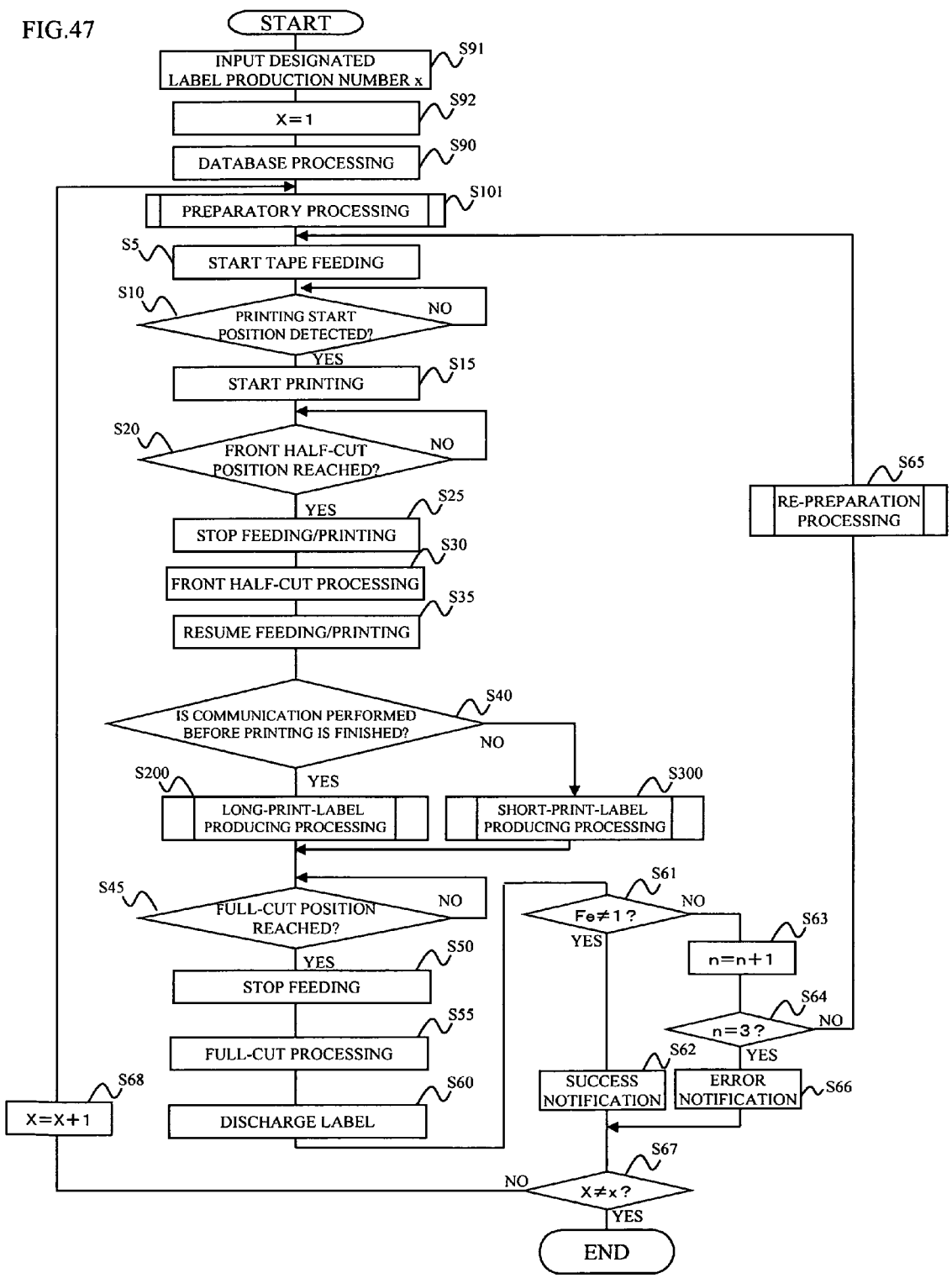
FIG. 47 is a functional block diagram showing the control system of a tag-label producing device according to a third embodiment of the present disclosure.

FIG. 47 is a flowchart, corresponding to FIG. 42 described above, showing the procedure of control executed by the control circuit 110 according to this embodiment. In FIG. 47, steps S91, S92 are newly added before step S90 of FIG. 42, and steps S67, S68 are newly provided after step S62 or S66.

That is, first, in step S91, the number of RFID labels T (designated label production number) x to be produced, which is input by the operator via suitable operation device of the PC 118, is input via the input/output interface 113. Subsequently, in step S92, the variable X for counting the number of times the RFID label T is produced (the number of RFID labels T) in accordance with the designated label production number x is initialized as X=1.

Thereafter, after carrying out steps S90 to S62 or S66 in order, in step S67, it is determined whether or not X=x. If the variable X is not X=x, the determination is not satisfied, and it is regarded that the production of the number of RFID labels T according to the designated label production number x has not been completed; the process then transfers to step S68 where 1 is added to X, and the processing from step S101 onward is executed again. When the variable X has become X=x, the determination is satisfied, and it is regarded that the production of the number of RFID labels T according to the designated label production number x has been completed, so this routine is ended.

Through the processing as described above, if the designated label production number x is plural, it means that a plurality of RFID labels T have been successively produced. Further, if transmission/reception of information has failed in a given RFID label T, in the same manner as described above (without counting the number of such RFID labels T in step 68, that have failed in transmission/reception), the communication is retried and the production of new RFID labels T is tried using succeeding RFID circuit elements To; if the transmission/reception of information has succeeded within three tries, the number of RFID labels T that have succeeded in communication is counted in step S68, and the process returns to step S101 to repeat the processing. Accordingly, the RFID labels T are produced so that the number of RFID labels T that have finally succeeded in communication is made as close as possible to the number x as designated in step S91.

In the foregoing, steps S91, S92, S67, S68 of FIG. 47 each correspond to successive production controlling portion for coordinately controlling the feeding device, the printing device, the communication device, and the discharge device so as to produce a plurality of RFID labels each including the RFID circuit element at once.

According to this embodiment, in addition to the same effects as those of the above-mentioned first embodiment, if it is previously known that a plurality of RFID labels T are to be produced, it suffices for the operator to designate the successive production of a plurality of RFID labels T by inputting the designated label production number x from the PC 118, and there is no need to repeat the same operation and produce the plurality of RFID labels T individually one by one. Further, even when transmission/reception of information has failed in some RFID labels T during the production of a plurality of RFID labels T, the number of RFID labels T corresponding to the number of RFID labels T that have failed in the transmission/reception of information can be automatically produced without any additional operation by the operator from the PC 118. This makes it possible to reduce the burden on and enhance the convenience of the operator.

It should be noted that the above-mentioned first to third embodiments are not limited to the forms described above but can be modified in various ways without departing from the scope and technical idea thereof. Such modifications will be sequentially described below.

(1) When the Print Head is Stopped at a White Line

In the first to third embodiments mentioned above, during the processing of producing a long print label as shown in FIG. 32, the feeding of the tag label tape 109 with print and the printing with the print head 23 are temporarily interrupted prior to the completion of printing by the print head 23. If, upon thus stopping the feeding, the print head 23 is not being stopped at a non-printing blank portion (white line) located between the print letters or print patterns in the print area S, drive control may be performed so that the print head 23 is stopped at that portion.

Figure 48:
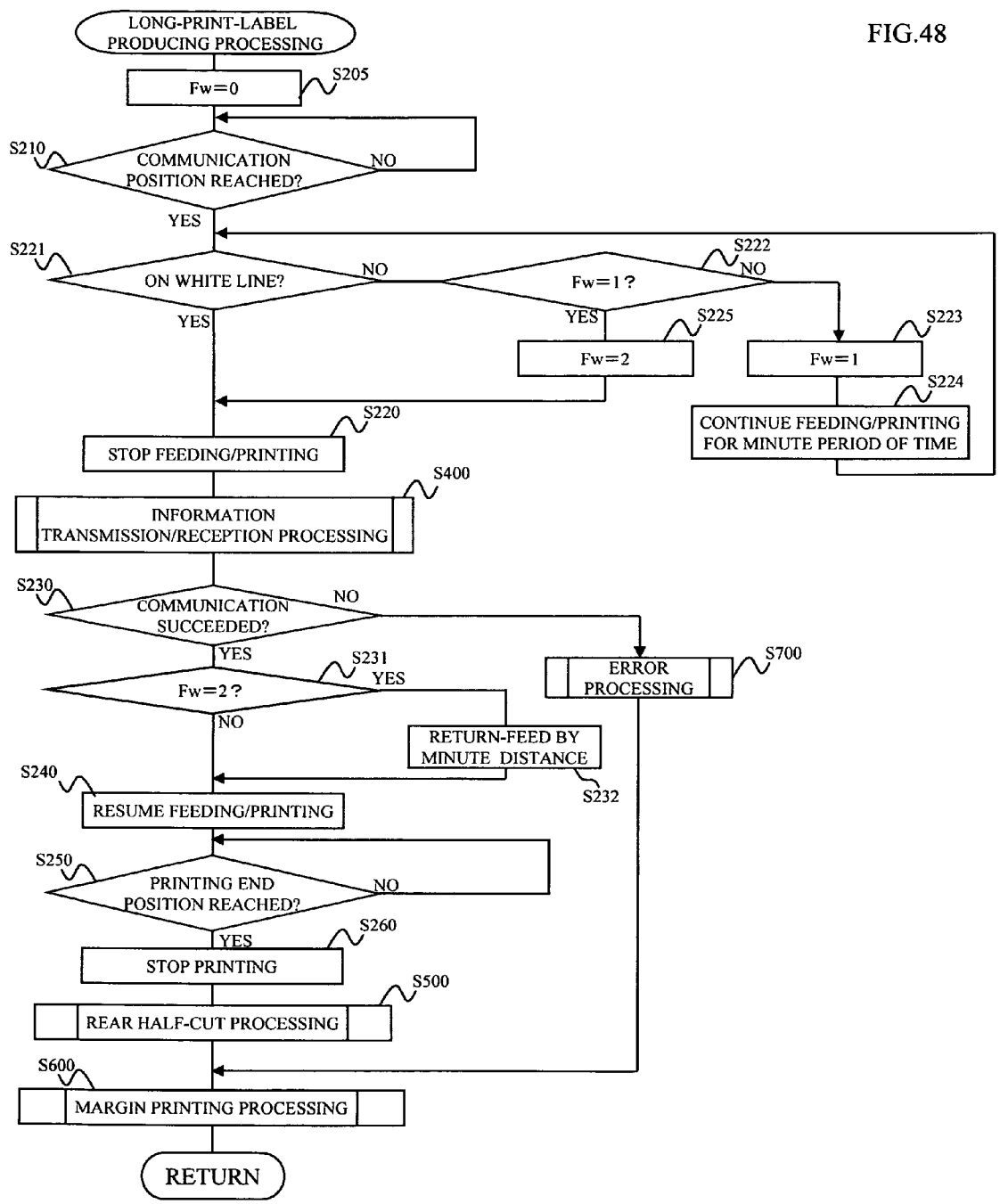
FIG. 48 is a flowchart showing the procedure of the processing of producing a long print label executed by the control circuit 110 according to a modification in which the print head is stopped at a white line.

FIG. 48 is a flowchart, corresponding to FIG. 32 or 44 described above, showing the procedure of the processing of producing a long print label executed by the control circuit 110 according to this modification. The procedures that are equivalent to those of FIG. 32 are denoted by the same reference numerals and description thereof is omitted.

In FIG. 48, in this modification, first, step S205 is newly added before step S210 described above, and steps S221, S222, S223, S224, and S225 are newly provided between steps S210 and S220 described above.

That is, first, in step S205, the flag Fw, which relates to the minute-distance feeding for setting the position of the print head 23 to the white line, is initialized as Fw=0. Thereafter, after confirming that the print head 23 has reached the communication position in step S210 in the same manner as in FIG. 32, the process transfers to step S221 that is newly provided.

In step S221, it is determined whether or not the print head 23 is at the position of the white line. This determination may be made by calculating, on the basis of the print data created in step S110 of FIG. 31 described above, for example, whether the position on the tape in the feed direction at which the print head 23 is being stopped corresponds to the actual printing portion (non-blank portion) for the print letters or print patterns included in the print data or the non-printing blank portion (white line).

If the print head 23 is located on the white line, the determination is satisfied, and the process transfers to step S220 mentioned above that is the same as that of FIG. 32. In step S220, the rotations of the tape feed roller 27, ribbon take-up roller 106, and drive roller 51 are stopped, and feeding of the tag label tape 109 with print is stopped in the state with the loop antenna LC substantially directly facing the RFID circuit element To. Further, the energization of the print head 23 is stopped to thereby stop (interrupt) the printing of the label print R.

On the other hand, if the print head 23 is not located on the white line (if the print head 23 is located in the actual printing portion mentioned above), the determination of step S221 is not satisfied, and the process transfers to step S222 where it is determined whether or not the flag Fw=1. When the process transfers to this step, since initially the flag Fw=0 due to step S205 mentioned above, the determination is not satisfied, and after the process transfers to step S223 to set the flag Fw=1, the process transfers to step S224.

In step S224, in order to stop the feeding of the tag label tape 109 with print after the position of the print head 23 has become the position of the white line, the feeding and printing are further continued for a minute amount of time (Specifically, it suffices to retain the feeding/printing state as it is for a predetermined minute amount of time using a timer or the like, for example. The minute amount of time may be fixed or variable). Thereafter, the process returns to step S221 described above.

The same determination as described above is made in step S221 to which the process has returned. At this time, if the print head 23 has reached the white line due to the continued feeding by a minute distance in step S224 mentioned above, the determination is satisfied, and the process transfers to step S220. If the print head 23 has not reached the white line even after the continued feeding mentioned above, the determination of step S221 is not satisfied again, and the process transfers to step S222. At this point, since Fw=1 due to step S223 described above, the determination of step S222 is satisfied, and after the process transfers to step S225 to set Fw=2, the process transfers to step S220.

Thereafter, while the procedures from step S220 onward are basically the same as those of FIG. 32 described above, according to this modification, step S231 and step S232 that branches off from step S231 are newly added between steps S230 and S240.

That is, after it is determined in step S230 whether or not transmission/reception of information has succeeded in step S400 mentioned above, the process transfers to step S231 where it is determined whether or not the above-described flag Fw=2. As described above, if the position of the print head 23 has reached the white line, since Fw=0 or 1 without the process passing through step S225 mentioned above, the determination of step S231 is not satisfied, and the process transfers to step S240, after which the same procedures as those of FIG. 32 are executed.

On the other hand, if the position of the print head 23 has not reached the white line even after executing the continued feeding by a minute distance in step S224 (=if the print head 23 is located in the above-mentioned actual printing portion), since Fw=2 in step S225 as described above, the determination of step S231 is satisfied, and the process transfers to step S232.

In step S232, in correspondence with step S224 mentioned above, feeding (return-feeding) of the tag label tape with print is performed by a minute distance in the direction reverse to the previous feed direction. Specifically, a control signal is output to the feed-motor drive circuit 121 via the input/output interface 113, and the tape feed roller 27 and the ribbon take-up roller 106 are rotationally driven by the driving force of the feed motor 121 in the direction reverse to the forward direction corresponding to the feed direction; further, a control signal is output to the tape discharging motor 65 via the tape-discharging-motor drive circuit 123, the drive roller 51 is rotationally driven in the same reverse direction as mentioned above, and the tag label tape 109 with print is return-fed by a predetermined minute distance (for example, a distance equivalent to several dots in the printing operation with the print head 23) in the direction reverse to the forward direction that is the feed direction. At this time, in conjunction with this, the printing content of the print data is also returned by a distance corresponding to the returned distance. Accordingly, upon resuming printing thereafter, the printing can be resumed in a manner with a slight overlap with the print that has been already done in the print area S. Thereafter, the process transfers to step S240, after which the same procedures as those of FIG. 32 are executed.

It should be noted that in steps S221 to S225 mentioned above, when the print head 23 is not at the position of the white line, the feeding/printing is continued in the forward direction as it is so that the print head 23 comes to the position of the white line. However, this should not be construed restrictively; it is also possible to perform feeding (return-feeding) by a predetermined minute distance from that point in the reverse direction (meanwhile, for example, printing is interrupted) to thereby bring the print head 23 to the position of the white line. Further, in such a case, in step S232 mentioned above, the printing and feeding may be resumed anew from a position returned by a minute distance from the position prior to the above-mentioned return-feeding (Accordingly, as mentioned above, upon resuming the printing, the printing is resumed in a manner slightly overlapping with the print that has been already done in the print area S).

This modification provides the following effects. That is, when printing is stopped while the print head 23 is midway through the printing on the actual printing portion mentioned above (=non-blank portion such as a letter portion or pattern portion), there is a possibility that fading, a minute print blank, or the like may occur upon resuming the printing thereafter. In this modification, in step S221, it is determined whether or not the printing stop position of the print head 23 corresponds to the white line, and if, at this position, the print head 23 is not on the white line but is midway through the printing of the letter portion or pattern portion, in step S224, feeding is performed to bring the print head 23 to the white line and then the feeding is stopped, and transmission/reception of information is performed in step S400, thereby making it possible to prevent fading, a blank, or the like from occurring due to the stoppage of printing mentioned above.

(2) When Completion/non-completion of Printing is Determined at the Time When the Communication Position is Actually Reached In the above-described example, in step S130 of FIG. 31 or 43, the printing end position on the tape due to the print head 23 is previously calculated prior to actually starting the printing by the print head 23, and at the time when the tag label tape 109 with print has reached the communication position after starting its feeding, a comparison is made as to whether or not the tag label tape 109 with print in that state has reached the printing end position calculated as mentioned above. However, this should not be construed restrictively. That is, instead of calculating the printing end position in advance as described above, printing may be actually started with the print head 23 on the basis of the created print data, and at the time when the above-mentioned communication position is reached, it may be determined whether print data that has not been printed yet remains and printing is still being continued (or whether the printing of all of the print data has been completed).

Figure 49:
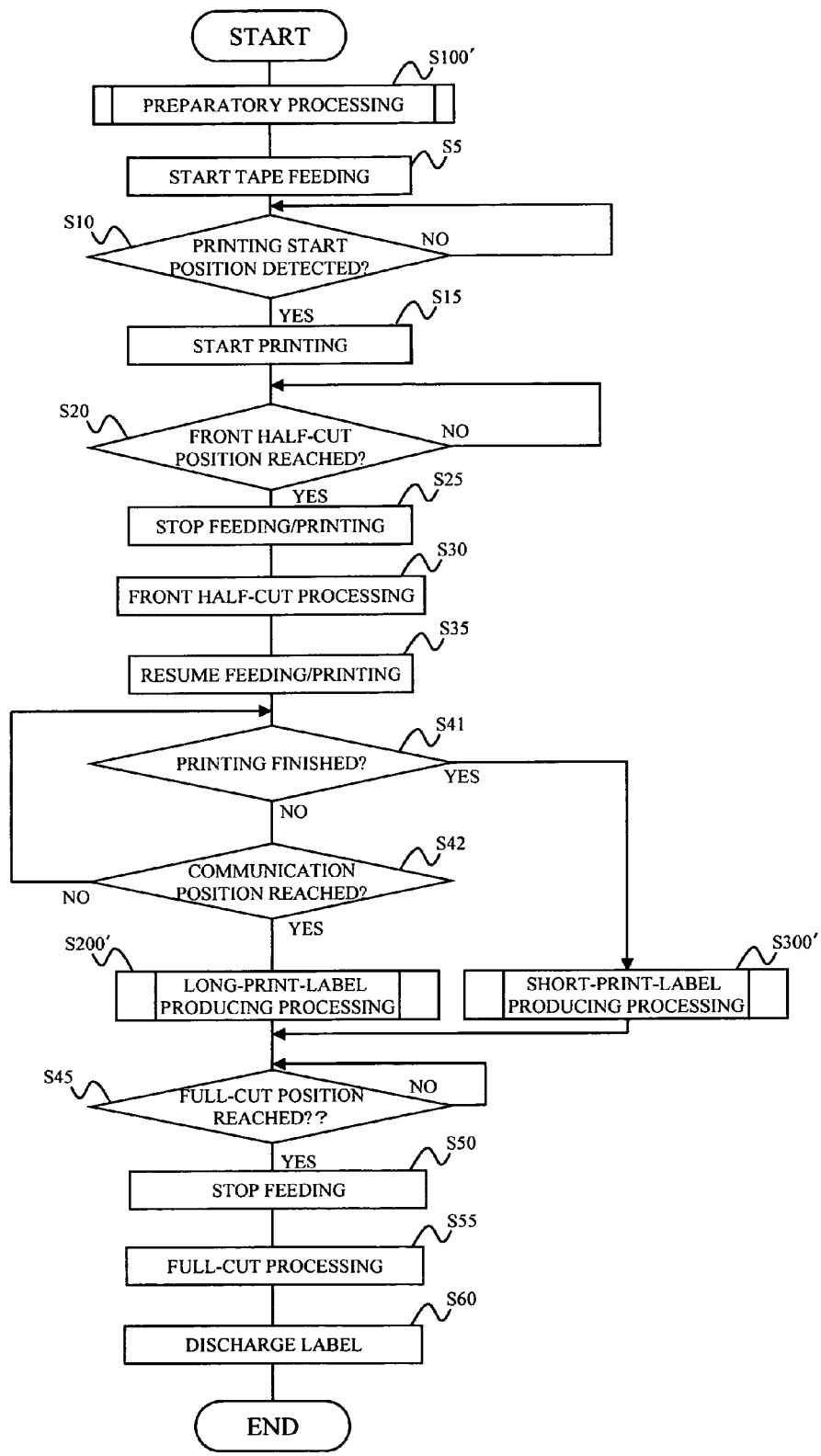
FIG. 49 is a flowchart showing the procedure of control executed by the control circuit 110 according to a modification in which the completion/non-completion of printing is determined at the time when the communication position is actually reached.

FIG. 49 is a flowchart, corresponding to FIGS. 30, 42, 47 mentioned above, showing the procedure of control executed by the control circuit 110 according to this modification. In FIG. 49, instead of step S40, steps S41, S42 are newly provided between step S35 and step S200 or step S300 of FIG. 30. Further, steps S100, S200, S300 are also partially modified in their detailed procedures as steps S100', S200', S300'.

Figure 50:
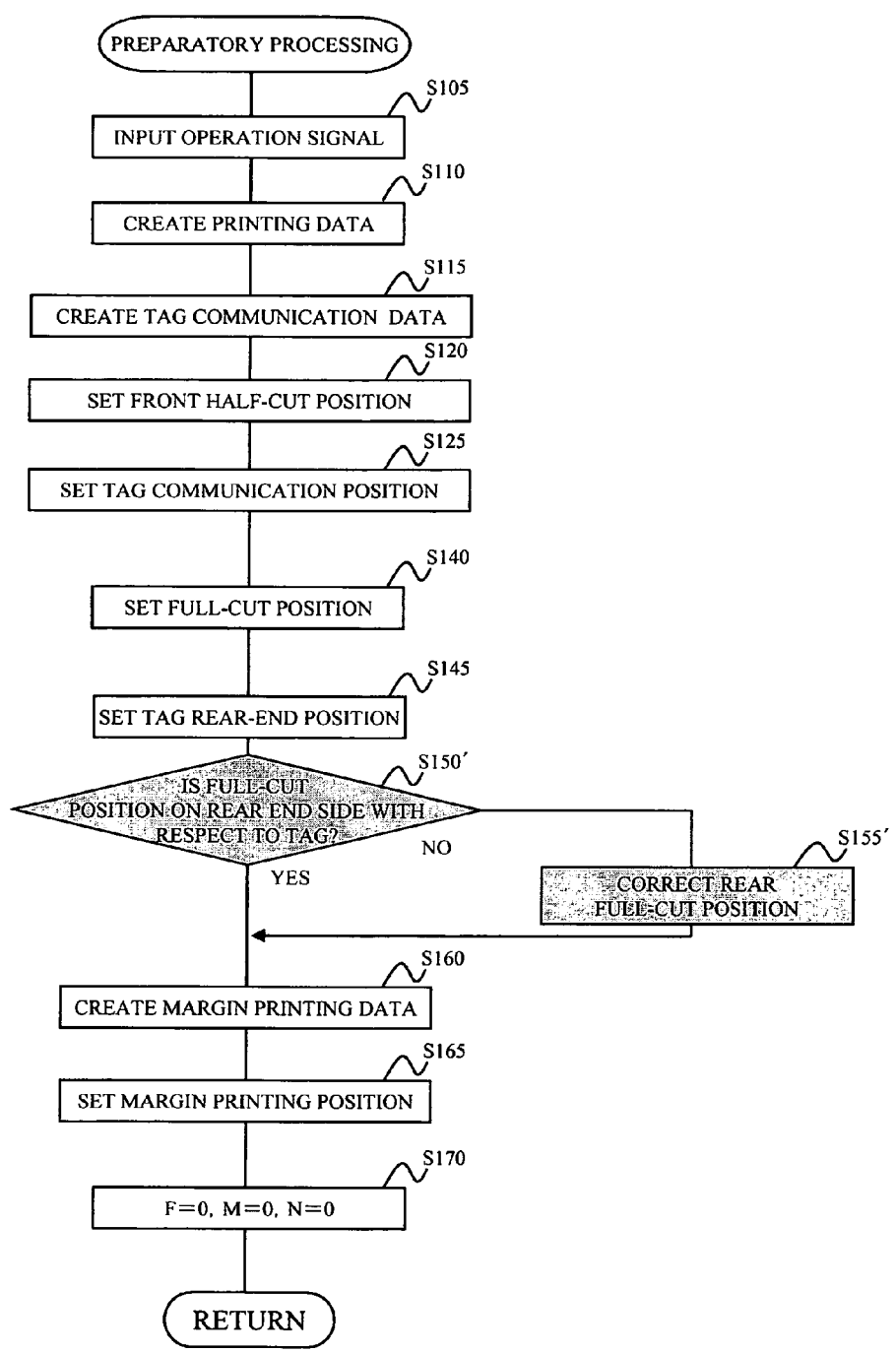
FIG. 50 is a flowchart showing the detailed procedure of step S100'.

First, the difference between step S100' and step S100 mentioned above will be described. FIG. 50 is a flowchart, corresponding to FIG. 31 or 43 described above, showing the detailed procedure of step S100' mentioned above. In FIG. 50, steps S130 and S135 in FIG. 31 are omitted, and instead of steps S150, S155 in FIG. 31, steps S150', S155' similar to these steps are provided.

That is, on the basis of the above-described reasons, the calculation of the printing end position in steps S135 and S140 and the calculation of the position of the rear half-cut line HC2 based on this calculated printing end position are not performed; once the setting of the communication position in step S125 is finished, the process transfers to the processing of setting the cutting line CL on the label rear-end side in step S140 in the same manner as in FIG. 31, and thereafter, the setting of the rear-end side position of the RFID circuit element To in step S145 is performed in the same manner as in FIG. 31.

Thereafter, since the calculation of the position of the rear half-cut line HC2 is omitted as mentioned above, in newly provided steps S150' and S155', only with respect to the cutting line CL set as mentioned above, it is determined whether or not the position of the cutting line CL is on the label rear-end side with respect to the rear-end position of the RFID circuit element To. In case the determination is not satisfied, in step S155', position correction (resetting) is performed so that the position of the above-mentioned cutting line CL is located on the label rear-end side with respect to the rear-end position of the RFID circuit element To, and the process transfers to step S160. The procedure in FIG. 50 other than the above-mentioned procedure is the same as that of FIG. 31.

Returning to FIG. 49, since steps S5 to S35 after step S100' mentioned above are the same as those of FIG. 30, description thereof is omitted. After forming the front half-cut line HC1, feeding/printing is resumed in step S35, and then the process transfers to step S41 that is newly provided.

In step S41, it is determined whether or not printing by the print head 23 has finished, that is, whether print data that has not been printed yet remains and printing is still being continued, or printing of all of the print data has been completed. The determination is not satisfied until the printing is complete, and the process transfers to the next step S42.

In step S42, in the same manner as in step S210 of FIG. 32 or step S330 of FIG. 33 described above, it is determined whether or not the tag label tape 109 with print has been fed to the communication position with the loop antenna LC described above (whether or not the tag label tape 109 with print has substantially reached the position where the loop antenna LC substantially directly faces the position of the RFID circuit element To). The determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the communication position, and the process returns to step S41 to repeat the same procedure.

In this way, while neither the printing has been completed nor the communication position has been reached, the procedure of step S41→step S42→step S41→ . . . is repeated, and if the completion of printing has taken place first during this repetition loop, the determination of step S41 is satisfied and the process transfers to step S300', and if the arrival at the communication position has taken place first, the determination of step S42 is satisfied and the process transfers to step S200'.

Figure 51:
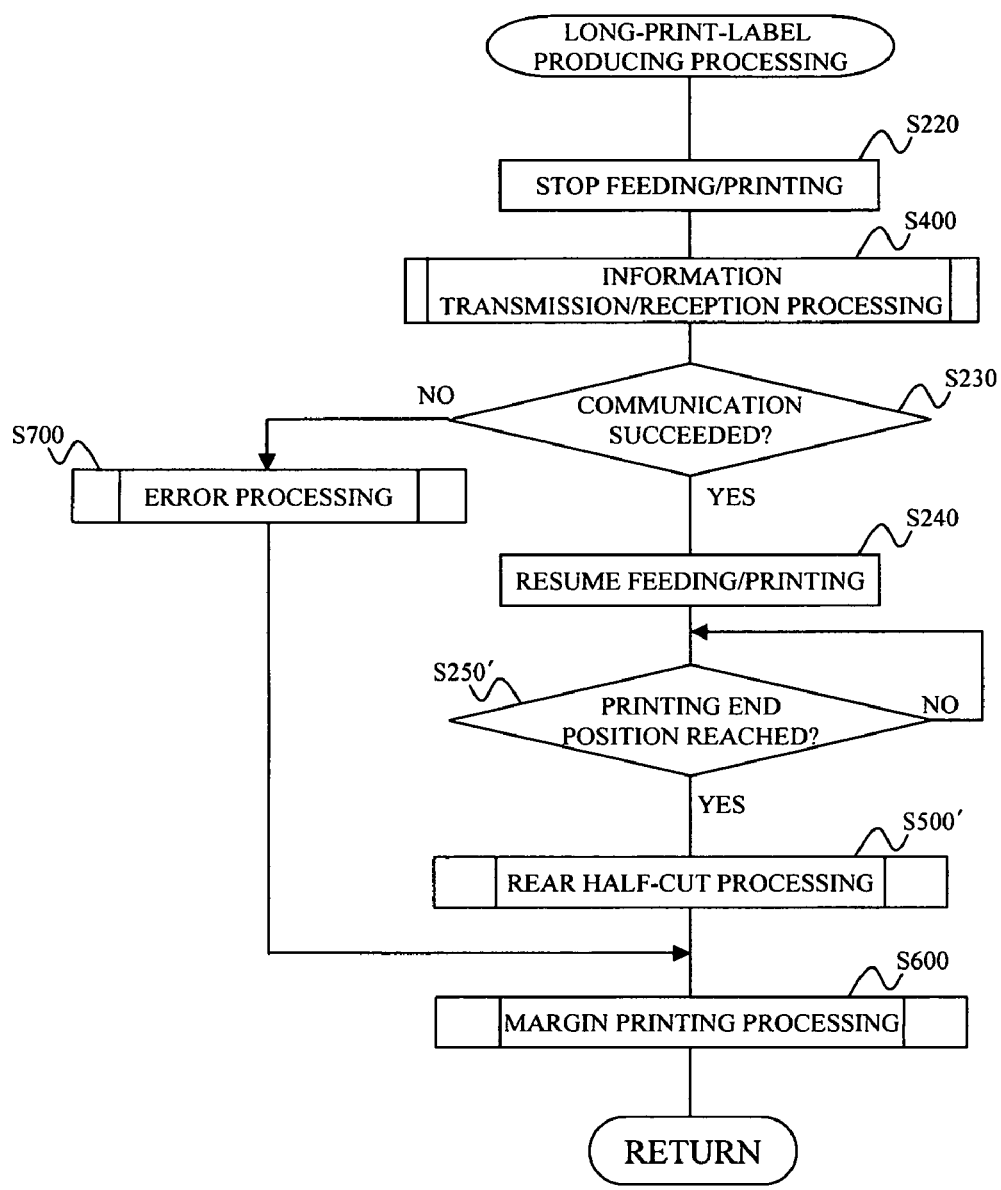
FIG. 51 is a flowchart showing the detailed procedure of step S200'.

Here, the difference between this step S200' and step S200 mentioned above will be described. FIG. 51 is a flowchart, corresponding to FIG. 32 or 44 described above, showing the detailed procedure of step S200' mentioned above. In FIG. 51, steps S210 and S260 in FIG. 32 are omitted, and instead of steps S250, S500 in FIG. 32, steps S250', S500' similar to these steps are provided.

That is, since it has already been determined in step S42 of FIG. 49 mentioned above whether or not the communication position has been reached, step S210 of FIG. 32 is not provided in FIG. 51, so the process immediately transfers to step S220 mentioned above to stop the feeding of the tag label tape 109 with print and stop the printing by the print head 23. Steps S400, S230, S240 thereafter are the same as those of FIG. 32. After resuming the feeding and printing, which have been stopped as mentioned above, in step S240, the process transfers to step S250' that is newly provided.

In step S250', it is determined whether or not printing by the print head 23 has finished, that is, whether print data that has not been printed yet remains and printing is still being continued, or printing of all of the print data has been completed. The determination is not satisfied until printing is complete and this procedure is repeated. Upon the completion of printing, the determination is satisfied and the process transfers to the next step S500' (details of which will be described later), after which step S600 is executed in the same manner as mentioned above, and this routing is ended.

Figure 52:
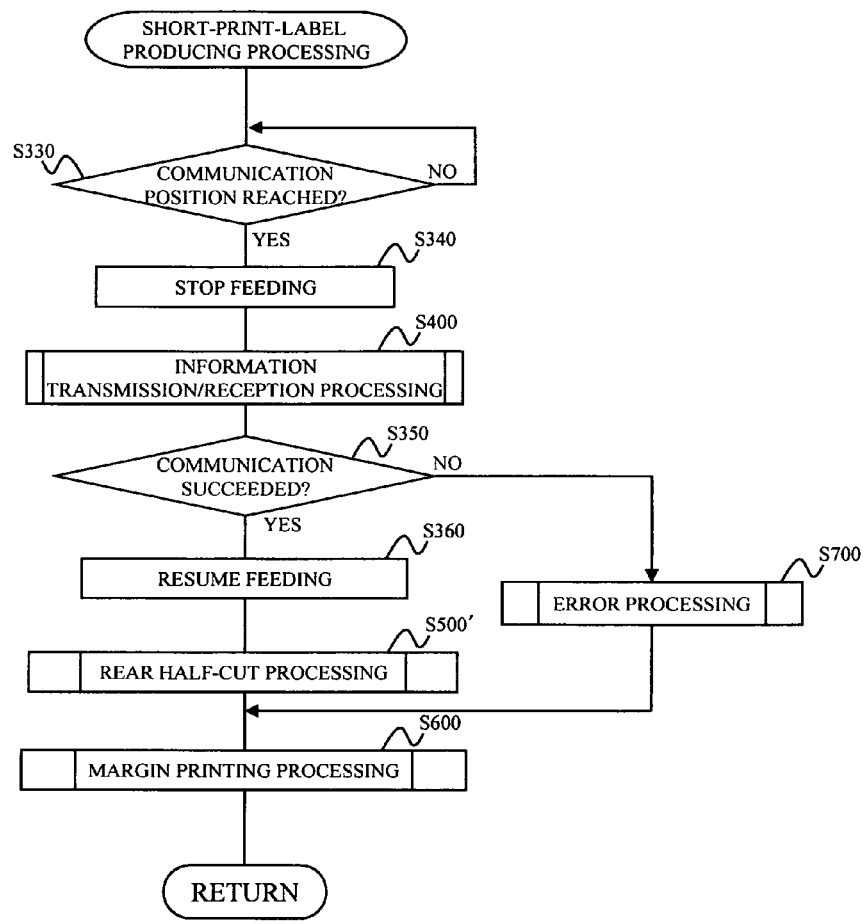
FIG. 52 is a flowchart showing the detailed procedure of step S300'.

Next, the difference between this step S300' and step S300 mentioned above will be described. FIG. 52 is a flowchart, corresponding to FIG. 33 or 45 described above, showing the detailed procedure of step S300' mentioned above. In FIG. 52, steps S310 and S320 in FIG. 33 are omitted, and instead of step S500 in FIG. 33, step S500' similar to this step is provided.

That is, since it has already been determined in step S41 of FIG. 49 mentioned above whether or not the actual printing operation by the print head 23 has been completed, steps S310, S320 of FIG. 33 are not provided in FIG. 52, so the process immediately transfers to step S330 mentioned above to determine whether or not the tag label tape 109 with print has reached the communication position. Steps S340, S350, S360 thereafter are the same as those of FIG. 33. After resuming the feeding, which has been stopped in step S340 mentioned above, in step S360, the process transfers to the next step S500' (details of which will be described later), after which step S600 is executed in the same manner as mentioned above, and this routing is ended.

Figure 53:
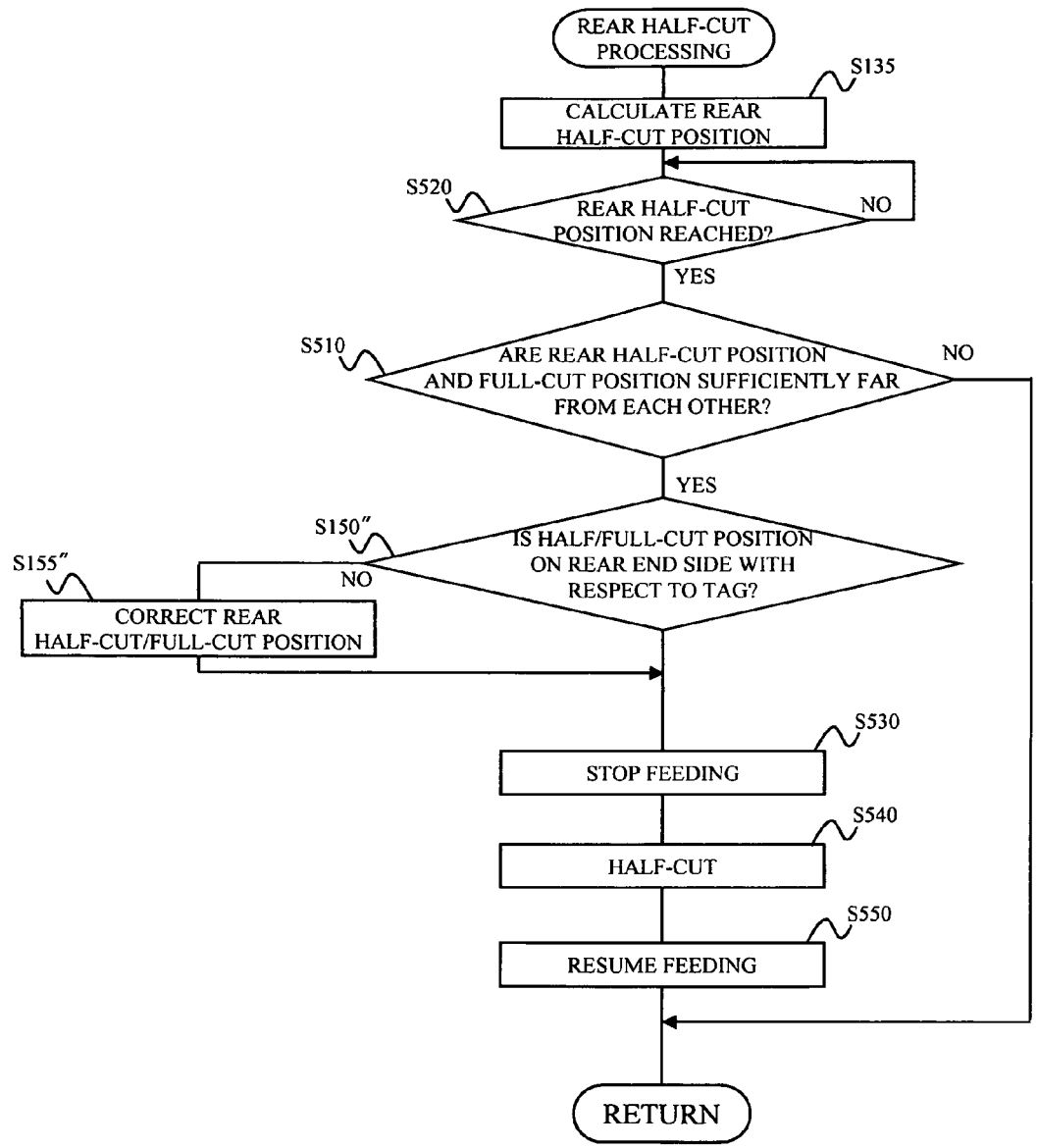
FIG. 53 is a flowchart showing the detailed procedure of step S500'.

Next, step S500' will be described. FIG. 53 is a flowchart, corresponding to FIG. 35 described above, showing the detailed procedure of step S500' mentioned above. The procedures that are equivalent to those of FIG. 35 or other flows are denoted by the same reference numerals.

In FIG. 53, in step S135 that is the same as that of FIG. 31 according to the above-mentioned embodiment, the position of the rear half-cut line HC2 is set. In this setting, on the basis of the operation signal input in step S105 of FIG. 50 mentioned above, and the tape feed position (or the communication position in step S330 of FIG. 52) at the time when the determination of step S250' of FIG. 51 mentioned above is satisfied, the position of the rear half-cut line HC2 on the tape corresponding to the above-mentioned cartridge information is set. That is, on the basis of the operation signal input in step S105 mentioned above, under the assumption that the distance from the printing end position (or the above-mentioned communication position) to the rear half-cut line HC2 is previously determined to a certain distance by the kind of the cartridge 7, the position of the rear half-cut line HC2 on the tape is calculated by adding (intervening) the determined distance with respect to the tape feed position (or the communication position in step S330 of FIG. 52) at the time when the determination of step S250' mentioned above is satisfied.

Thereafter, steps S510 and S520 in FIG. 35 are reversed in their order, so step S520 is executed first. That is, in the same manner as described above, it is determined whether or not the tag label tape 109 with print has been fed to the above-described rear half-cut position HC2. In the same manner as described above, the determination at this time as well may be performed by, for example, detecting by a predetermined known method the distance by which the tag label tape 109 with print has been fed after the detection of the identifier PM of the base tape 101 in step S10 mentioned above of FIG. 49. The determination is not satisfied until the arrival at the rear half-cut position HC2 and this procedure is repeated, and upon the arrival at the rear half-cut position HC2, the determination is satisfied and the process transfers to the next step S510.

In step S510, in the same manner as described above, it is determined whether or not there is a preset predetermined distance or more between the position of the rear half-cut line HC2 set in step S135 mentioned above, and the position of the cutting line CL set in step S140 of FIG. 50. This determination is not satisfied if the position of the rear half-cut line HC2 and the position of the cutting line CL are too close to each other, and it is regarded inappropriate to provide the rear half-cut line HC2 separately from the cutting line CL, so this routine is ended. On the other hand, this determination is satisfied if the position of the rear half-cut line HC2 and the position of the cutting line CL are sufficiently far from each other, and the process transfers to the next step S150".

In step S150", substantially the same determination as that of step S150' described above with reference to step S130 is made with respect to the half-cut line HC2. That is, in step S150", with respect to the rear half-cut line HC2 calculated in step S135 mentioned above, it is determined whether or not the position of the rear half-cut line HC2 is located on the label rear-end side with respect to the rear-end position of the RFID circuit element To. In case the determination is not satisfied, in step S155", position correction (resetting) is performed so that the position of the above-mentioned half-cut line HC2 is located on the label rear-end side with respect to the rear-end position of the RFID circuit element To, and the process transfers to step S530.

Since the procedure from step S530 onward is the same as that of FIG. 35 described above, description thereof is omitted.

In this modification as well, substantially the same effects as those of the above-mentioned first to third embodiments are attained. That is, in steps S42 and S41 shown in FIG. 49, it is determined which one of the following two events, the arrival of the RFID circuit element To of the tag label tape 109 with print at the communication position with the antenna LC, and the completion of printing onto the print area S by the print head 23, chronologically precedes the other. Then, in accordance with the result of this determination, in case it is determined that the completion of printing with respect to the print area S takes place first, in the processing of producing a short print label in step S300', the feeding is stopped upon arrival at the above-mentioned communication position (step S340), and after performing transmission/reception of information via the loop antenna LC (step S400), the feeding is resumed (step S360). On the other hand, in case it is determined in step S42 that the arrival at the communication position takes place first, in the processing of producing a long print label in step S200', the feeding and printing are stopped upon arrival at the above-mentioned communication position (step S220), and after performing transmission/reception of information via the loop antenna LC (step S400), the feeding and the printing onto the print area S are resumed (step S240).

In this way, in accordance with the state at the time of arrival at the communication position, the subsequent operations are switched, thereby allowing finely coordinated control to be performed easily and quickly in such a manner that if it is possible and better to reflect the results of information transmission/reception, the success or failure of which has been determined in step S230 of FIG. 51 or step S35 of FIG. 52, on the printing, the results are reflected (see step S700 in FIG. 51 or 52), and if it is unnecessary and impossible to reflect the results on the printing, the results are not reflected (see the steps from step S240 of FIG. 51 onward, or the steps from step S360 of FIG. 52 onward). As a result, the convenience of the operator can be enhanced.

(3) When Tape Bonding is Not Performed

That is, instead of performing printing on the cover film 103, which is separate from the base tape 101 equipped with the RFID circuit element To, and bonding the cover film 103 and the base tape 101 together as described in the above-mentioned first to third embodiments, printing is directly performed on the tag tape.

Figure 54:
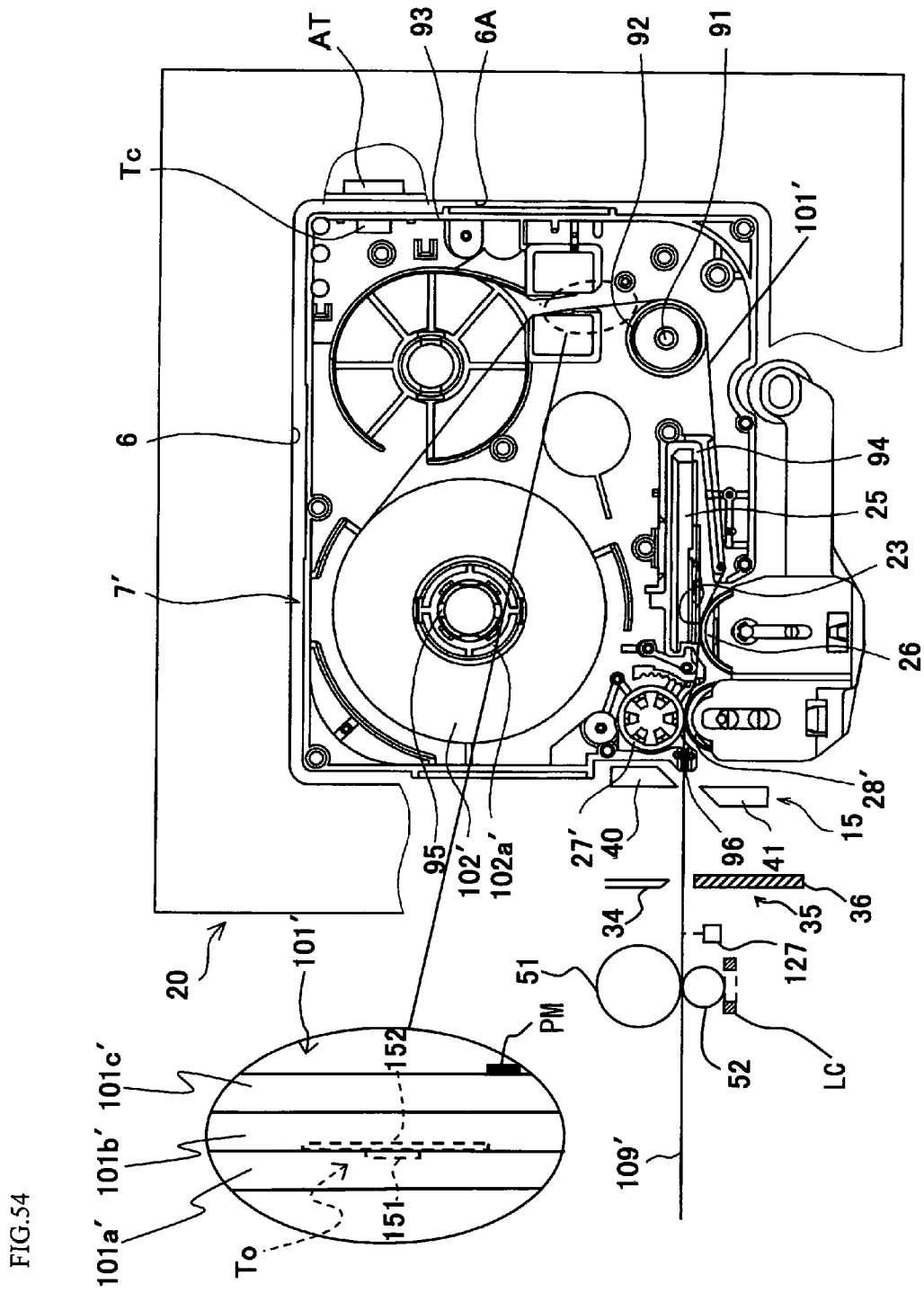
FIG. 54 is a plan view showing the detailed construction of a cartridge according to a modification in which tape bonding is not performed.

FIG. 54 is a plan view, corresponding to FIG. 4 described above, showing the detailed construction of a cartridge 7' used in a tag-label producing device according to this modification. The portions that are equivalent to those of FIG. 4 or the like are denoted by the same reference numerals, and description thereof is omitted as appropriate.

In FIG. 54, the cartridge 7' has a first roll 102' around which a thermal tape 101' (tag tape; tag medium) is wound, and a tape feed roller 27' for feeding the thermal tape 101' toward the outside of the cartridge 7'.

In the first roll 102', the above-mentioned thermal tape 101', which is transparent and in a band shape and has a plurality of the RFID circuit elements To successively formed in the longitudinal direction thereof, is wound around a reel member 102a'. The reel member 102a' is rotatably fitted and accommodated in a boss 95 provided upright on the bottom surface of the cartridge 7'.

The thermal tape 101' wound around the first roll 102' is of a three-layer structure in this example (see the partially enlarged view in FIG. 54). The thermal tape 101' includes a cover film 101a' (base layer) made of PET (polyethylene terephthalate) or the like having a thermal recording layer on its surface, an adhesive layer 101b' (adhesive layer) made of a suitable adhesive material, and a separation sheet 101c' (separation material layer), which are laminated in the stated order from the side wound on the inner side toward the side opposite thereto.

On the back side of the cover film 101a', the loop antenna 152 (tag-side loop antenna) that is formed in a loop coil-like configuration and performs transmission/reception of information is provided integrally in this example, with the IC circuit part 151 being formed so as to connect to the loop antenna 152. These components constitute each RFID circuit element To. On the back side of the cover film 101a', the separation sheet 101c' is adhered onto the cover film 101a' by means of the adhesive layer 101b'. Further, on the surface of the separation sheet 101c', like the separation sheet 101d, the predetermined identifier for feed control (which in this example is a black-painted identifier. Alternatively, as described above, this may also be a hole bored by laser machining or the like so as to substantially penetrate the thermal tape 101', or the like) PM is provided at a predetermined position corresponding to each RFID circuit element To (which in this example is a position located on the side further forward with respect to the leading end of the antenna 152 located on the forward side in the feed direction).

When the cartridge 7' is loaded onto the cartridge holder 6 and the roller holder 25 is moved from the release position to the abutting position, the thermal tape 101' is held between the print head 23 and the platen roller 26, and between the tape feed roller 27' and a pressure roller 28'. Then, the tape feed roller 27', the pressure roller 28', and the platen roller 26 are rotated in synchronization with each other, and the thermal tape 101' is paid out from the first roll 102'.

The thermal tape 101' thus paid out is supplied to the print head 23 on the downstream side in the feed direction from an opening 94 while being guided by a substantially cylindrical reel 92 rotatably fitted in a reel boss 91 provided upright on the bottom surface of the cartridge. The plurality of heater elements of the print head 23 are energized by the print-head drive circuit 120 (see FIG. 15), and the label print R is thus printed on the front surface of the cover film 101'a of the thermal tape 101' to form a tag label tape 109' with print, which is then carried to the outside of the cartridge 7' from a discharge port 96.

After the tag label tape 109' with print is carried to the outside of the cartridge 7', access (reading/writing of information) is made to the IC circuit part 151 via the loop antenna LC described above. Since the feeding by the drive roller 51, the cutting by the cutting mechanism 15, and the like thereafter may simply be performed in the same manner as those in the above-mentioned embodiments, description of these operations is omitted.

It should be noted that the half-cut unit 35 used is different from the one illustrated in FIG. 10 or the like corresponding to the so-called laminate type. That is, in the structure illustrated in FIG. 10 or the like, the pad 38 is located on the print head 23 side, and the half-cutter 34 is located on the platen roller 26 side. This structure is employed in order to perform half-cut from the surface on the side opposite to the separation sheet of the tape produced. However, in the case where a thermal tape is used as in this modification (the same applies to the type that will be described later with reference to FIG. 55, in which no lamination is performed and an ink ribbon is used), the separation sheet is located on the side opposite to that in the case of the above-mentioned laminate type. Accordingly, in order to perform half-cut of the portions other than the separation sheet, the placement of the pad 38 and the half-cutter 34 is reversed. That is, the half-cutter 34 is located on the print head 23 side, and the pad 38 is located on the platen roller 26 side.

It should be noted that in this example, in order to allow the above-described cartridge kind information and the like relating to the cartridge 7' to be automatically detected on the device side, a cartridge RFID circuit element Tc, in which information relating to the cartridge 7' is previously stored, is disposed on an outer peripheral side wall surface 93 of the cartridge 7'. Further, an antenna AT for performing transmission/reception of information to/from the RFID circuit element Tc via non-contact wireless communication is provided to a side wall portion 6A of the cartridge holder 6 opposed to the above-mentioned RFID circuit element Tc.

Although not shown in detail, in this modification as well, as in the above-mentioned embodiment, the distance L in the thermal tape 101' from the leading end position of the identifier PM in the tape feed direction to the leading end of the RFID circuit element To in the tape feed direction is set in advance so to be equal to the distance Lo in the tape feed direction between the mark sensor 127 and the print head 23. As a result, in the same manner as in the above-mentioned embodiment described with reference to FIGS. 21 to 29, during the printing by the print head 23 and the feeding of the tag label tape 109' with print, in accordance with whether or not the printing by the print head 23 has been completed at the time when the RFID circuit element To reaches the communication position with the loop antenna LC, the subsequent control on the print head 23 or the loop antenna LC is switched, whereby the same effects as those of the above-mentioned embodiments can be attained.

In the structure of the above-mentioned modification, by using a thermal tape as the tag tape, printing is performed solely with the heat generated by the print head 23 without particularly using an ink ribbon or the like. However, this should not be construed restrictively. As in the above-mentioned first to third embodiments, printing may also be performed using an ordinary ink ribbon.

Figure 55:
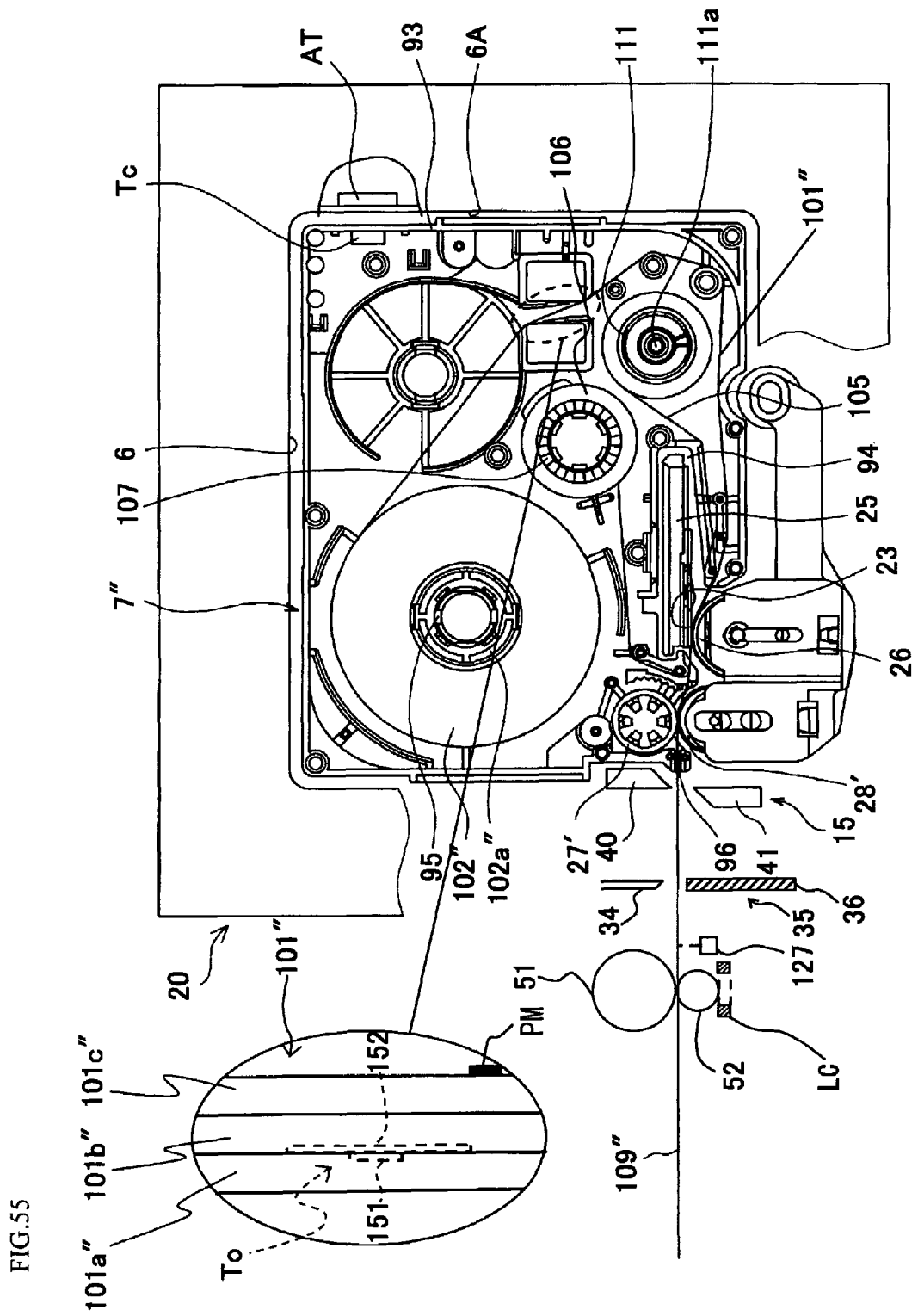
FIG. 55 is a plan view showing the detailed construction of a cartridge according to another modification in which tape bonding is not performed.

FIG. 55 is a plan view, corresponding to FIG. 54 or FIG. 4 described above, showing the detailed construction of a cartridge 7" used in a tag-label producing device according to such a modification. The portions that are equivalent to those of FIG. 54, FIG. 4, or the like are denoted by the same reference numerals, and description thereof is omitted as appropriate.

In FIG. 54, the cartridge 7" according to this modification has a first roll 102" around which a base tape 101" (tag tape; tag medium) is wound.

In the first roll 102", the above-mentioned base tape 101", which is transparent and in a band shape and has a plurality of the RFID circuit elements To successively formed in the longitudinal direction thereof, is wound around a reel member 102a".

The base tape 101" wound around the first roll 102" is of a three-layer structure in this example (see the partially enlarged view in FIG. 55). The base tape 101' includes a colored base film 101a" (base layer) made of PET (polyethylene terephthalate) or the like, an adhesive layer 101b" (adhesive layer) made of a suitable adhesive material, and a separation sheet 101c" (separation material layer), which are laminated in the stated order from the side wound on the inner side toward the side opposite thereto.

On the back side of the base film 101a", the loop antenna 152 (tag-side loop antenna) that is formed in a loop coil-like configuration and performs transmission/reception of information is provided integrally in this example, with the IC circuit part 151 being formed so as to connect to the loop antenna 152. These components constitute each RFID circuit element To. On the back side of the base film 101a", the separation sheet 101c" is adhered onto the base film 101a" by means of the adhesive layer 101b". Further, in the same manner as described above, on the surface of the separation sheet 101c", the predetermined identifier for feed control (which in this example is a black-painted identifier. Alternatively, as described above, this may also be a hole bored by laser machining or the like so as to substantially penetrate the base tape 101", or the like) PM is provided at a predetermined position corresponding to each RFID circuit element To (which in this example is a position located on the side further forward with respect to the leading end of the antenna 152 located on the forward side in the feed direction).

When the cartridge 7" is loaded onto the cartridge holder 6 and the roller holder 25 is moved from the release position to the abutting position, the base tape 101" and the ink ribbon 105 are held between the print head 23 and the platen roller 26, and between the tape feed roller 27' and the pressure roller 28'. Then, the tape feed roller 27', the pressure roller 28', and the platen roller 26 are rotated in synchronization with each other, whereby the base tape 101" is paid out from the first roll 102".

On the other hand, at this time, the plurality of heater elements of the print head 23 are energized by the print-head drive circuit 120 (see FIG. 15), and the label print R corresponding to information stored in the RFID circuit element To is thus printed on the front surface of the base film 101"a of the base tape 101" to form a tag label tape 109" with print, which is then carried to the outside of the cartridge 7".

After the tag label tape 109" with print is carried to the outside of the cartridge 7", access (reading/writing of information) is made to the IC circuit part 151 via the loop antenna LC described above. Since the feeding by the drive roller 51, the cutting by the cutting mechanism 15, and the like thereafter may simply be performed in the same manner as those in the above-mentioned embodiments, description of these operations is omitted. Further, the half-cut unit 35 used is the same as that of the modification shown in FIG. 54 described above.

In this modification as well, as in the modification shown in FIG. 54 mentioned above, the distance L in the base tape 101" from the leading end position of the identifier PM in the tape feed direction to the leading end of the RFID circuit element To in the tape feed direction is set in advance so to be equal to the distance Lo in the tape feed direction between the mark sensor 127 and the print head 23. As a result, in the same manner as in the above-mentioned embodiments described with reference to FIGS. 21 to 29, during the printing by the print head 23 and the feeding of the tag label tape 109" with print, in accordance with whether or not the printing by the print head 23 has been completed at the time when the RFID circuit element To reaches the communication position with the loop antenna LC, the subsequent control on the print head 23 or the loop antenna LC is switched, whereby the same effects as those of the above-mentioned first to third embodiments can be attained.

(4) Others

In the above-described example, the tape-feed-roller drive shaft 108 is provided, and the tag label tape 109 with print as the tag medium or the cover film 103 as the print-receiving medium is driven by the tape-feed-roller drive shaft 108, thereby imparting relative movement between the tag label tape 109 with print or cover film 103 and the print head 23 or loop antenna LC that is fixedly installed. However, this should not be construed restrictively. That is, conversely, the print head 23 (together with the loop antenna LC) may be driven by a predetermined moving mechanism, thereby imparting relative movement between the print head 23 and a tag medium having a sheet-like shape or a print-receiving medium, for example. In this case as well, by performing the same control under the same relative positional relation as described above, the same effects as those described above are attained.

Further, while the foregoing description is directed to the example in which the RFID label equipped with the RFID circuit element To is produced as the print label, this should not be construed restrictively. That is, as long as the originally intended effect of the present disclosure, namely ensuring ease of handling of the label by the user while making the length of the label main body portion variable in accordance with the print length, can be attained, the present disclosure may be applied to a label producing device for producing an ordinary print label not equipped with the RFID circuit element To and to a print label produced by using such a label-producing device. In this case, the loop antenna LC, the transmitting circuit 306, and the receiving circuit 307 can be omitted in the label producing device 1, and on the label side as well, the RFID circuit element To become unnecessary.

A fourth embodiment of the present disclosure will be described with reference to FIGS. 56 to 69. According to this embodiment, information on the remaining number of RFID circuit elements To in the cartridge is displayed.

Figure 56:
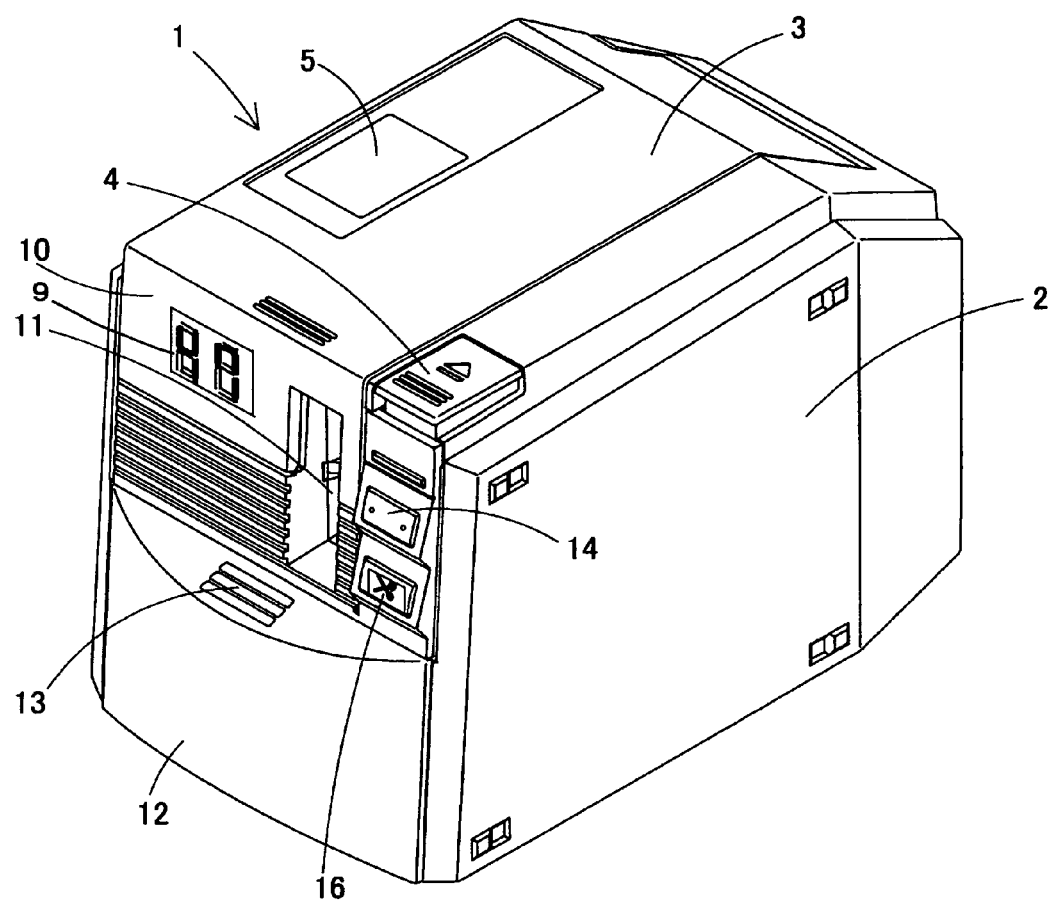
FIG. 56 is a perspective view showing the overall construction of a tag-label producing device according to a fourth embodiment of the present disclosure.

FIG. 56 is a perspective view, corresponding to FIG. 2 described above, showing the overall construction of a tag-label producing device 1' according to this embodiment.

In the tag-label producing device 1' according to this embodiment shown in FIG. 56, a remaining-number display portion 9, which displays number-count information (which in this example is remaining-number information, details of which will be described later) indicating the number of RFID labels T (in other words, the number of RFID circuit elements To) remaining in the cartridge 7, is provided on the left side of the label discharge port 11 in an upper portion of the side wall 10. Further, the opening/closing of the open/close cover 3 is detected by an open/close sensor 390 (see FIG. 57 that will be described later) for detecting the on/off operation on the open/close button 4.

Figure 57:
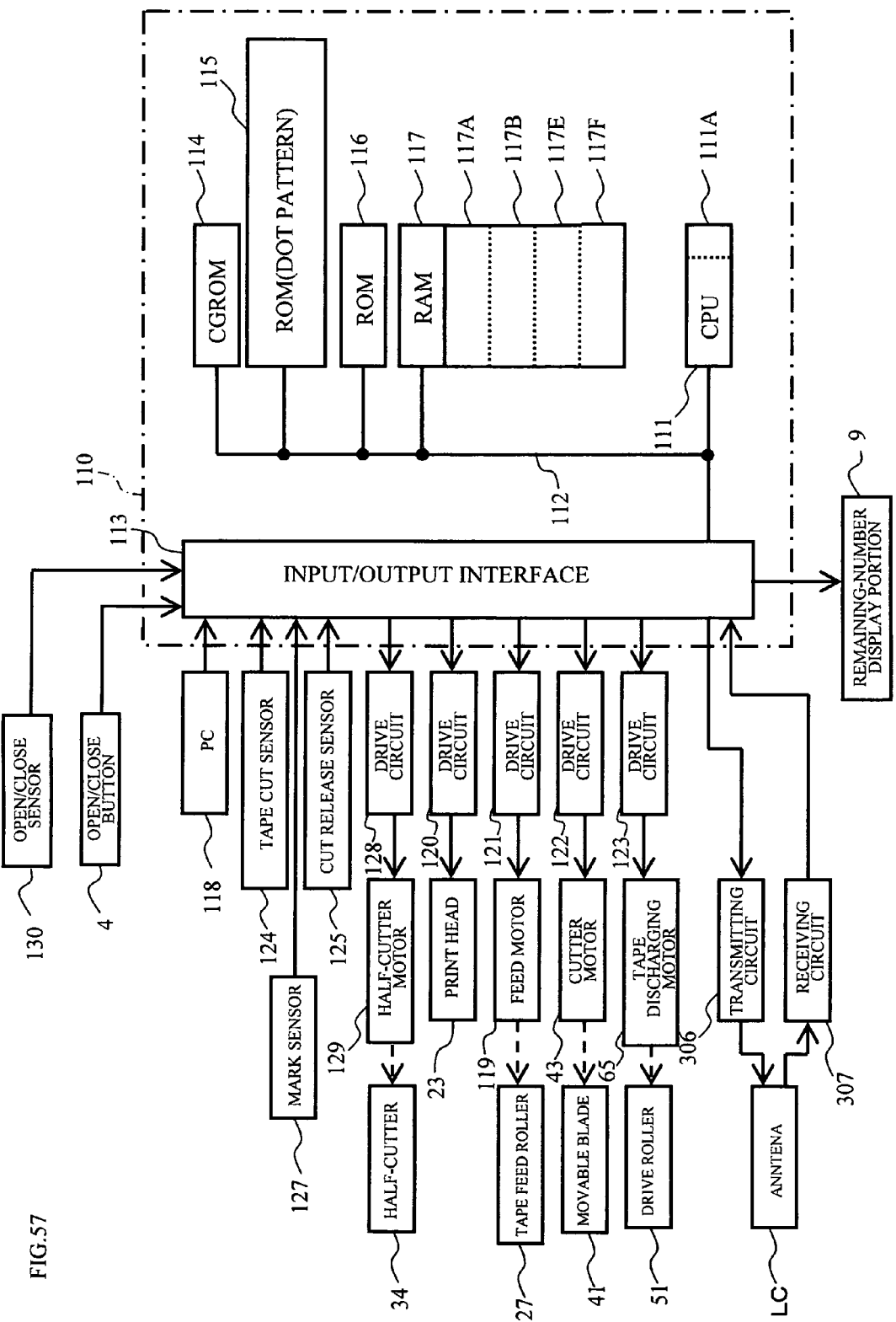
FIG. 57 is a functional block diagram showing the control system of the tag-label producing device.

FIG. 57 is a functional block diagram, corresponding to FIG. 15 described above, showing the control system of the tag-label producing device 1' according to this embodiment.

In the control circuit 110 of the tag-label producing device 1' shown in FIG. 57, the open/close switch (open/close button) 4 for opening/closing the open/close cover (cover) 3, an open/close sensor 130 for detecting the opening/closing of the open/close cover 3, and the remaining-number display portion 9 for displaying the remaining number of RFID circuit elements To (RFID labels T) in the RFID cartridge 7 loaded onto the main body 2, are additionally connected to the input/output interface 113.

Further, in addition to the text memory 117A, the print buffer 117B, the parameter storing area 117E, and the like, the RAM 117 is provided with a remaining-number memory 117F. In the remaining-number memory 117F, information on the number of tag labels T that can be produced with the RFID cartridge 7 loaded onto the holder 6 (in other words, information on the remaining number of RFID circuit elements To in the cartridge 7) is stored in a re-writable manner.

That is, the above-mentioned number-count-related information (which in this example is the sequential-order information as described above; this may also be remaining-number information or usage-number information) relating to the number of circuit elements To in the cartridge 7 is stored in the memory part 157 (see above-described FIG. 17) provided in the IC circuit part 151 of each RFID circuit element To equipped in the base tape 101. In this embodiment, sequential-order information is stored as the number-count-related information. This sequential-order information refers to information indicating how-manieth circuit element To the circuit element To in question is out of the total number of circuit elements To equipped in the base tape 101 of a new RFID cartridge 7 with which no RFID label T has been produced yet, for example, information indicating that the circuit element To in question is the third (3/50) one out of a total of 50 circuit elements To. As will be described later, the above-mentioned remaining-number information as number-count information is calculated by computation from the sequential-order information in the above-mentioned memory part 157 and stored into the remaining-number memory 117F. It should be noted that in the case where remaining-number information or usage-number information itself is stored (as number-count-related information) in the memory part 157, this may be stored as number-count information in a number-count memory (remaining-number memory 117F) as it is.

FIGS. 58A and 58B are views each showing an example of the outward appearance of the RFID label T formed after writing (or reading) of information to the RFID circuit element To and cutting of the tag label tape 109 with print are completed by means of the tag-label producing device 1' configured as described above. FIG. 58A is a top view, and FIG. 58B is a bottom view.

In FIGS. 58A and 58B, like the one shown in FIG. 18 described above, the RFID label T is of a five-layer structure including the cover film 103.

In the tag-label producing device 1', using a pair of base tape 101 and cover film 103, a plurality of RFID labels T are sequentially produced from the tag label tape 109 with print obtained by bonding the base tape 101 and the cover film 103 together. In this case, during this sequential production of the RFID labels T, suitable letter information R1 indicating logos such as the brand name of the RFID label T or messages such as "Handle with care" is printed onto the front margin area S1 of the cover film 103 of each RFID label T (This letter information R1 may not be printed).

Next, the control behaviors according to the feed position in the above-mentioned tag-label producing device 1' will be described with reference to FIGS. 59 to 64.

(A) When the Print Length is Relatively Long

FIGS. 59A to 59K are explanatory views each showing the positional relation between the identifier PM, RFID circuit element To, and print area S for label print R of the tag label tape 109 with print that is continuously paid out, and the loop antenna LC, the mark sensor 127, the half-cut unit 35, the cutting mechanism 15, and the print head 23. It should be noted that as illustrated in the drawings, in this embodiment, the distance L in the base tape 101 from the leading end position of the identifier PM in the tape feed direction to the leading end of the RFID circuit element To in the tape feed direction is set in advance so to be equal to the distance Lo in the tape feed direction between the mark sensor 127 and the print head 23.

A bonding portion consisting of the tape feed roller 27 and the pressure roller 28 is provided (as shown in FIG. 5 mentioned above) between the print head 23 and the cutting mechanism 15. FIG. 59A shows a state in which, after the base tape 101 paid out from the first roll 102 of the cartridge 7 and the cover film 103 paid out from the second roll 104 are bonded together by the tape feed roller 27 and the pressure roller 28, the leading end of the bonded tape reaches the cutting mechanism 15. For the convenience of description, a tape that has been bonded but for which printing has not been performed yet by the print head 23 onto the cover film 103 will herein be also referred to as the tag label tape 109 with print. In the state shown in FIG. 59A, the beginning of the tag label tape 109 with print is being fed, and the identifier PM has not been detected by the mark sensor 127.

When the feeding of the tag label tape 109 with print further proceeds in this state (in other words, the feeding of the base tape 101 and cover film 103; the same applies hereinafter), in the same manner as in FIG. 21B described above, the portion in the vicinity of the leading end of the RFID circuit element To in the tape feed direction reaches the position of the print head 23 (FIG. 59B). In correspondence with this, the identifier PM is detected by the mark sensor 127. Accordingly, in the same manner as in FIG. 21C described above, the printing of the label print R onto the cover film 103 is started (FIG. 59C).

As the feeding further proceeds, in the same manner as in FIG. 21D, the position of the front half-cut line HC1 reaches the position of the half-cut unit 35 (FIG. 59D), the feeding of the tag label tape 109 with print is stopped, and the front half-cut line HC1 is formed by means of the half-cut unit 35 (FIG. 59D).

Thereafter, the feeding is resumed, and as the feeding of the tag label tape 109 with print further proceeds from the state shown in FIG. 59D mentioned above (see FIG. 59E similar to FIG. 21E described above), the RFID circuit element To reaches the position of the loop antenna LC (see FIG. 59F similar to FIG. 21F described above). Since not all of the printing in the print area S has been finished at this point, in the same manner as described above, the feeding and printing of the tag label tape 109 with print are temporarily stopped (interrupted), and writing of information is performed in the feeding stopped state through wireless communication with the RFID circuit element To by means of the loop antenna LC. In this embodiment, since the above-mentioned RFID circuit element To at this time is the first one of the RFID circuit elements of the tag label tape 109 with print, through wireless communication with the above-mentioned RFID circuit element To, reading of sequential-order information (for example, 1/50 indicating that the RFID circuit element To in question is the first one out of the total of 50 RFID circuit elements in the cartridge 7) as number-count information stored in that RFID circuit element To is performed at the same time, and from the sequential-order information, the value Q of the remaining number of the RFID circuit elements To in the cartridge 7 (since the RFID circuit element To in question has been discharged to the outside of the cartridge 7 at this point, Q=50−1=49) is computed. Then, in view of the fact that 1 is subtracted from Q (in step S2065 that will be described later) after the completion of the production of the RFID label T, the value Q+1 (that is, 50 in this example) with 1 added to the value of Q in advance, is stored into the remaining-number memory 117F as the remaining-number information to be stored. Subsequently, the feeding and printing are resumed (see FIG. 59G similar to FIG. 21G described above), and printing of all of the letters ("ABCDEF-GHIJKLMN") is finally completed (see FIG. 59H similar to FIG. 21H described above).

As the feeding of the tag label tape 109 with print further proceeds, the position of the rear half-cut line HC2 reaches the position of the half-cut unit 35. In accordance with this, in the same manner as in FIG. 21I described above, the feeding is stopped, and the rear half-cut line HC2 is formed by means of the half-cut unit 35 (FIG. 59I).

As described above, in each RFID label T, suitable information R1 such as the logo of the brand name of the RFID circuit element To is printed in the front margin area S1 of the cover film 103. That is, as the feeding of the tag label tape 109 with print further proceeds from the state shown in FIG. 59I mentioned above, the front margin area S1 of the cover film 103 corresponding to the above-mentioned next RFID label T reaches the position of the print head 23. In the same manner as described above, the detection of the arrival at this position is performed by detecting that the tag label tape 109 with print has moved by a predetermined distance from the state shown in FIG. 59B. In response to this detection, printing of the above-mentioned suitable information R1 is started with respect to the cover film 103 (FIG. 59J).

As the feeding of the tag label tape 109 with print further proceeds from the state shown in FIG. 59J mentioned above, the position of the cutting line CL (cutting part) reaches the position of the cutting mechanism 15 (at this stage, the printing of the above-mentioned sequential-order information R1 has been completed). In the same manner as described above, the detection of the arrival at this position is also performed by detecting that the tag label tape 109 with print has moved by a predetermined distance from the state shown in FIG. 59B. In response to this detection, the feeding of the tag label tape 109 with print is stopped, and cutting is performed by the cutting mechanism 15 at the cutting line CL (see FIG. 59K corresponding to FIG. 21K described above), so the first RFID label T on the leading end side is cut off from the tag label tape 109 with print, thereby forming the first RFID label T.

In this embodiment, in view of the face that the remaining number of RFID labels T in the cartridge 7 decreases by 1 each time one RFID label T is formed as described above, at the point when the label is completed as mentioned above, the value Q of the remaining-number information is decreased to Q−1 (to 49 equal to 50 decreased by 1), and that value is overwritten into the remaining-number memory 117F and also that value ("49" in this example) is displayed on the remaining-number display portion 9. The state of the tag label tape 109 with print from which the first RFID label T has been cut off in the manner as described above becomes the same as that shown in FIG. 59A. As it is fed, the tag label tape 109 with print advances with its leading end side provided with the identifier PM being at the front.

FIGS. 60A to 60C illustrate processing that is performed, after the completed RFID labels T are cut off one after another from the tag label tape 109 with print as mentioned above, with respect to the trailing end portion of the tag label tape 109 with print located downstream of the last 50th RFID label T. At the trailing end portion of the tape 109, the RFID circuit element To is not provided in the base tape 101.

In FIG. 60A, as the tag label tape 109 with print, in which printing onto the last (in this example, 50th) RFID label T and writing of information into the RFID circuit element To have been finished, is fed, and the position of the preset rear-half cut line HC2 reaches the position of the half-cut unit 35 as mentioned above, the feeding of the tape 109 is stopped, and the tape 109 is subjected to rear half-cutting at the position of the line HC2 by the cutter 34 of the half-cut unit 35. The feeding of the tag label tape 109 with print is then resumed, and as the trailing end portion of the tape 109 leading to the last RFID label T passes through the position of the print head 23, information indicating the trailing end portion of the tape (a letter string "END" in this example) is printed as suitable information R1 provided in rear of the identifier PM, at a predetermined position of the terminal end portion of the cover film 103 corresponding to the front margin area S1 in the RFID label T (FIG. 60B).

As the feeding of the tag label tape 109 with print further proceeds from the state shown in FIG. 60B, and when the position of the cutting line CL reaches the cutting mechanism 15, the feeding is stopped and the tape 109 is cut, thereby cutting off the last 50th RFID label T from the tape 109 (FIG. 60C). Due to this cutting off of the RFID label T, only the trailing end portion of the tag label tape 109 with print remains. Upon thus discharging the last RFID label T, the value Q of the remaining-number information stored in the remaining-number memory 117F becomes Q=0, and the numerical value 0 is displayed on the remaining-number display portion 9.

It should be noted that at this time, an indication of the tape-out condition is displayed on the screen of the PC 118 to notify the operator to that effect (the drive of the feed roller 27 or the like may be stopped as required).

Figure 61A:
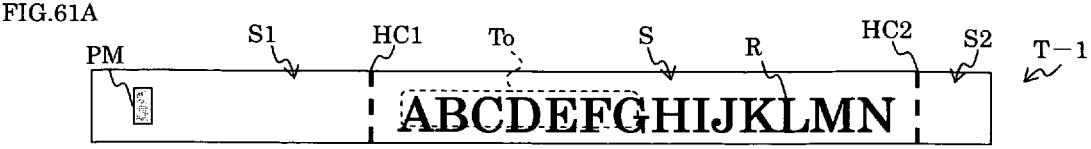
FIG. 61A, 61B are respectively view showing an example of an RFID label obtained by the processing of FIG. 59.
Figure 61B:
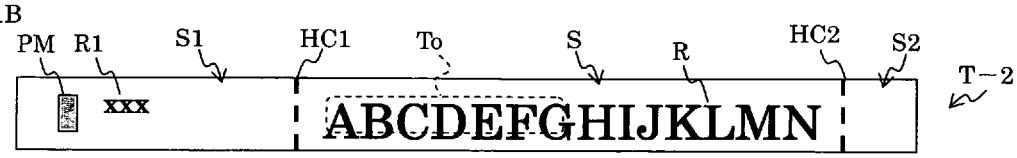

FIG. 61 is a view, substantially corresponding to FIG. 58A described above, showing an example of the RFID label T completed in the manner as described above. FIG. 61A shows the example of an RFID label T-1 that is produced for the first time (that is, the first RFID label) using a new base tape 101 and a new cover film 103. FIG. 61B shows the example of another RFID label T-2 (that is, the second RFID label onward). In each of the RFID labels T-1 and T-2, the RFID circuit element To is arranged on the center side in the tape length direction, the label print R is printed in the print area S corresponding to the RFID circuit element To, and the front margin area S1 where the identifier PM is present, and the rear margin area S2 are provided across the front and rear half cut lines HC1, HC2, respectively, from the print area S. The suitable information R1 in the front margin area S1 of the RFID label T is printed with respect to the second RFID label T-2 shown in FIG. 61B onward.

(B) When the Print Length is Relatively Short

Description will be made with reference to FIGS. 62A to 62K and 63A to 63C. Like FIGS. 59A to 59K mentioned above, FIGS. 62A to 62K are explanatory views each showing the positional relation between the identifier PM, RFID circuit element To, and print area S for label print R of the tag label tape 109 with print that is continuously paid out, and the loop antenna LC, the mark sensor 127, the half-cut unit 35, the cutting mechanism 15, and the print head 23. In this example, as shown in FIGS. 62F to 62K that will be described later, a relatively short string of letters (alphabet letters "AMCDEFJHIJ") is printed as an example.

First, FIGS. 62A to 62E are the same as FIGS. 59A to 59E described above. That is, when, after the paying out of the tag label tape 109 with print is started (FIG. 62A), the leading end of the identifier PM reaches the position of the mark sensor 127 (FIG. 62B), the printing of the label print R onto the cover film 103 is started (FIG. 62C). After the position of the front half-cut line HC1 reaches the position of the half-cut unit 35 and the front half-cut line HC1 is formed (FIG. 62D), the feeding of the tag label tape 109 with print further proceeds (FIG. 62E). Since the number of letters in the label print R is relatively small in this example, the printing of the label print R ("ABCDEFGHIJ") is completed before the RFID circuit element To reaches the position of the loop antenna LC (FIG. 62F).

Thereafter, the RFID circuit element To reaches the position of the loop antenna LC (FIG. 62G), and after wireless communication with the RFID circuit element To is performed by means of the loop antenna LC in the feeding stopped state, the feeding is resumed (FIG. 62H). Through this wireless communication with the RFID circuit element To, in the same manner as described above, sequential-order information (1/50 or the like in the above-described example) as number-count-related information stored in that RFID circuit element To is read, and from that sequential-order information, the value Q (49 or the like) of the remaining number of the RFID circuit elements To in the cartridge 7 is computed. Then, as described above, Q+1 (that is, 50 in this example) as the value with 1 added to this value of Q is stored into the remaining-number memory 117F as the remaining-number information to be stored.

The subsequent operations in FIGS. 62I to 62K are the same as those in FIGS. 59I to 59K mentioned above. That is, the rear half-cut line HC2 is formed (FIG. 62I), printing of the suitable information R1 such as the logo of a brand name is started (FIG. 62J), cutting is performed at the cutting line CL (FIG. 62K), and the leading end side of the tag label tape 109 with print is cut off to thereby produce the RFID label T. Then, in the same manner as described above, in view of the fact that the remaining number of RFID labels T in the cartridge 7 decreases by 1 each time one RFID label T is formed as described above, at the point when the label is completed as mentioned above, the value Q of the remaining-number information is decreased by 1 to Q=1 (to 49 as a value decreased by 1), and that value is overwritten into the remaining-number memory 117F and also that value ("49" in this example) is displayed on the remaining-number display portion 9.

FIGS. 63A to 63C are views respectively corresponding to FIGS. 60A to 60C. In FIG. 63A, in the tag label tape 109 with print, the completed RFID labels T have been cut off one after another, the printing onto the last 50th RFID label T has been completed, and writing of information to the RFID circuit element To has been finished. When the position of the rear half-cut line HC2 reaches the position of the half-cut unit 35, as described above, the feeding of the tape 109 is stopped, and the tape 109 is subjected to rear half-cutting at the position of the line HC2 by the cutter 34 of the half-cut unit 35.

Then, the feeding of the tag label tape 109 with print is resumed, and as the trailing end portion of the tape 109 leading to the last RFID label T passes through the position of the print head 23, the letter string "END" as the suitable information R1 provided in rear of the identifier PM is printed at a predetermined position of the terminal end portion of the cover film 103 corresponding to the front margin area S1 in the RFID label T (FIG. 63B).

As the feeding of the tag label tape 109 with print further proceeds from the state shown in FIG. 63B, and when the position of the cutting line CL reaches the cutting mechanism 15, the feeding is stopped and the tape 109 is cut, thereby cutting off the last 50th RFID label T from the tape 109 (FIG. 63C). Due to this cutting off of the RFID label T, only the trailing end portion of the tag label tape 109 with print remains. Upon thus discharging the last RFID label T, the value Q of the remaining-number information stored in the remaining-number memory 117F becomes Q=0, and the numerical value 0 is displayed on the remaining-number display portion 9.

Figure 64A:
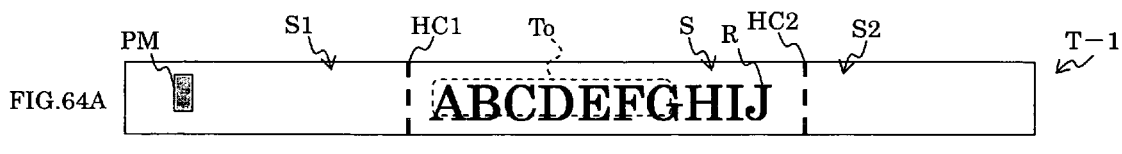
FIG. 64A, 64B are respectively view showing an example of an RFID label obtained by the processing of FIG. 62.
Figure 64B:
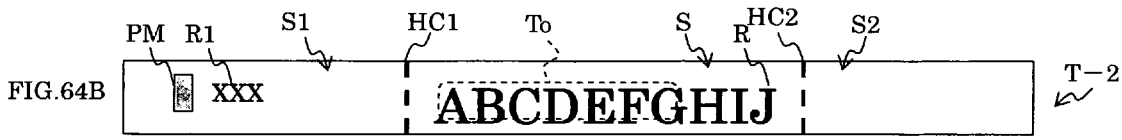

FIGS. 64A and 64B are views, substantially corresponding to FIGS. 61A and 61B described above in the section (A) mentioned above, each showing an example of the RFID label T completed in the manner as mentioned above. As described above, the suitable information R1 in the front margin area S1 of the RFID label T is printed with respect to the second RFID label T-2 shown in FIG. 64B onward.

Figure 65:
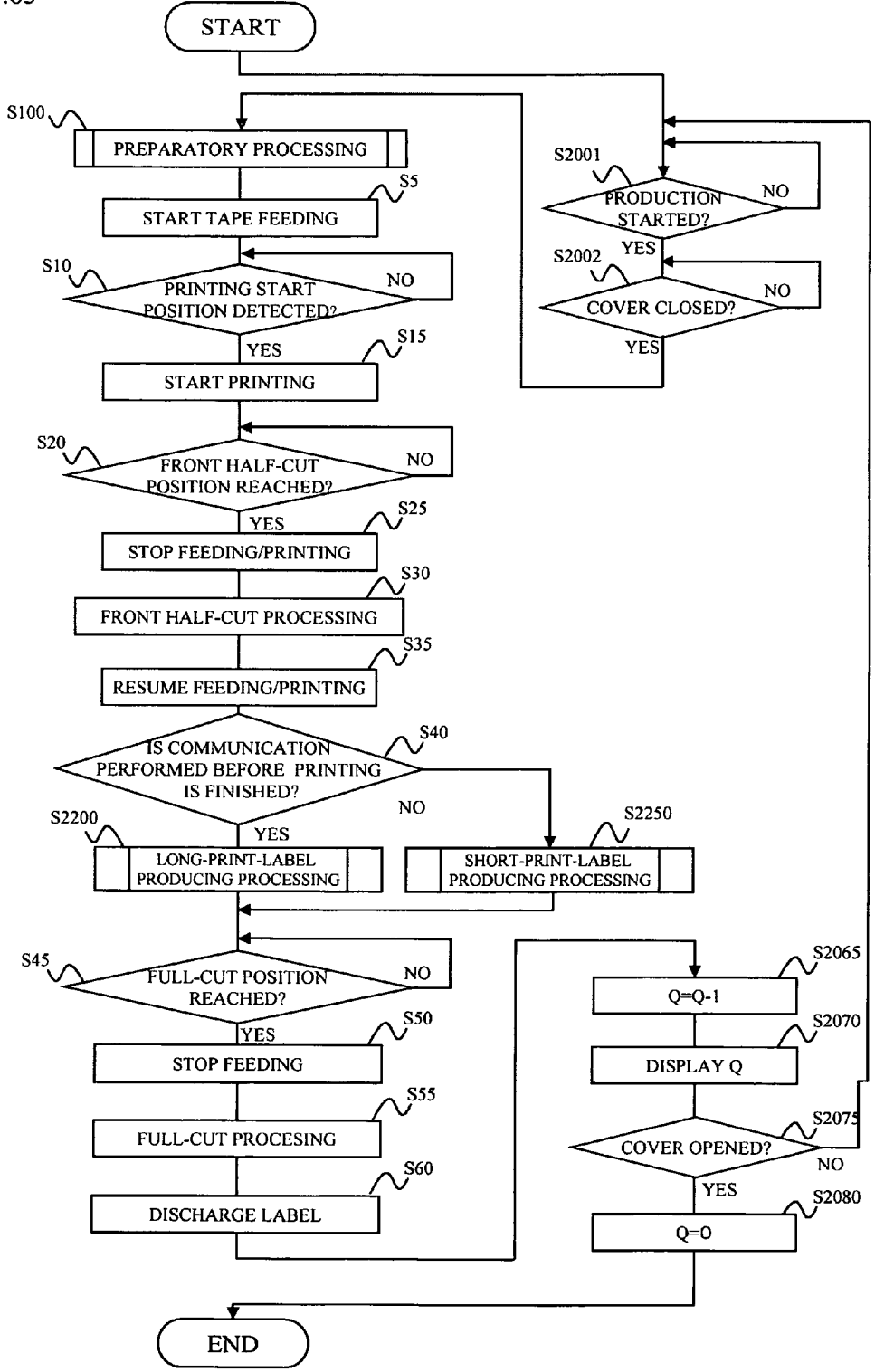
FIG. 65 is a flowchart showing the procedure of control executed by the control circuit.

FIG. 65 is a flowchart, corresponding to FIG. 30 described above, showing the procedure of the series of controls executed by the above-mentioned control circuit 110. The procedures that are equivalent to those of FIG. 30 are denoted by the same reference numerals, and description thereof is omitted or simplified as appropriate.

FIG. 65 differs from FIG. 30 in that steps S2001 and S2002 are provided before step S100, and that steps S2065, S2070, S2075, S2080 are provided after step S60. Further, instead of steps S200, S250, steps S2200 and S2250 corresponding to these steps are provided.

That is, first, when the operator turns on the production start button of the tag-label producing device 1' (or when a predetermined tag-label producing operation by the tag-label producing device 1' is performed via the above-mentioned PC 118), and it is determined in step S2001 that the production of an RFID label has been started, then, in step S2002, it is determined whether or not the cover (open/close cover) 3 has been closed. When the operator presses the open/close button (open/close switch) 4 to open the cover 3 in the upper surface of the main body 2, and loads the RFID circuit element cartridge 7 onto the cartridge holder 6 inside the main body 2 and closes the cover 3, the open/close sensor 130 (see FIG. 57) detects that the cover 3 has been closed, and the determination of step S2002 is satisfied so step S100 described above is executed.

In step S100, preparatory processing (which is the same as that of FIG. 28 described above) is executed. In the prepara-tory processing, an operation signal from the PC 118 (or the production start button) is input (via the communication line NW and the input/output interface 113), and on the basis of this operation signal, setting of print data or communication data with the RFID element To, or the like is performed.

Since steps S5 to S40 thereafter are the same as those of FIG. 30, description thereof is omitted.

Thereafter, in step S40, in the same manner as described above, it is determined with respect to the tag label tape 109 with print whether or not the communication position with the RFID circuit element To is reached before the printing of all of the label print R with respect to the print area S is finished (the state shown in FIG. 59F described above), or whether or not the printing of all of the label print R with respect to the print area S is finished before the communication position with the RFID circuit element To is reached (the state shown in FIG. 62G described above).

For example, if the length of the label print R to be printed is relatively long and the positional relation as shown in FIG. 59F mentioned above results, the determination of step S40 mentioned above is satisfied, and the process transfers to step S2200 similar to that described above, where the processing of producing a long print label is performed (for details, see FIG. 66 that will be described later). That is, once the tag label tape 109 with print has been fed to the communication position with the RFID circuit element To, the feeding and printing are stopped to perform transmission/reception of information. Through the transmission/reception of information, the sequential-order information stored in the RFID circuit element To is read, and the value Q of the remaining number of RFID circuit elements To in the cartridge 7 is computed; thereafter, feeding and printing are resumed to complete the printing, and after the feeding is further continued and then stopped at the rear half-cut position to form the rear half-cut line HC2, printing (margin printing) of the suitable information R1 such as the logo of a brand name is performed.

On the other hand, for example, if the length of the label print R to be printed is relatively short and the positional relation as shown in FIG. 62G mentioned above results, the determination of step S40 mentioned above is not satisfied, and the process transfers to step S2250 where the processing of producing a short print label is performed (for details, see FIG. 67 that will be described later). That is, after the feeding and printing are continued as they are to complete the printing first, the feeding is further continued; upon arrival at the communication position with the RFID circuit element To, the feeding is stopped to perform transmission/reception of information. Through the transmission/reception of information, the sequential-order information stored in the RFID circuit element To is read, and the value Q of the remaining number of RFID circuit elements To in the cartridge 7 is computed. After the feeding is further continued and then stopped at the rear half-cut position to form the rear half-cut line HC2, printing (margin printing) of the suitable information R1 is performed.

Once step S2200 or step S2250 has been finished as described above, the process transfers to step S45. Since steps S45 to S60 are the same as described above, description thereof is omitted.

In step S60, the RFID label T is fed toward the label discharge port 11, and when the RFID label T is discharged to the outside of the tag-label producing device 1' from the label discharge port 11, the process then transfers to step S2065.

In step S2065, the value Q of the remaining number of RFID circuit elements To in the cartridge 7, which is calculated in step S2200 or S2250, is decreased by 1 so that Q=Q−1, and this value Q−1 is stored into the remaining-number memory 117F. Further, in step S2070, this value Q−1 is displayed on the remaining-number display portion 9 of the main body 2.

Then, in step S2075, on the basis of the detection signal from the open/close sensor 130, it is determined whether or not the cover 3 of the label producing device 1' has opened, and until the opening of the cover 3 is detected, it is regarded that the operator has not finished the production of the tag label T, and the process returns to step S2001 to repeat the same procedure.

On the other hand, in case it is determined in step S2075 that the open/close sensor 130 has detected the opening of the cover 3, it is regarded that the operator has finished the production of the tag label and opened the cover 3, so the value of the remaining-number information for the RFID circuit elements To stored in the remaining-number memory 117F is reset to 0 in step S2080, and this flow is ended.

Figure 66:
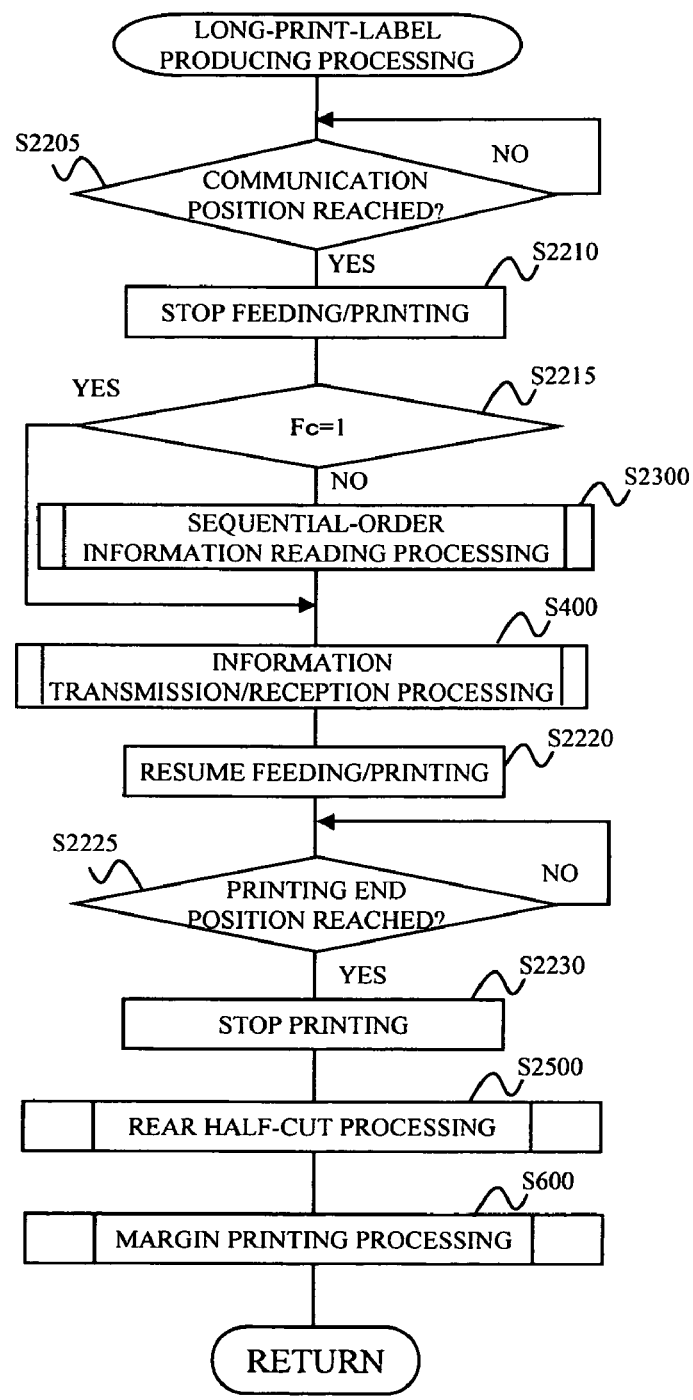
FIG. 66 is a flowchart showing the detailed procedure of step S2200.

FIG. 66 is a flowchart showing the detailed procedure of step S2200 described above.

In the flow shown in FIG. 66, first, in step S2205, as in step S210 of FIG. 32 described above, it is determined whether or not the tag label tape 109 with print has been fed to the communication position with the loop antenna LC described above (in other words, whether or not the tag label tape 109 with print has substantially reached the position as set in step S125 mentioned above where the loop antenna LC substantially directly faces the position of the RFID circuit element To). The determination at this time as well may be performed by, as step 20 described above, for example, detecting by a predetermined known method the distance by which the tag label tape 109 with print has been fed after the detection of the identifier PM of the base tape 101 in step S10 mentioned above. The determination is not satisfied until the arrival at the communication position and this procedure is repeated, and upon the arrival at the communication position, the determination is satisfied and the process transfers to the next step S2210.

In step S2210, as in step S25 mentioned above, the rotations of the tape feed roller 27, ribbon take-up roller 106, and drive roller 51 are stopped, and feeding of the tag label tape 109 with print is stopped in the state with the loop antenna LC substantially directly facing the RFID circuit element To. Further, the energization of the print head 23 is stopped to thereby stop (interrupt) the printing of the above-mentioned label print R (see FIG. 59F).

Thereafter, in step S2215, it is determined whether or not the sequential-order information reading flag Fc=1 (whether or not the remaining-number information on the RFID circuit elements To in the cartridge 7 has already been read once). The determination is satisfied if Fc=1, and the process transfers to step S400 as it is; if Fc=0, the determination is not satisfied, and the process transfers to step S400 after performing the sequential-order information reading processing (information acquisition processing; details of which will be described later) of step S2300.

In step S400, in the same manner as in FIG. 34 described above, transmission/reception of information is performed via wireless communication between the antenna LC and the RFID circuit element To, thereby performing information transmission/reception processing of writing the information created in step S115 mentioned above to the IC circuit part 151 of the RFID circuit element To (or reading information previously stored in the IC circuit part).

Once the transmission/reception of information has been finished in step S400 mentioned above, the process transfers to step S2220. In step S2220, in the same manner as in step S35 of FIG. 65, the tape feed roller 27, the ribbon take-up roller 106, and the drive roller 51 are rotationally driven to resume the feeding of the tag label tape 109 with print, and the print head 23 is energized to resume the printing of the label print R.

Thereafter, the process transfers to step S2225, and it is determined whether or not the tag label tape 109 with print has been fed to the above-described printing end position (calculated in step S130 mentioned above). As described above, the determination at this time as well may be performed by, for example, detecting by a predetermined known method the distance by which the tag label tape 109 with print has been fed after the detection of the identifier PM of the base tape 101 in step S10 mentioned above. The determination is not satisfied until the arrival at the printing end position and this procedure is repeated, and upon the arrival at the printing end position, the determination is satisfied and the process transfers to the next step S2230.

In step S2230, as in step S25 of FIG. 65 mentioned above, the energization of the print head 23 is stopped to stop the printing of the above-mentioned label print R. This completes the printing of the label print R with respect to the print area S (see FIG. 59H).

Thereafter, the process transfers to step S2500, and rear half-cut processing, in which the formation of the rear half-cut line HC2 is performed using the half-cutter 34 of the half-cut unit 35 after the tag label tape 109 with print is fed to a predetermined rear half-cut position, is carried out (for details, see FIG. 69 that will be described later).

Once step S2500 as described above is finished, the process transfers to step S600. In step S600, margin printing processing, in which printing of the above-described suitable information R1 is performed with respect to the front margin area S1 (of the next RFID label T) located on the tape rear end side with respect to the above-mentioned cutting line CL, is executed, and this routine is ended.

Figure 67:
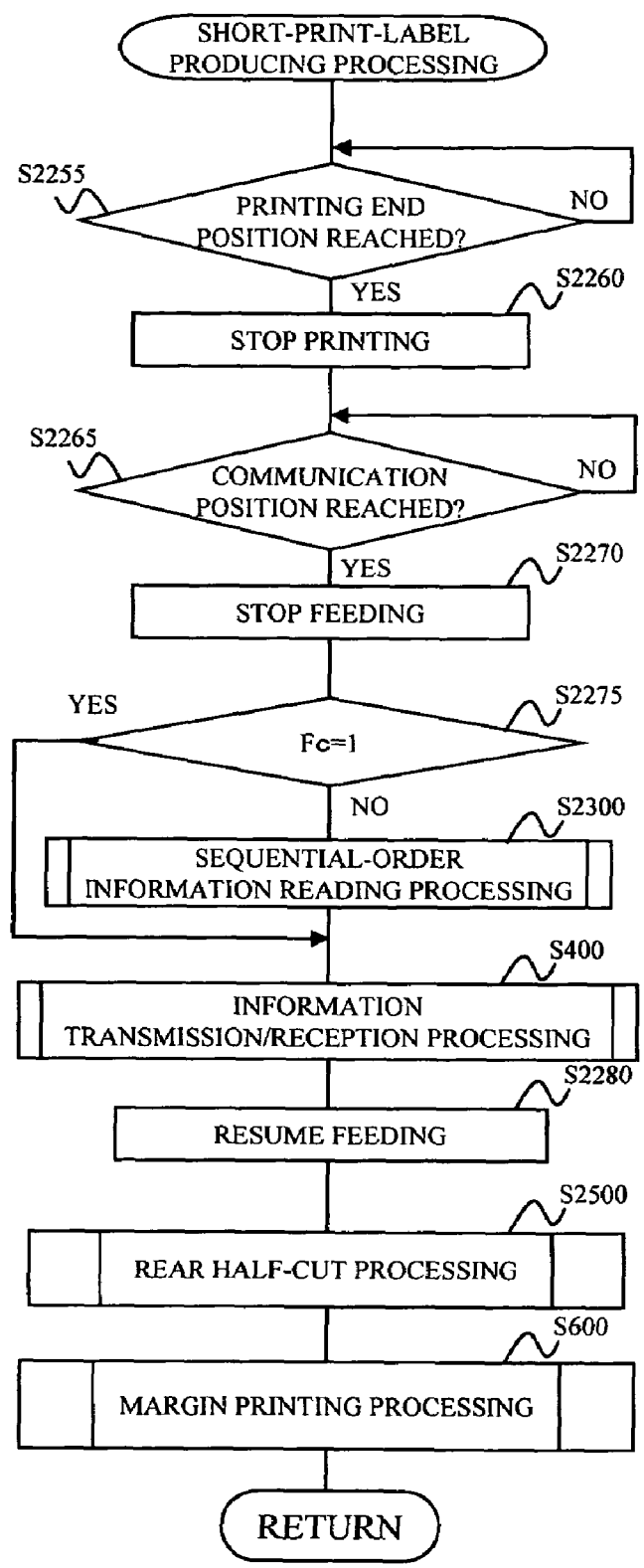
FIG. 67 is a flowchart showing the detailed procedure of step S2250.

FIG. 67 is a flowchart showing the detailed procedure of step S2250 described above. In the flowchart shown in FIG. 67, first, in step 2255, in the same manner as in step S2225 of FIG. 66, it is determined whether or not the tag label tape 109 with print has been fed to the above-described printing end position (calculated in step S130 mentioned above). The determination at this time as well may be performed in the same manner as in step S2225. The determination is not satisfied until the arrival at the printing end position and this procedure is repeated, and upon the arrival at the printing end position, the determination is satisfied and the process transfers to the next step S2260.

In step S2260, in the same manner as in step S2230 of FIG. 66 mentioned above, the energization of the print head 23 is stopped to thereby stop the printing of the above-mentioned label print R. This completes the printing of the label print R with respect to the print area S (see FIG. 62F).

Thereafter, the process transfers to step S2265, and in the same manner as in step S2205 of FIG. 66 mentioned above, it is determined whether or not the tag label tape 109 with print has been fed to the communication position with the loop antenna LC described above. The determination at this time as well may be performed in the same manner as in step S2205. The determination is not satisfied until the arrival at the communication position and this procedure is repeated, and upon the arrival at the communication position, the determination is satisfied and the process transfers to the next step S2270.

In step S2270, in the same manner as in step S2210 mentioned above, the rotations of the tape feed roller 27, ribbon take-up roller 106, and drive roller 51 are stopped, and feeding of the tag label tape 109 with print is stopped in the state with the loop antenna LC substantially directly facing the RFID circuit element To (see FIG. 62G).

Thereafter, in step S2275, as in S2215 mentioned above, it is determined whether or not the sequential-order information reading flag Fc=1 (whether or not the remaining-number information on the RFID circuit elements To in the cartridge 7 has already been read once). The determination is satisfied if Fc=1, and the process transfers to step S400 as it is; if Fc=0, the determination is not satisfied, and the process transfers to step S400 after performing the sequential-order information reading processing (information acquisition processing) of step S2300.

Step S400 thereafter is the same as that of FIG. 66, and information transmission/reception processing of performing transmission/reception of information via wireless communication between the antenna LC and the RFID circuit element To is carried out.

Once the transmission/reception of information has been finished in step S400 mentioned above, the process transfers to step S2280.

In step S2280, as in step S2220 of FIG. 66, the tape feed roller 27, the ribbon take-up roller 106, and the drive roller 51 are rotationally driven to resume the feeding of the tag label tape 109 with print (see FIG. 62H).

Since step S2500 thereafter is the same as that of FIG. 66, the description thereof is omitted.

It should be noted that the detailed procedure of step S600 in FIGS. 66 and 67 is the same as that shown in FIG. 36 described above. That is, in the flow shown in FIG. 36, first, in step S620, it is determined whether or not the tag label tape 109 with print has been fed to the above-described margin printing start position. When the determination is satisfied, then, in step S640, the printing of the suitable information R1 is started (see FIG. 59J or 62J). Thereafter, the process transfers to step S660, and it is determined whether or not the tag label tape 109 with print has been fed to the above-described margin printing end position. In case the determination is satisfied, then, in step S680, the printing of the above-mentioned suitable information R1 is stopped. The printing of the suitable information R1 with respect to the front margin area S1 is thus completed, and this routine is ended.

Figure 68:
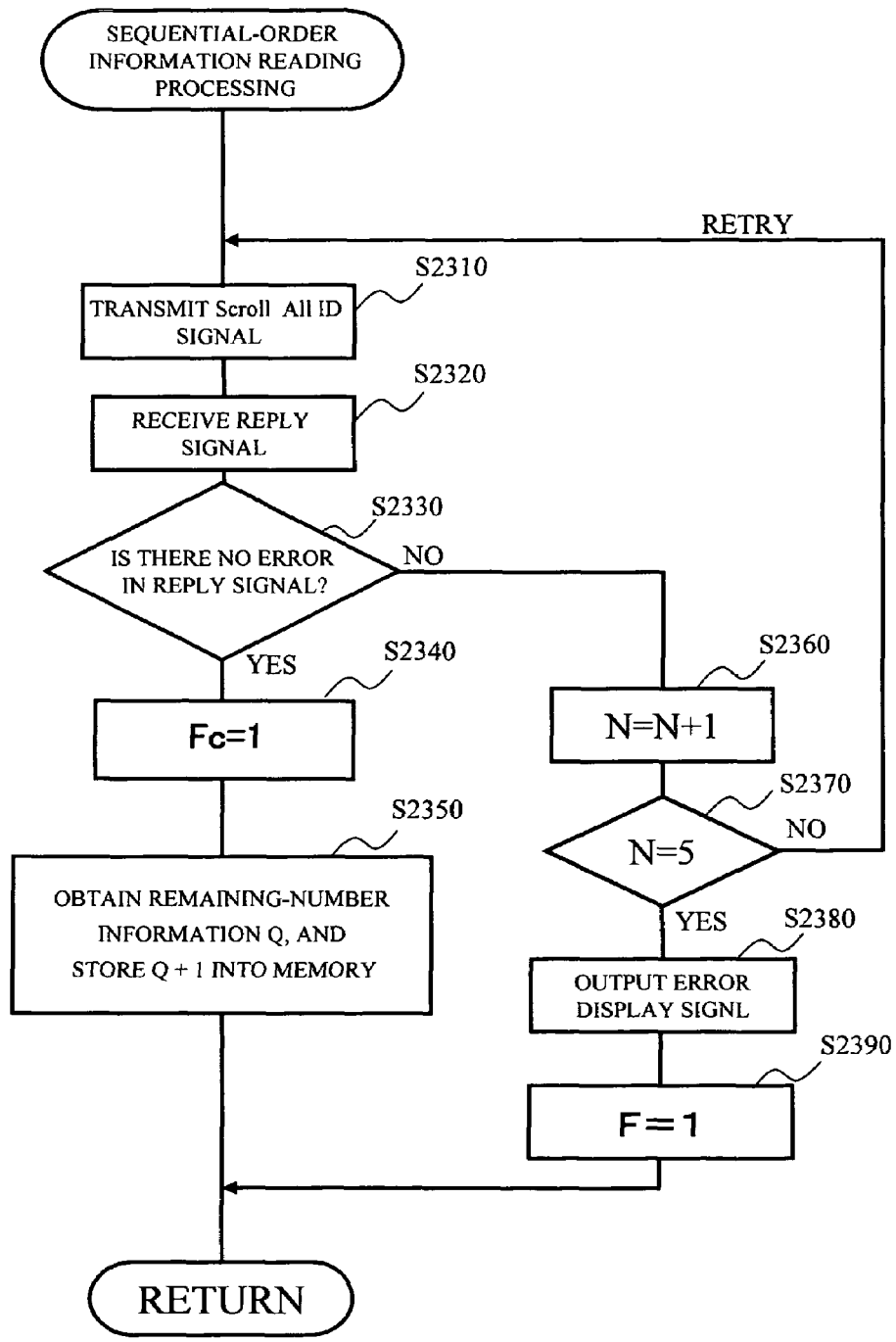
FIG. 68 is a flowchart showing the detailed procedure of step S2300.

FIG. 68 is a flowchart showing the detailed procedure of the sequential-order information reading processing of step S2300 described above with reference to FIGS. 66 and 67.

In FIG. 68, as the RFID circuit element To from which information is to be read (the RFID circuit element To located most forward in the cartridge 7 at this point) is fed to the vicinity of the antenna LC, in step S2310, a control signal is output to the above-described transmitting circuit 306 (see FIG. 57 or the like) via the input/output interface 113, and as the "Scroll All ID" signal for reading out the sequential-order information as number-count-related information stored in the RFID circuit element To, a carrier wave on which predetermined modulation has been performed is transmitted via the loop antenna LC to the RFID circuit element To from which information is to be read, thus urging a reply.

Next, in step S2320, a reply signal (including the sequential-order information as number-count-related information) that is transmitted from the RFID circuit element To, from which information is to be read, in response to the above-mentioned "Scroll All ID" signal is received via the antenna LC, and taken in via the receiving circuit 307 and the input/output interface 113.

Next, in step S2330, the presence/absence of an error in the reply signal received in step S2320 mentioned above is determined using a known error detection code (CRC code: Cyclic Redundancy Check or the like).

In case the determination as to the absence of an error in the reply signal is satisfied, in step S2340, the sequential-order information reading flag Fc is set as Fc=1. Thereafter, in step S2350, on the basis of the sequential-order information read in step S2320 mentioned above, the number Q of the RFID circuit elements To remaining in the cartridge 7 is computed, and the value Q is set as the remaining-number information. Then, in correspondence with the subtraction performed in step S2065 mentioned above, Q+1 as a value with 1 added to the above-mentioned value Q is stored into the remaining-number memory 117F as the remaining-number information to be stored, thereby completing this routine.

On the other hand, in step S2330, the determination is not satisfied if there is an error in the reply signal, and the process transfers to step S2360 where 1 is added to N, and further in step S2370, it is determined whether or not N=5. If N≦4, the determination is not satisfied, and the process returns to step S2310 to repeat the same procedure. If N=5, the process transfers to step S2380, and an error display signal is output to the PC 118 (the terminal 118a and the general purpose computer 118b) via the input/output interface 113 and the communication line. After the corresponding reading failure (error) display is made, in step S2390, the above-described flag F is set as F=1, and this routine is ended. In this way, even when the reading of information is unsuccessful, retry is performed up to 5 times, thereby making it possible to ensure that the reliability of reading is secured.

Figure 69:
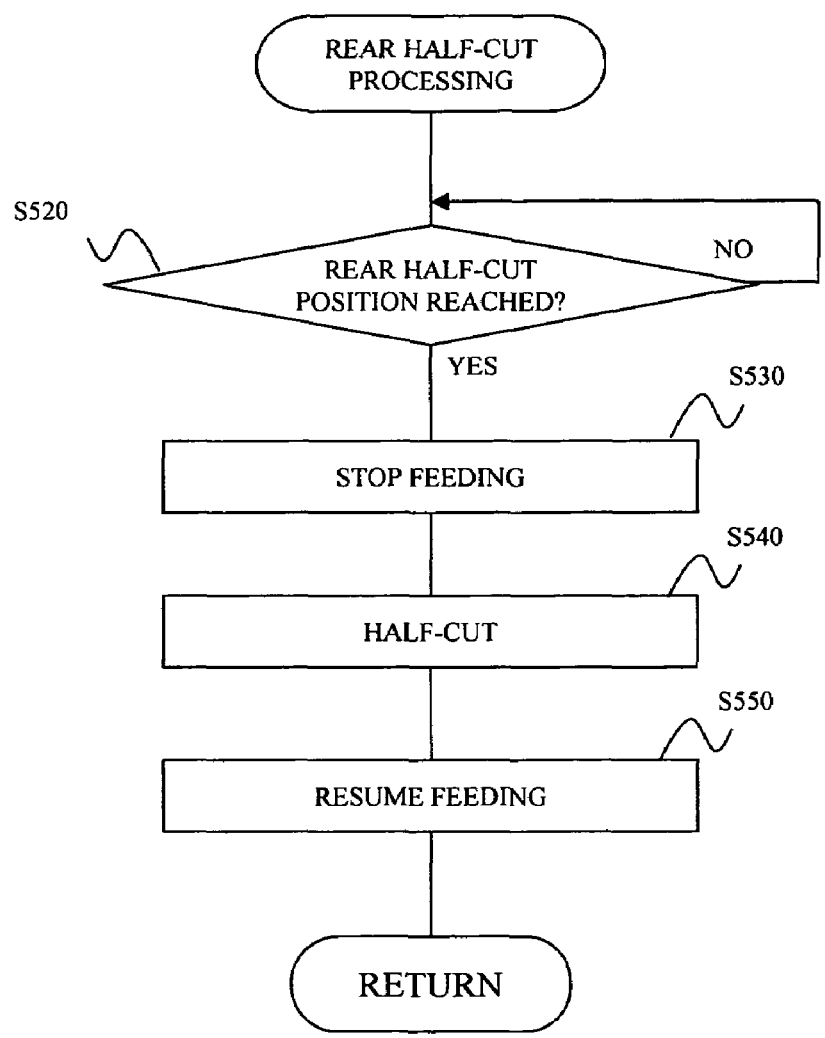
FIG. 69 is a flowchart showing the detailed procedure of step S2500.

FIG. 69 is a flowchart showing the detailed procedure of step S2500 described above with reference to FIGS. 66 and 67.

In FIG. 69, this flow is substantially equivalent to a flow with step S510 omitted from the flow shown in FIG. 35 mentioned above.

That is, first, in step S520, in the same manner as in step S20 described above, it is determined whether or not the tag label tape 109 with print has been fed to the above-described rear half-cut position. In case the determination is satisfied, the process transfers to the next step S530 where the drives of the feed motor 119 and tape discharging motor 65 are stopped, thus stopping the rotations of the tape feed roller 27, ribbon take-up roller 106, and drive roller 51.

Thereafter, the process transfers to step S540, and in the same manner as in step S30 mentioned above, a control signal is output to the half-cutter motor drive circuit 128 to pivot the half-cutter 34, thereby performing rear half-cutting processing of cutting the cover film 103, adhesive layer 101a, base film 101b, and adhesive layer 101c of the tag label tape 109 with print to form the rear half-cut line HC2 (see FIG. 59I or 62I).

Then, the process transfers to step S550 where, in the same manner as in step S35 mentioned above, the tape feed roller 27, the ribbon take-up roller 106, and the drive roller 51 are rotationally driven to resume the feeding of the tag label tape 109 with print, and this routine is ended.

As described in the foregoing, with the tag-label producing device 1' according to this embodiment, the cartridge 7 that can supply the base tape 101 equipped with the RFID circuit element To, which has the IC circuit part 151 for storing information, is loaded onto the holder 6 of the main body 2, the base tape 101 supplied from the cartridge 7 is fed by means of the tape feed roller 27, and transmission/reception of information is performed via wireless communication by means of the antenna LC with respect to the RFID circuit element To equipped in the base tape 101, thereby forming the RFID label T.

At this time, during the production of the first RFID label T immediately after loading the cartridge 7 onto the holder 6, in step S2300 included in step S2200 or S2250 in FIG. 65, information on the sequential order (on the base tape 101) of an RFID circuit element To relating to the above-mentioned first RFID label T, which information is stored in the IC circuit part 151 of that RFID circuit element To, is read in step S2320. Then (after setting Fc=1 in step S2340), on the basis of the above-mentioned sequential-order information, the remaining number of RFID circuit elements To remaining in the cartridge 7 is computed in step S2350, and after Q+1 as a value with 1 added to the value Q of the remaining number is stored as remaining-number information into the remaining-number memory 117F of the control circuit 110 (step S2350), the value Q (the number of RFID circuit elements remaining in the cartridge 7) decreased by 1 from this value in step S2065 is output to and displayed on the remaining-number display portion 9 in step S2070.

Thereafter, the process returns from step S2075 to step S2001, and the production of the RFID label T is continued. Then, since Fc=1 in step S2200 or S2250 in FIG. 65, steps S400 to S600 are executed after step S2215 (without passing through the sequential-order information reading processing of step S2300), and when the label production is finished and the label is discharged, in response to this, in step S2065, the above-mentioned value Q is further decreased by 1 and displayed on the remaining-number display portion 9 in step S2070. Thereafter, in the same manner as mentioned above, while the label production is being continued, the value decreased by 1 in step S2065 each time one RFID label T is produced is displayed on the remaining-number display portion 9 in step S2070.

As a result of the above-mentioned operations, as the base tape 101 is fed (moved), predetermined processing (the acquisition of the RFID circuit element To in this example) based on the corresponding movement-related information is performed, whereby the number of RFID circuit elements To remaining in the cartridge 7 (and the number of RFID circuit elements To that changes as the production proceeds) can be reliably recognized by the operator who produces the RFID label T. As a result, as compared with the case of performing tag label production in the state where how many RFID circuit elements remain is unknown, the convenience of the operator can be enhanced.

Further, sequential-order information as number-count-related information is stored in the RFID circuit element To that is equipped to the base tape 101 from the beginning, and by using this sequential-order information stored in the first RFID circuit element To immediately after the start of label production, the remaining-number information for the succeeding RFID circuit elements To is acquired. Accordingly, as compared with the case where another separate storage portion for the acquisition of remaining-number information is provided to the cartridge 7, there is no fear of new components being added or the construction of the cartridge 7 becoming more complicated.

Further, in this embodiment, in particular, after sequential-order information is acquired in step S2320 from the first RFID circuit element To, and the remaining number of RFID circuit elements To is computed and stored into the remaining-number memory 117F, rather than performing the sequential-order information reading processing of step S2300, the value stored in the remaining-number memory 117F is simply decreased by 1 each time the label production is completed. As a result, since it is unnecessary to read the sequential-order information from the IC circuit part 151 again, as compared with the case where the sequential-order information is acquired from the IC circuit part 151 each time one tag label T is produced, unnecessary wireless communication procedure can be omitted. As a result, the time required for the label production is reduced, thereby making it possible to enhance the efficiency of production processing.

It should be noted that in the fourth embodiment mentioned above, upon detecting that the open/close cover (cover) 3 covering the upper surface of the main body 2 has become open, it is determined that the cartridge 7 has been detached from the holder 6 of the main body 2, and the value Q of the remaining-number information stored in the remaining-number memory 117F is initialized to the numerical value 0. However, this should not be construed restrictively. That is, the initialization of the value Q may be performed upon satisfying at least one of the following conditions: the cartridge 7 has been detached from the holder 6 (or such detachment has been detected); and the device power supply button 14 has been turned on or off.

In situations where, as described above (including the above-mentioned fourth embodiment), it is assumed that the cartridge 7 has been detached from the holder 6 for replacement or the like, the value of the remaining-number information previously stored in the remaining-number memory 117F is not retained but initialized (cleared), thereby making it possible to prevent an erroneous display or the like from being made on the remaining-number display portion 9 at the time of next tag label production.

Further, in the fourth embodiment mentioned above, since remaining-number information is used as number-count information, in step S2065, the value Q of the remaining-number information is decreased by 1 to Q−1 each time the production of one RFID label T is completed. However, this should not be construed restrictively. For instance, if usage number information is used as the number-count information, in a procedure corresponding to step S2065, the usage number information is increased by 1 each time the production of one RFID label T is completed. The same effects as those described above can be attained in this case as well.

It should be noted that in the fourth embodiment and the modification thereof described above, printing is performed on the cover film 103 that is separate from the base tape 101 equipped with the RFID circuit element To and the cover film 103 and the base tape 101 are bonded together, this should not be construed restrictively. For example, as described above with reference to FIG. 54 or 55, the above-mentioned fourth embodiment and the like may be applied to a system (of a type in which no bonding is performed) in which printing is performed on a print-receiving tape layer equipped to a tag tape consisting of a tape including a thermal layer and an image reception layer, for example. Further, the present disclosure is not limited to a system in which RFID tag information is read from or written into the IC circuit part 151 of the RFID circuit element To, and in which printing for identifying that RFID circuit element To is performed by the print head 23. This printing may not necessarily be performed, and the above-mentioned fourth embodiment and the like may be applied to a system in which only reading or writing of RFID tag information is performed. Further, the present disclosure is not limited to a system in which the writing/reading of RFID tag information is performed while stopping the base tape 101 or the like at a predetermined position; the above-mentioned printing or reading/writing may be performed with respect to the base tape 101 that is being moved (further, this may be performed with respect to the base tape 101 that is being retained by a predetermined feeding guide).

While the foregoing description of the first to fourth embodiments and their modifications is directed to the example in which RFID tag information is transmitted to the RFID circuit element To and written to the IC circuit part 151 to thereby produce the RFID label T, this should not be construed restrictively. That is, as already mentioned above, the present disclosure is also applicable to the case where the RFID label T is produced by reading RFID tag information from a read-only RFID circuit element To in which predetermined RFID tag information is previously stored and retained in a non-rewritable manner, and performing printing corresponding to the read information. In this case as well, the same effect as mentioned above can be attained.

The foregoing description is directed to the example in which, using a loop antenna as the antenna LC on the device side or the antenna 152 on the RFID circuit element To side, transmission/reception of information is performed by magnetic induction (electromagnetic induction, magnetic coupling, and other such non-contact induction method performed via an electromagnetic field). However, this should not be construed restrictively. For example, transmission/reception of information may be performed by radio communication by using, as the above-mentioned two antennas, dipole antennas, patch antennas, or the like as the communication device.

Further, while in the foregoing example the half-cut unit 35 is provided separately from the cutting mechanism 15, this should not be construed restrictively. That is, for example, half-cutting may be performed by controlling the pivot angle of the stationary blade 41 of the cutting mechanism 15 to be smaller than that at the time of full-cutting. The same effect as mentioned above can be attained in this case as well.

Further, while the foregoing description is directed to the example in which the tag label tape 109 with print for which printing and access (reading or writing) to the RFID circuit element To have been finished is cut by the cutter 15 to thereby produce the tag label T, this should not be construed restrictively. That is, in the case where label backing sheets (so-called die-cut labels) that are divided into predetermined sizes corresponding to individual labels in advance are continuously arranged on the tape paid out from the roll, only the label backing sheets (which are each equipped with the RFID circuit element To to which access has been made, and on which corresponding printing has been made) may be peeled off from the tape after the tape is discharged from the discharge port 11 to thereby produce the tag labels T without performing cutting by the cutter 15, and the present disclosure is also applicable to a tag-label producing device of this type.

Further, while the foregoing description is directed to the example in which a roll is formed by winding the base tape 101 or the like around the reel member a, and in which the roll is arranged inside the cartridge 7 and the tape is paid out from this roll, this should not be construed restrictively. For example, long flat or rectangular tapes or sheets (including those formed by cutting the tape wound around the roll into suitable lengths after it is paid out) may be stacked within a predetermined accommodating portion (for example, laminated flat into a tray-like shape) into a cartridge, this cartridge being loaded onto the cartridge holder on the tag-label producing device 1, 1' side and transferred and fed from the above-mentioned accommodating portion to undergo printing and writing to thereby produce a tag label.

Further, other conceivable structures include one in which the above-mentioned roll is detachably mounted onto the tag-label producing device 1, 1' side directly, and one in which long flat or rectangular tapes or sheets are transferred by a predetermined feeder mechanism one by one from the outside of the tag-label producing device 1, 1' into the tag-label producing device 1, 1'. Further, the present disclosure is not limited to the one that can be detachably mounted to the tag-label producing device 1, 1' main body side such as the cartridge 7, either; the first roll 102 may be provided as an installed or integral type one that is undetachably mounted on the main body side. In this case as well, the same effect as mentioned above can be attained.

It is assumed that the "Scroll ID" signal, the "Erase" signal, the "Verify" signal, the "Program" signal, and the like used in the foregoing description conform to the specifications developed by EPC global. EPC global is a non-profit corporation jointly founded by the international EAN association, which is an international association of distribution codes, and the Uniformed Code Council (UCC), which is a distribution code association of the United States. It should be noted that signals that conform to other standards may be used as long as they serve the same function.

Further, other than those already described above, the methods according to the above-mentioned embodiments and the respective modifications may be used in combination as appropriate.

In addition, although not exemplified herein, it is to be understood that the present disclosure is implemented in various modified forms without departing from the scope of the present disclosure.

What is claimed is:

1. A tag-label producing device comprising:
   a communication device that performs transmission/reception of information in a non-contact manner with respect to an RFID circuit element provided in a tag medium having a said RFID circuit element arranged therein, said RFID circuit element including an IC circuit part for storing information and an antenna for performing transmission/reception of information;
   a relative moving device that imparts relative movement between said communication device and said tag medium;
   a related-information processing portion that performs predetermined processing relating to tag-medium-movement-related information based on the relative movement produced by said relative moving device;
   a control signal outputting portion that outputs a control signal according to a result of processing by said related-information processing portion;
   a printing device that performs printing onto, while moving relative to, a predetermined print area of said tag medium or a print-receiving medium that is bonded onto said tag medium;
wherein
   said relative moving device imparts relative movement between said printing device and said tag medium or said print-receiving medium;
   said related-information processing portion is sequence determining portion that determines, as the predetermined processing relating to said tag-medium-movement-related information, a chronological sequence relation between arrival of said RFID circuit element at a predetermined position, where transmission/reception of information is performed with respect to said communication device, due to said relative movement, and completion of printing by said printing device with respect to said predetermined print area corresponding to said RFID circuit element; and
   said control signal outputting portion is a first coordinative control portion that outputs said control signal for switch-controlling operation modes of said relative moving device, said communication device, and said printing device in a coordinated fashion, in accordance with a result of determination by said sequence determining portion.

2. The tag-label producing device according to claim 1, wherein:
said relative moving device is a feeding device that feeds said tag medium or said print-receiving medium;
said printing device performs printing with respect to said tag medium or said print-receiving medium that is being fed by said feeding device; and
said sequence determining portion makes the determination on the basis of the time of arrival of said tag medium at said predetermined position of said RFID circuit element due to feeding by said feeding device.

3. The tag-label producing device according to claim 2, wherein:
in case it is determined by said sequence determining portion that the completion of printing by said printing device with respect to said print area corresponding to said RFID circuit element takes place first, said first coordinative control portion coordinately controls said feeding device and said communication device so as to stop feeding by said feeding device, and after performing transmission/reception of information by said communication device, resume feeding by said feeding device.

4. The tag-label producing device according to claim 3, wherein:
in case it is determined by said sequence determining portion that the arrival of said RFID circuit element at said predetermined position where transmission/reception of information is performed with respect to said communication device takes place first, said first coordinative control portion coordinately controls said feeding device, said communication device, and said printing device so as to stop feeding by said feeding device and printing by said printing device, and after performing transmission/reception of information by said communication device, resume feeding by said feeding device and printing by said printing device.

5. The tag-label producing device according to claim 4, further comprising communication determining portion that determines whether or not transmission/reception of information by said communication device with respect to said RFID circuit element has succeeded; wherein
in case it is determined by said communication determining portion that said transmission/reception of information has succeeded, said first coordinative control portion performs control so as to resume printing by said printing device.

6. The tag-label producing device according to claim 4, further comprising margin determining portion that determines, in case it is determined by said sequence determining portion that the arrival of said RFID circuit element at said predetermined position where transmission/reception of information is performed with respect to said communication device takes place first, and when feeding by said feeding device and printing by said printing device are stopped upon said arrival, whether or not a position with respect to the feed direction at which said printing device stops printing corresponds to a non-printing margin portion located between print letters or print patterns in said print area.

7. The tag-label producing device according to claim 6, further comprising feed control portion that, in case it is determined by said margin determining portion that the stop position of said printing device does not correspond to said non-printing margin portion, controls said feeding device so as to feed in a reverse or forward direction and then stop said tag medium or said print-receiving medium so that said printing device arrives at said non-printing margin portion.

8. The tag-label producing device according to claim 3, further comprising communication determining portion that determines whether or not transmission/reception of information by said communication device with respect to said RFID circuit element has succeeded.

9. The tag-label producing device according to claim 8, further comprising re-production controlling portion that, in case it is determined by said communication determining portion that said transmission/reception of information has failed:
coordinately controls said feeding device, said printing device, and said communication device so as to transmit/receive, with respect to another RFID circuit element arranged on a trailing side in a feed direction with respect to the RFID circuit element that has failed in said transmission/reception, information that is substantially the same as the information of which said transmission/reception has failed, and to perform corresponding printing with respect to said predetermined area corresponding to said another RFID circuit element; and
produces another RFID label that is different from the RFID label including said RFID circuit element that has failed in said transmission/reception.

10. The tag-label producing device according to claim 9, further comprising a discharge device that discharges the produced RFID label to the outside of said tag-label producing device; wherein
said re-production controlling portion coordinately controls said discharge device, said feeding device, said printing device, and said communication device so as to produce said another RFID label after discharging said RFID label including said RFID circuit element that has failed in said transmission/reception.

11. The tag-label producing device according to claim 9, further comprising successive production controlling portion that coordinately controls said feeding device, said printing device, said communication device, and said discharge device so as to produce a plurality of said RFID labels each including said RFID circuit element at once.

12. The tag-label producing device according to claim 11, wherein:
when said plurality of RFID labels are formed by said successive production controlling portion, in case it is determined by said communication determining portion that said transmission/reception of information has failed, said re-production controlling portion coordinately controls said feeding device, said printing device, and said communication device so as to produce the same number of said another RFID labels as the number of the RFID labels including the RFID circuit elements that have failed in said transmission/reception.

13. The tag-label producing device according to claim 8, wherein:
in case it is determined by said communication determining portion that said transmission/reception of information has failed, said first coordinative control portion controls said printing device so as to perform printing corresponding to said failure.

14. The tag-label producing device according to claim 13, wherein:
as the printing corresponding to said failure, said printing device performs printing in a manner different from a normal manner.

15. The tag-label producing device according to claim 13, wherein:
said feeding device feeds a tag tape as said tag medium, said tag tap having a base layer to which said RFID circuit element is mounted, an adhesive layer for affixing said base layer onto a target affixing object, and a separation material layer that covers said adhesive layer; and said tag-label producing device further comprises a half-cutting device that selectively cuts said separation material layer or layers other than said separation material layer in a width direction, in the vicinity of both longitudinal end portions of a label-information area of said tag tape corresponding to said RFID circuit element and having a predetermined length.

16. The tag-label producing device according to claim 15, further comprising cutting control portion that controls operation of said half-cutting device so that, in case it is determined by said communication determining portion that said transmission/reception of information has failed, said cutting in the width direction is not performed at one of said both longitudinal end portions of said label-formation area.

17. A tag-label producing device comprising;
a communication device that performs transmissionlreception of information in a non-contact manner with respect to an RFID circuit element provided in a tag medium having a said RFID circuit element arranged therein, said RFID circuit element including an IC circuit part for storing information and an antenna for performing transmission/reception of information;
a relative moving device that imparts relative movement between said communication device and said tag medium;
a related-information processing portion that performs predetermined processing relating to tag-medium-movement-related information based on the relative movement produced by said relative moving device;
a control signal outputting portion that outputs a control signal according to a result of processing by said related-information processing portion;
an accommodating-member installation holder that detachably installs a tag-medium accommodating member from which said tag medium is to be supplied; wherein
said relative moving device is a feeding device that feeds said tag medium supplied from said tag-medium accommodating member;
said related-information processing portion is information acquisition portion that acquires, as the predetermined processing relating to said tag-medium-movement-related information, number-count-related information related to the number of said RFID circuit elements in said tag-medium accommodating member via said communication device, said number-count-related information being stored in said IC circuit part of said RFID circuit element;
said tag-label producing device further comprises storage portion that stores, on the basis of said number-count-related information acquired by said information acquisition portion, corresponding number-count information in a rewritable manner;
said control signal outputting portion is display control signal outputting portion that outputs a display control signal for displaying number-count information stored in said storage portion; and
said tag-label producing device produces a tag label using said tag medium for which predetermined information transmission/reception with respect to said RFID circuit element has been performed.

18. The tag-label producing device according to claim 17, further comprising update processing portion that increases or decreases a value of said number-count information, which is stored in said storage portion, by 1 each time production of one said tag label is completed.

19. The tag-label producing device according to claim 18, further comprising a second coordinative control portion that, after said number-count information is stored into said storage portion on the basis of said number-count-related information acquired by said information acquisition portion, coordinately controls said feeding device, said communication device, and said information acquisition portion so as to perform said tag label production without acquiring said number-count-related information by said information acquisition portion.

20. The tag-label producing device according to claim 18, wherein:
said display control signal outputting portion generates and outputs a display control signal for displaying a value of said number-count information updated by said update processing portion.

21. The tag-label producing device according to claim 17, further comprising initialization processing portion that initializes, at a predetermined timing after said tag label production, a value of said number-count information stored in said storage portion at that time.

22. The tag-label producing device according to claim 21, wherein:
said initialization processing portion performs initialization of said number-count information when, as said predetermined timing, at least one of the following conditions are met: said tag-medium accommodating member has been detached from said accommodating-member installation holder; a cover that covers said accommodating-member installation holder has been opened; and a device power source has been turned on or off.

23. The tag-label producing device according to claim 17, wherein:
said accommodating-member installation holder is a cartridge holder onto which an RFID circuit element cartridge as said tag-medium accommodating member accommodating a tag tape roll can be detachably mounted, said tag tape roll having wound thereon a tag tape as said tag medium in which a plurality of said RFID circuit elements are successively arranged.

24. The tag-label producing device according to claim 23, wherein:
said cartridge holder allows said RFID circuit element cartridge of a laminate type to be attached and detached as said RFID circuit element cartridge to and from said cartridge holder, said RFID circuit element cartridge of a laminate type accommodating said tag tape roll, and a print-receiving tape roll around which a print-receiving tape to be bonded onto said tag tape is wound;
said feeding device feeds said tag tape and said print-receiving tape; and
said tag-label producing device further comprises a printing device that performs predetermined printing on said print-receiving tape.

* * * * *